US007912806B2

(12) United States Patent
Yanagi et al.

(10) Patent No.: US 7,912,806 B2
(45) Date of Patent: Mar. 22, 2011

(54) SYSTEM AND DEVICE FOR PROVIDING CONTENTS

(75) Inventors: Satoru Yanagi, Nagoya (JP); Yuji Sato, Nagoya (JP); Masatoshi Kokubo, Aichi-ken (JP); Kazuma Aoki, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 243 days.

(21) Appl. No.: 11/276,272

(22) Filed: Feb. 21, 2006

(65) Prior Publication Data
US 2006/0195468 A1 Aug. 31, 2006

(30) Foreign Application Priority Data

| Feb. 21, 2005 | (JP) | 2005-044345 |
| Feb. 21, 2005 | (JP) | 2005-044346 |
| Mar. 29, 2005 | (JP) | 2005-094935 |
| Mar. 29, 2005 | (JP) | 2005-094936 |
| Apr. 19, 2005 | (JP) | 2005-121154 |
| Apr. 25, 2005 | (JP) | 2005-126560 |

(51) Int. Cl.
*G06F 17/00* (2006.01)
*G06N 5/02* (2006.01)
(52) U.S. Cl. ........................................ 706/50
(58) Field of Classification Search ............ 707/E17.134
See application file for complete search history.

(56) References Cited

U.S. PATENT DOCUMENTS

| 5,999,975 | A | 12/1999 | Kittaka et al. | |
| 2002/0059094 | A1* | 5/2002 | Hosea et al. | 705/10 |
| 2003/0088871 | A1 | 5/2003 | Kimura | |
| 2004/0230572 | A1* | 11/2004 | Omoigui | 707/3 |
| 2005/0049971 | A1* | 3/2005 | Bettinger | 705/51 |
| 2005/0086224 | A1* | 4/2005 | Franciosa et al. | 707/6 |
| 2005/0144065 | A1* | 6/2005 | Calabria et al. | 705/14 |
| 2006/0074883 | A1* | 4/2006 | Teevan et al. | 707/3 |
| 2006/0129547 | A1 | 6/2006 | Yamamoto et al. | |
| 2006/0149708 | A1* | 7/2006 | Lavine | 707/3 |
| 2006/0294093 | A1 | 12/2006 | Yamamoto et al. | |

FOREIGN PATENT DOCUMENTS

| CN | 1410913 A | 4/2003 |
| JP | 1994124309 A | 5/1994 |
| JP | H09-171469 A | 6/1997 |
| JP | 1998326289 A | 12/1998 |
| JP | 2001-060200 A | 3/2001 |
| JP | 2003-178075 A | 6/2003 |
| JP | 2003-242173 A | 8/2003 |
| JP | 2004-164678 A | 6/2004 |
| JP | 2004164678 A | 6/2004 |
| WO | 03034255 A1 | 4/2003 |

OTHER PUBLICATIONS

State Intellectual Property Office, Notification of the First Offical Action in Chinese Patent Appl'n No. 200610008364.X (counterpart to above-captioned U.S. patent appl'n) issues Nov. 2, 2007. Japan Patent Office; Notification of Reasons of Rejection in Japanese Patent Application No. 2005-094936 (counterpart to the above-captioned U.S. patent application) mailed May 19, 2009.
Japan Patent Office; Notification of Reasons of Rejection in Japanese Patent Application No. 2005-121154 (counterpart to the above-captioned U.S. patent application) mailed May 19, 2009.
Japan Patent Office; Notification of Reasons of Rejection in Japanese Patent Application No. 2005-044345 (counterpart to the above-captioned U.S. patent application) mailed May 19, 2009.

* cited by examiner

*Primary Examiner* — Michael B. Holmes
*Assistant Examiner* — Peter Coughlan
(74) *Attorney, Agent, or Firm* — Baker Botts L.L.P.

(57) ABSTRACT

According to an aspect of the invention, there is provided a content providing system, which is provided with a data acquisition unit configured to obtain data inputted and/or outputted through a user interface which is included in an information processing device, an interest estimation unit that generates interest information representing a user's interest by estimating the user's interest based on the data acquired by the data acquisition unit, and a latest estimation result saving unit that saves latest interest information generated by the interest estimation unit so that contents reflecting the latest interest information can be provided to a user.

19 Claims, 76 Drawing Sheets

(SOURCE MANAGEMENT TABLE)

| SOURCE CREATION TIME (YEAR/MONTH/DAY/ MINUTE/SECOND) | INPUT SOURCE | DEVICE USAGE INFORMATION | FILE NAME |
|---|---|---|---|
| ***** | PC | DOCUMENT BROWSING | file 001 |
| ***** | PC | DOCUMENT CREATION | file 002 |
| ***** | DIGITAL TELEPHONE | CALL | file 003 |
| ***** | DIGITAL TELEPHONE | CALL IN | file 004 |
| ... | ... | ... | ... |

SOURCE INFORMATION (columns: INPUT SOURCE, DEVICE USAGE INFORMATION, FILE NAME)

(INTEREST ESTIMATION TABLE)

| TYPE OF INTEREST | KEYWORD | WEIGHTING |
|---|---|---|
| v1 | internet,software,computer,printer,••• | DOCUMENT BROWSING 1.5 |
| v2 | stock,company,dollar,yen, business,industry,economy,••• | DOCUMENT BROWSING 1.5 |
| v3 | Japanese food,European cooking,Chinese dishes, breakfast,lunch,dinner,restaurant,business trip,••• | TIME 11:00-12:00 1.5 TIME 17:00-18:00 1.5 |
| v4 | key1,key2,••• | DOCUMENT CREATION 1.5 |
| ••• | | ••• |

FIG. 10

(SEARCH INFORMATION MANAGEMENT TABLE)

| SOURCE CREATION TIME (YEAR/MONTH/DAY/ MINUTE/SECOND) | INTEREST VECTOR | SEARCH KEY | NUMBER OF SEARCH KEYS |
|---|---|---|---|
| ***** | ***** | ***** | ***** |
| ***** | (V1,V2,•••,vn) | key1,key2,••• | 3 |
| ***** | ***** | ***** | ***** |
| ••• | ••• | ••• | ••• |

SEPARATE SEARCH INFORMATION (SEARCH PROGRAM MANAGEMENT TABLE)

| SEARCH PROGRAM ADDRESS | QUERY CREATION INFORMATION | CATEGORY |
|---|---|---|
| http://***** | ***** | GENERAL SEARCH |
| http://***** | ***** | TERM SEARCH |
| ... | ... | ... |

FIG.12

(SEARCH RESULT MANAGEMENT TABLE)

| SOURCE CREATION TIME (YEAR/MONTH/DAY/ MINUTE/SECOND) | CATEGORY | CONTENT STORAGE ADDRESS | ACQUISITION INFORMATION | ACQUISITION COMPLETION TIME (YEAR/MONTH/DAY/ MINUTE/SECOND) | OUTPUT INFORMATION | EVALUATION VALUE |
|---|---|---|---|---|---|---|
| ***** | GENERAL SEARCH | http://***** | NO | ***** | NO | ... |
| ***** | TERM SEARCH | file://****** | YES | ***** | NO | 0.5 |
| ***** | GENERAL SEARCH | http://***** | YES | ***** | NO | 0.1 |
| ... | ... | file://***** | NO | ... | NO | ... |

SEPARATE RESULT INFORMATION

FIG.14

( CURRENT INTEREST TABLE 2 )

| UPDATE TIME (YEAR/MONTH/DAY/ MINUTE/SECOND) | END TIME | INTEREST VECTOR |
|---|---|---|
| ＊＊＊＊＊ | ＊＊＊＊＊ | ( v1,v2,•••,vn ) |

FIG.23

( INTEREST CONTINUATION TIME TABLE )

| TYPE OF INTEREST | INTEREST CONTINUATION TIME |
|---|---|
| v1 | 10 seconds |
| v2 | 20 seconds |
| v3 | 5 seconds |
| v4 | 7 seconds |
| ... | ... |

(INTEREST ESTIMATION TABLE)

| TYPE OF INTEREST | KEYWORD | CONTINUATION TIME | WEIGHTING |
|---|---|---|---|
| v1 | internet,software,computer,printer,••• | ***** | DOCUMENT BROWSING 1.5 |
| v2 | stock,company,dollar,yen, business,industry,economy,••• | ***** | DOCUMENT BROWSING 1.5 |
| v3 | Japanese food,European cooking,Chinese dishes, breakfast,lunch,dinner,restaurant,business trip,••• | ***** | TIME 11:00-12:00 1.5 TIME 17:00-18:00 1.5 |
| v4 | key1,key2,••• | ***** | DOCUMENT CREATION 1.5 |
| ••• | | | • |

FIG.30

(SEARCH INFORMATION MANAGEMENT TABLE)

| SOURCE CREATION TIME (YEAR/MONTH/DAY/ MINUTE/SECOND) | INTEREST VECTOR | SEARCH KEY | NUMBER OF SEARCH KEYS | EVALUATION VALUE |
|---|---|---|---|---|
| ***** | ***** | ***** | ***** | ***** |
| ***** | (V1,V2,•••,vn) | key1,key2,••• | 3 | 0.9 |
| ***** | ***** | ***** | ***** | ***** |
| • | • | • | • | • |

SEPARATE SEARCH INFORMATION (bracketing the SEARCH KEY, NUMBER OF SEARCH KEYS, EVALUATION VALUE cells of the second data row)

FIG.35

(SEARCH PROCESS MANAGEMENT TABLE)

| PROCESS ID | PROCESS PRIORITY | MEMORY UPPER LIMIT | NUMBER OF COUNTS TO BE ADOPTED | ADDRESS OF SEPARATE SEARCH INFORMATION |
|---|---|---|---|---|
| P0001 | ***** | ***** | 5 | ***** |
| P0002 | ***** | ***** | 1 | ***** |
| P0003 | ***** | ***** | 5 | ***** |
| ... | ... | ... | ... | ... |

PROCESS MANAGEMENT INFORMATION (the P0002 row)

FIG.36

(SEARCH PROGRAM MANAGEMENT TABLE)

| SEARCH PROGRAM ADDRESS | QUERY CREATION INFORMATION | CATEGORY |
|---|---|---|
| http://***** | ***** | GENERAL SEARCH |
| http://***** | ***** | TERM SEARCH |
| ... | ... | ... |

(SEARCH RESULT MANAGEMENT TABLE)

| SEARCH COMPLETION TIME (YEAR/MONTH/DAY/ MINUTE/SECOND) | ADDRESS OF SEPARATE SEARCH INFORMATION | CATEGORY | CONTENT STORAGE ADDRESS | OUTPUT INFORMATION |
|---|---|---|---|---|
| ***** | *** | GENERAL SEARCH | http://***** | FALSE |
| ***** | *** | TERM SEARCH | file://***** | FALSE |
| ***** | *** | GENERAL SEARCH | http://***** | FALSE |
| ⋮ |  | ⋮ | file://***** | TRUE |

SEPARATE RESULT INFORMATION (columns: CATEGORY, CONTENT STORAGE ADDRESS)

FIG.38

(READING PROCESS MANAGEMENT TABLE)

| PROCESS ID | PROCESS PRIORITY | MEMORY UPPER LIMIT | ADDRESS OF SEPARATE SEARCH INFORMATION |
|---|---|---|---|
| P0001 | ***** | ***** | ***** |
| P0002 | ***** | ***** | ***** |
| P0003 | ***** | ***** | ***** |
| ... | ... | ... | ... |

PROCESS MANAGEMENT INFORMATION

(INTEREST ESTIMATION TABLE)

| TYPE OF INTEREST | KEYWORD | CONTINUATION TIME | WEIGHTING |
|---|---|---|---|
| v1 | internet,software,computer,printer,... | ***** | DOCUMENT BROWSING 1.5 |
| v2 | stock,company,dollar,yen, business,industry,economy,... | ***** | DOCUMENT BROWSING 1.5 |
| v3 | Japanese food,European cooking,Chinese dishes, breakfast,lunch,dinner,restaurant,business trip,... | ***** | TIME 11:00-12:00 1.5 TIME 17:00-18:00 1.5 |
| v4 | key1,key2,... | ***** | DOCUMENT CREATION 1.5 |
| ... | ... | ... | ... |

FIG.48

(SEARCH INFORMATION MANAGEMENT TABLE)

| SOURCE CREATION TIME (YEAR/MONTH/DAY/ MINUTE/SECOND) | SEARCH KEY | NUMBER OF SEARCH KEYS |
|---|---|---|
| ***** | ***** | ***** |
| ***** | key1,key2,... | 3 |
| ***** | ***** | ***** |
| ... | ... | ... |

SEPARATE SEARCH INFORMATION ( SEARCH PROCESS MANAGEMENT TABLE )

| PROCESS ID | ADDRESS OF SEPARATE SEARCH INFORMATION |
|---|---|
| P0001 | ***** |
| P0002 | ***** |
| P0003 | ***** |
| ... | ... |

PROCESS MANAGEMENT INFORMATION

FIG.52

( SEARCH PROGRAM MANAGEMENT TABLE )

| SEARCH PROGRAM ADDRESS | QUERY CREATION INFORMATION | CATEGORY |
|---|---|---|
| http://***** | ***** | GENERAL SEARCH |
| http://***** | ***** | TERM SEARCH |
| ... | ... | ... |

FIG.53

(SEARCH RESULT MANAGEMENT TABLE)

| SEARCH COMPLETION TIME (YEAR/MONTH/DAY/ MINUTE/SECOND) | ADDRESS OF SEPARATE SEARCH INFORMATION | CATEGORY | CONTENT STORAGE ADDRESS | OUTPUT INFORMATION |
|---|---|---|---|---|
| ***** | *** | GENERAL SEARCH | http://***** | FALSE |
| ***** | *** | TERM SEARCH | file://***** | FALSE |
| ***** | *** | GENERAL SEARCH | http://***** | FALSE |
| ... | | ... | file://***** | TRUE |

SEPARATE RESULT INFORMATION (columns: CATEGORY, CONTENT STORAGE ADDRESS)

FIG.55

(SEARCH PROCESS MANAGEMENT TABLE)

| PROCESS ID | ADDRESS OF SEPARATE SEARCH INFORMATION |
|---|---|
| P0001 | ***** |
| P0002 | ***** |
| P0003 | ***** |
| ... | ... |

PROCESS MANAGEMENT INFORMATION

FIG.57

(SEARCH INFORMATION MANAGEMENT TABLE)

| SOURCE CREATION TIME (YEAR/MONTH/DAY/ MINUTE/SECOND) | INTEREST VECTOR | SEARCH KEY | NUMBER OF SEARCH KEYS |
|---|---|---|---|
| ***** | ***** | ***** | ***** |
| ***** | (v1,v2,···,vn) | key1,key2,··· | 3 |
| ***** | ***** | ***** | ***** |
| ⋯ | ⋯ | ⋯ | ⋯ |

SEPARATE SEARCH INFORMATION (covering SEARCH KEY and NUMBER OF SEARCH KEYS columns of the second data row)

(INTEREST ESTIMATION TABLE)

| TYPE OF INTEREST | KEYWORD | CONTINUATION TIME | WEIGHTING |
|---|---|---|---|
| v1 | internet,software,computer,printer,••• | ***** | DOCUMENT BROWSING 1.5 |
| v2 | stock,company,dollar,yen, business,industry,economy,••• | ***** | DOCUMENT BROWSING 1.5 |
| v3 | Japanese food,European cooking,Chinese dishes, breakfast,lunch,dinner,restaurant,business trip,••• | ***** | TIME 11:00-12:00 1.5 TIME 17:00-18:00 1.5 |
| v4 | key1,key2,••• | ***** | DOCUMENT CREATION 1.5 |
| ••• | | | ••• |

(SEARCH PROGRAM MANAGEMENT TABLE)

| SEARCH PROGRAM ADDRESS | QUERY CREATION INFORMATION | CATEGORY |
|---|---|---|
| http://***** | ***** | GENERAL SEARCH |
| http://***** | ***** | TERM SEARCH |
| ... | ... | ... |

FIG.65

(SEARCH RESULT MANAGEMENT TABLE)

| SOURCE CREATION TIME (YEAR/MONTH/DAY/ MINUTE/SECOND) | CATEGORY | CONTENT STORAGE ADDRESS | EVALUATION VALUE |
|---|---|---|---|
| ***** | GENERAL SEARCH | http://***** | ... |
| ***** | TERM SEARCH | file://***** | 0.5 |
| ***** | GENERAL SEARCH | http://***** | 0.1 |
| ... | ... | file://***** | ... |

SEPARATE RESULT INFORMATION (columns: CONTENT STORAGE ADDRESS, EVALUATION VALUE of row 2)

FIG.67

( CURRENT INTEREST TABLE 2 )

| UPDATE TIME (YEAR/MONTH/DAY/MINUTE/SECOND) | INTEREST VECTOR |
|---|---|
| ∗ ∗ ∗ ∗ | ( v1,v2,···,vn ) |

FIG.69A ( MEMORY INTEREST TABLE 2 )

| REFERENCE ADDRESS | INTEREST VECTOR |
|---|---|
| xxxxxx | ( A1,B1,C1 ) |
| yyyyyy | ( A2,B2,C2 ) |

FIG.69B (ELAPSED TIME PARAMETER TABLE)

| ELAPSED TIME | TIME PARAMETER |
|---|---|
| -0:59 | 1.0 |
| 1:00-2:59 | 0.8 |
| 3:00-4:59 | 0.6 |
| 5:00-9:59 | 0.4 |
| 10:00- | 0 |

FIG.74

(SEARCH RESULT MANAGEMENT TABLE)

| SOURCE CREATION TIME (YEAR/MONTH/DAY/ MINUTE/SECOND) | CATEGORY | CONTENT STORAGE ADDRESS | DESTINATION OF SEPARATE SEARCH INFORMATION | ACQUISITION INFORMATION | ACQUISITION COMPLETION TIME (YEAR/MONTH/DAY/ MINUTE/SECOND) | OUTPUT INFORMATION | EVALUATION VALUE |
|---|---|---|---|---|---|---|---|
| ***** | GENERAL SEARCH | http://***** | ***** | NO | ***** | NO | ... |
| ***** | TERM SEARCH | file://***** | ***** | YES | ***** | NO | 0.5 |
| ***** | GENERAL SEARCH | http://***** | ***** | YES | ***** | NO | 0.1 |
| ... | ... | ... | ... | ... | ... | ... | ... |

SEPARATE RESULT INFORMATION

FIG.79

(INTEREST HISTORY TABLE 2)

| REGISTRATION TIME (YEAR/MONTH/DAY/ HOUR/MINUTE/SECOND) | PROGRESSIVE INTEREST VECTOR |
|---|---|
| ***** | (v11,v21,···,vn1) |
| ***** | (v12,v22,···,vn2) |
| ***** | (v13,v23,···,vn3) |

NEW ↑ / OLD ↓

TRANSITION FACTOR $$K = \left( \frac{v11-v12}{v12-v13}, \frac{v21-v22}{v22-v23}, \cdots, \frac{vn1-vn2}{vn2-vn3} \right)$$

HISTORY INFORMATION

FIG. 81A (CURRENT INTEREST TABLE 2)

| UPDATE TIME (YEAR/MONTH/DAY/ MINUTE/SECOND) | INTEREST VECTOR |
|---|---|
| ***** | (v1,v2,···,vn) |

FIG. 81B (SEARCH INFORMATION MANAGEMENT TABLE)

| SOURCE CREATION TIME (YEAR/MONTH/DAY/ MINUTE/SECOND) | INTEREST VECTOR | SEARCH KEY | NUMBER OF SEARCH KEYS | EVALUATION VALUE |
|---|---|---|---|---|
| ***** | ***** | ***** | ***** | ***** |
| ***** | (v1,v2,...,vn) | key1,key2,... | 3 | 0.9 |
| ***** | ***** | ***** | ***** | ***** |
| ... | ... | ... | ... | |

SEPARATE SEARCH INFORMATION (columns: SEARCH KEY, NUMBER OF SEARCH KEYS, EVALUATION VALUE)

FIG.83

SYSTEM AND DEVICE FOR PROVIDING CONTENTS

CROSS-REFERENCE TO RELATED APPLICATION

This application claims priority under 35 U.S.C. §119 from Japanese Patent Applications Nos. 2005-044345, filed on Feb. 21, 2005, 2005-094935, filed on Mar. 29, 2005, 2005-094936, filed on Mar. 29, 2005, 2005-121154, filed on Apr. 19, 2005, 2005-044346, filed on Feb. 21, 2005, and 2005-126560, filed on Apr. 25, 2005. The entire subject matters of the applications are incorporated herein by reference.

BACKGROUND

1. Technical Field

Aspects of the present invention relate to a system configured to estimate an interest of a user and to provide contents corresponding to the estimated user's interest to the user.

2. Description of Related Art

A content providing system, configured to estimate a user's interest based on an input to the system made by a user, to search for contents corresponding to the estimated user's interest, and to provide the contents to the user, has been proposed. An example of such a system is disclosed in Japanese Patent Provisional Publication No. 2004-164678 (hereafter, referred to as JP 2004-164678A). In this system, the voice input is subjected to a voice recognition process, and some keywords are extracted from the inputted voice. Then, contents having the extracted keywords are searched to display searched contents on a screen.

In the system disclosed in JP 2004-164678A, the searched contents are outputted successively. Therefore, if a time period between a time when the user input was made and a time when contents corresponding to the user input are obtained becomes relatively long, a user's interest to the contents may decline at the time when the contents are displayed. In other words, the content providing system has a drawback that contents to which a user has a high interest can not be appropriately provided to the user.

SUMMARY

Aspects of the present invention are advantageous in that a system and device configured to be capable of providing contents, for which a user has a high interest, to a user timely is provided.

BRIEF DESCRIPTION OF THE ACCOMPANYING DRAWINGS

FIG. 6 shows an example of a data structure of source management table.

FIG. 9 shows an example of a data structure of an interest estimation table according to the first embodiment.

FIG. 10 shows an example of a data structure of a search information management table according to the first embodiment.

FIG. 12 shows an example of a data structure of a search program management table according to the first embodiment.

FIG. 14 shows an example of a search result management table according to the first embodiment.

Figure 21A:
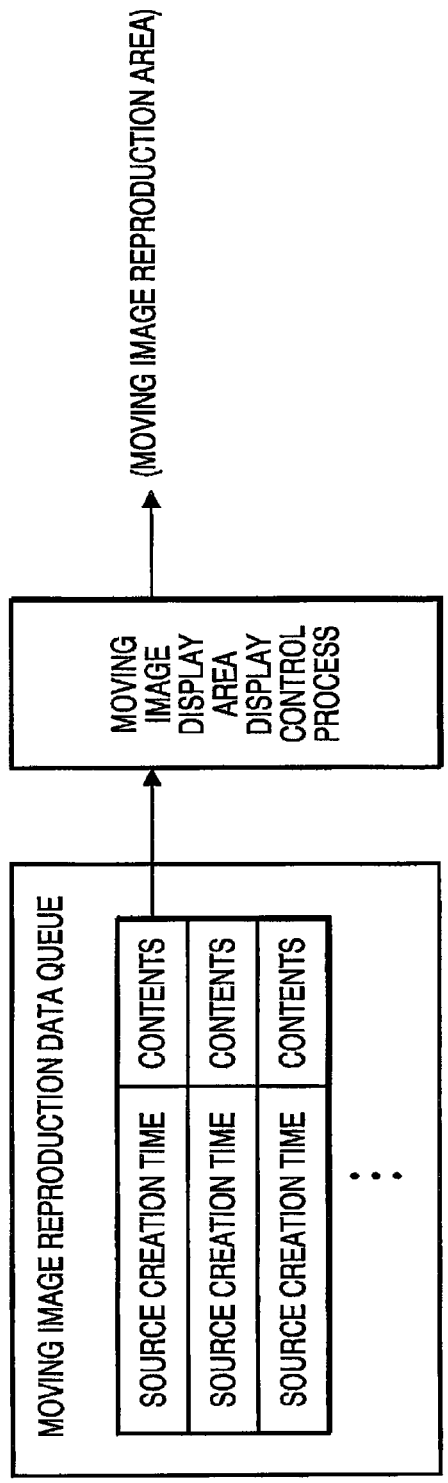

FIG. 21A schematically illustrates a relationship between a moving image reproduction area control process and a moving image reproduction data queue according to the first embodiment.

Figure 21B:
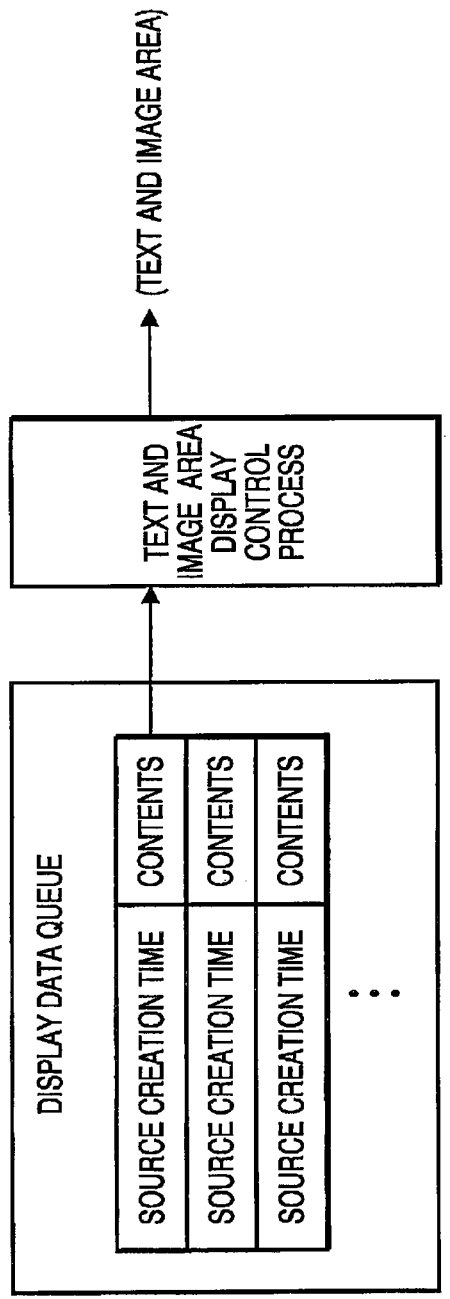

FIG. 21B schematically illustrates a relationship between a display data queue and a text and image area display control process to be executed by the information analysis device.

Figure 22:
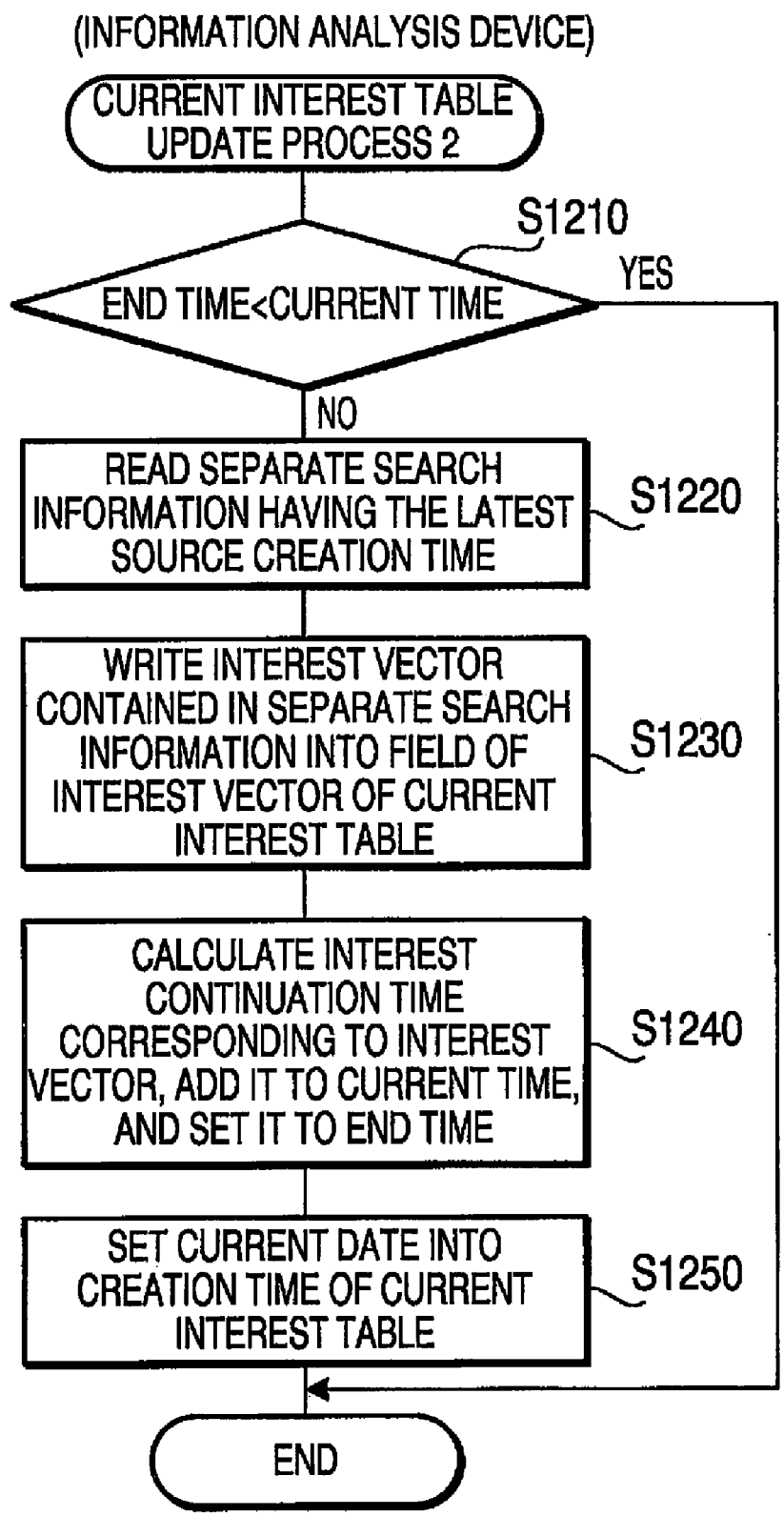

FIG. 22 is a flowchart illustrating a variation of the current interest table update process to be executed by the information analysis device.

FIG. 23 shows an example of a data structure of a variation of the current interest table.

FIG. 24 is an example of a data structure of an interest continuation time table.

Figure 25:
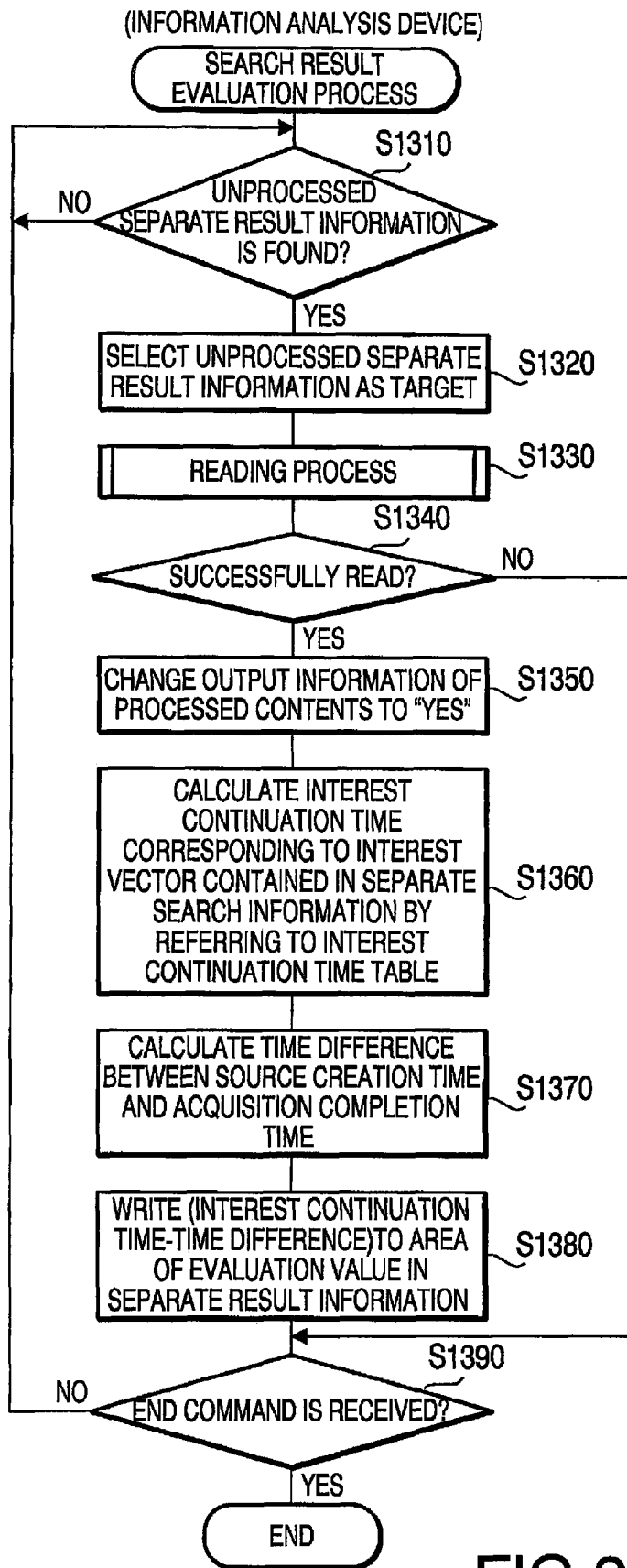

FIG. 25 is a flowchart illustrating a variation of the search result evaluation process.

Figure 26:
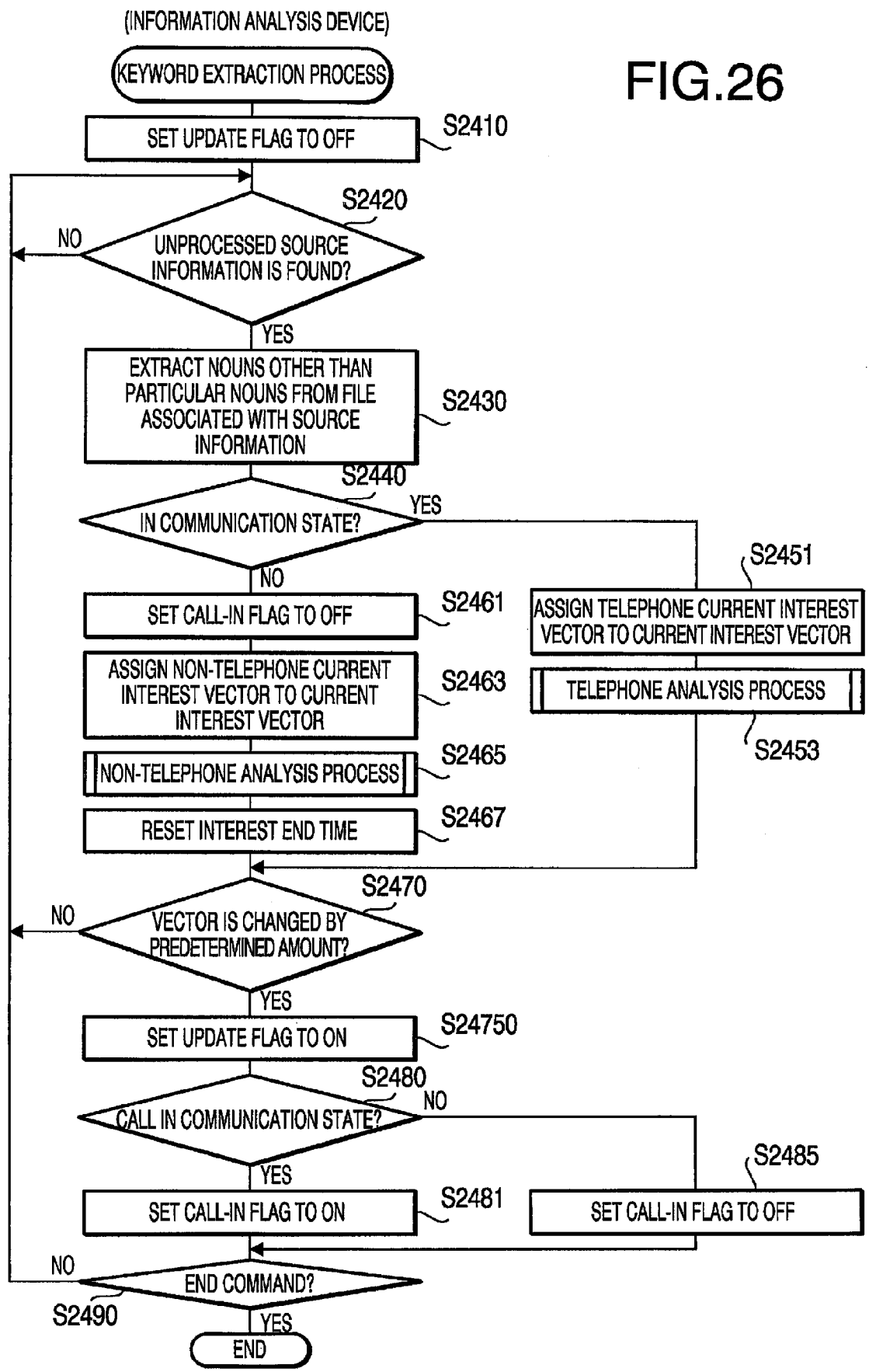

FIG. 26 is a flowchart illustrating a keyword extraction process executed by the information analysis device according to a second embodiment.

Figure 27:
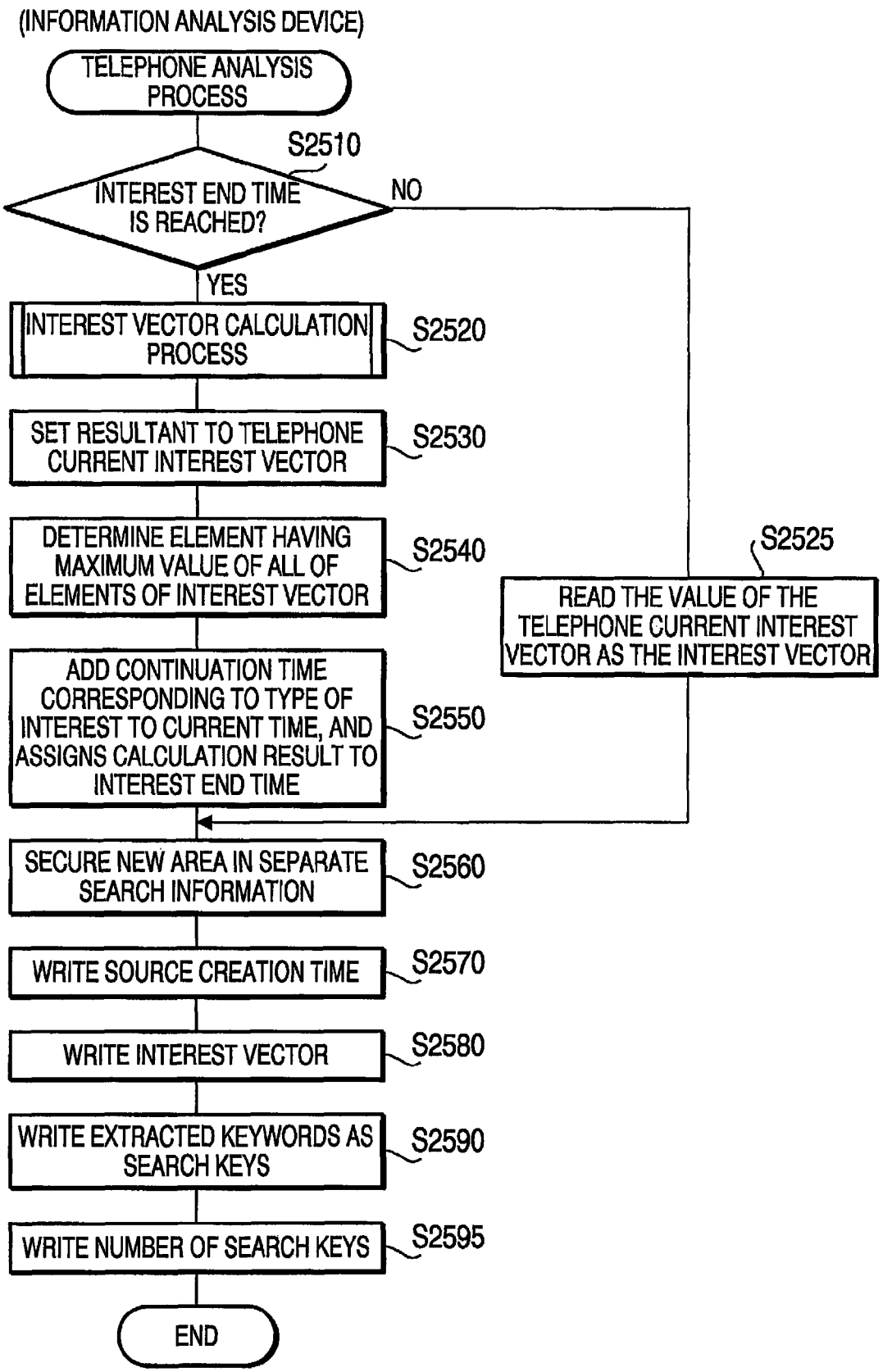

FIG. 27 is a flowchart illustrating a telephone analysis process executed by the information analysis device according to the second embodiment.

Figure 28:
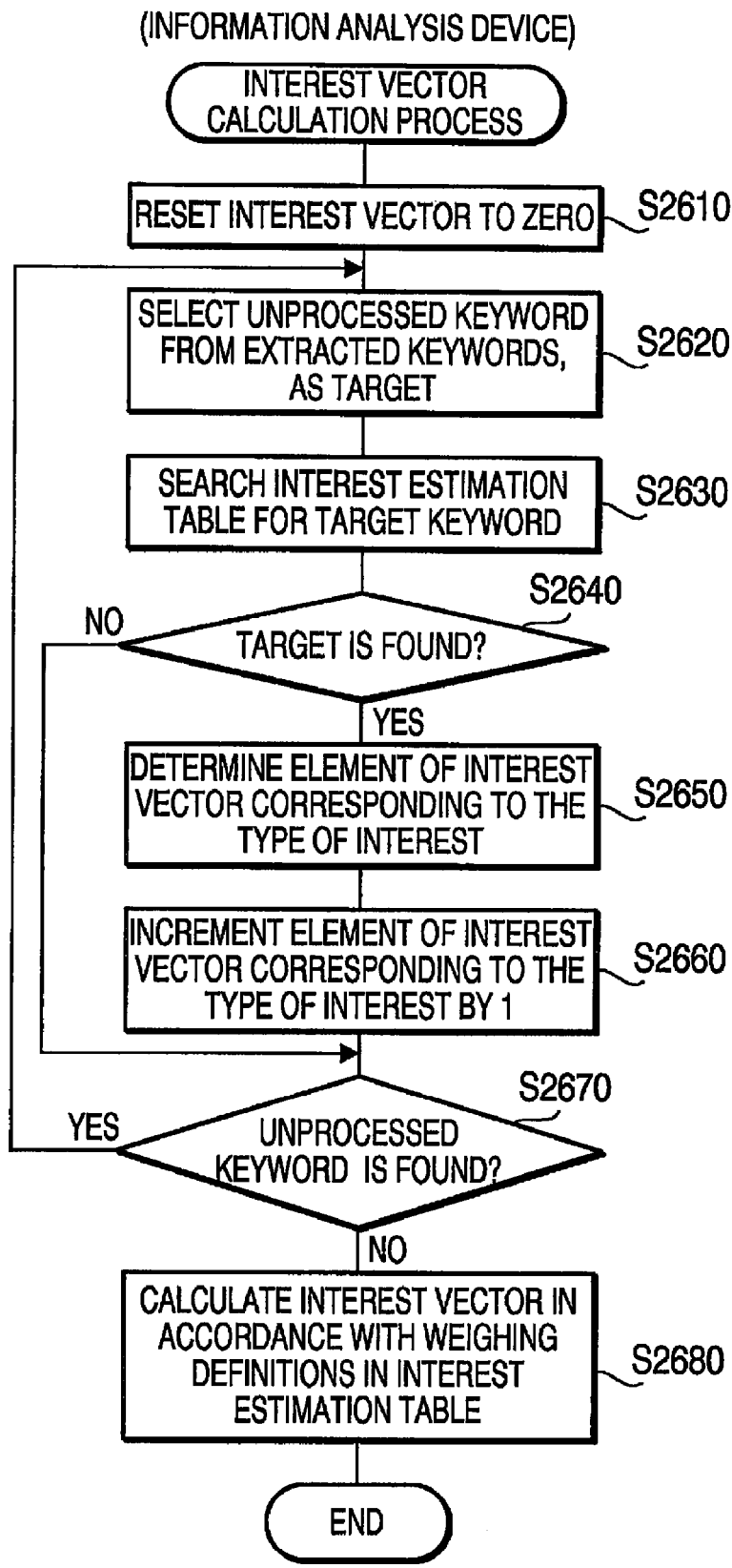

FIG. 28 is a flowchart illustrating an interest vector calculation process executed by the information analysis device according to the second embodiment.

FIG. 29 shows an example of a data structure of an interest estimation table according to the second embodiment.

FIG. 30 shows an example of a data structure of a search information management table according to the second embodiment.

Figure 31:
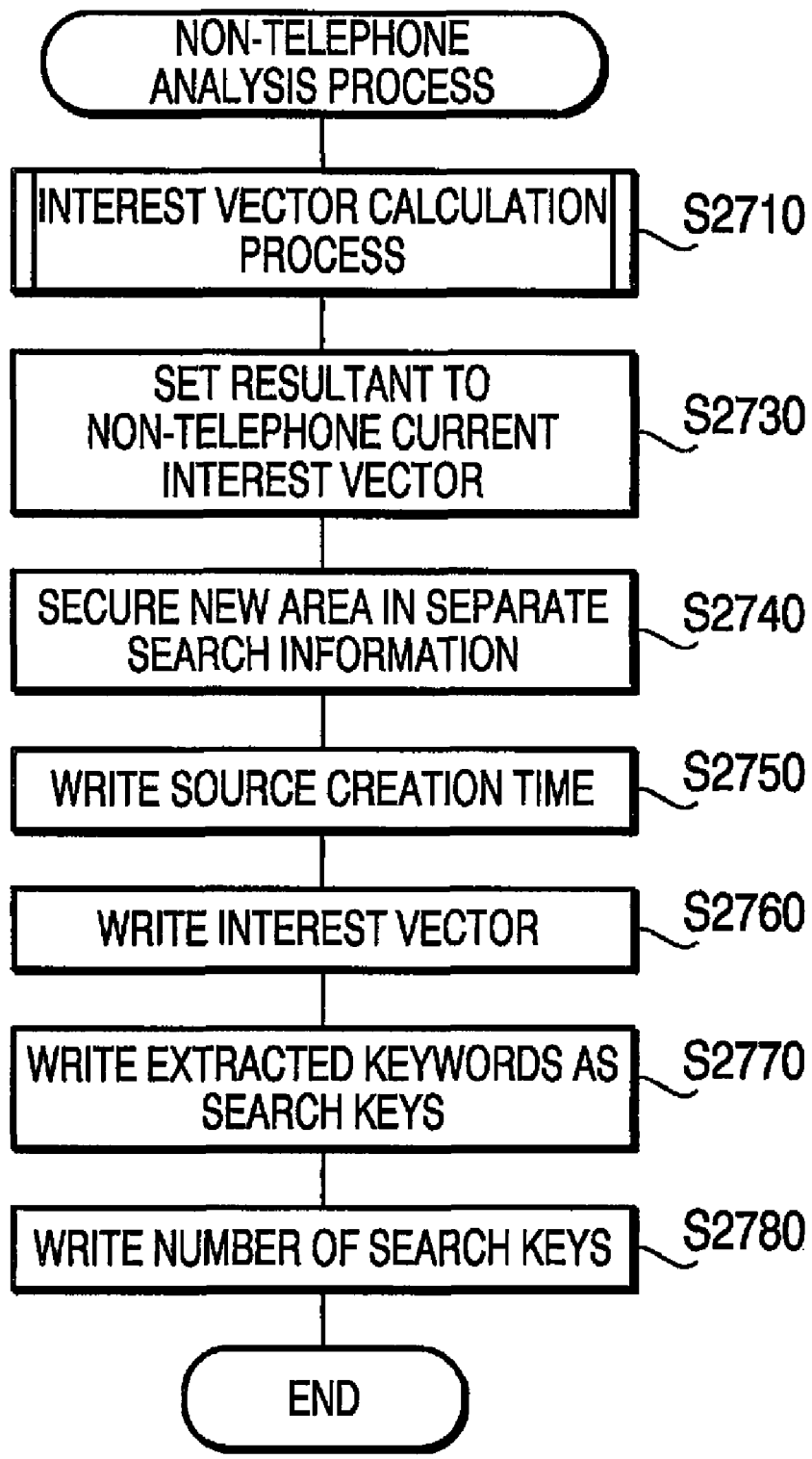

FIG. 31 is a flowchart illustrating a non-telephone analysis process executed by the information analysis device according to the second embodiment.

Figure 32:
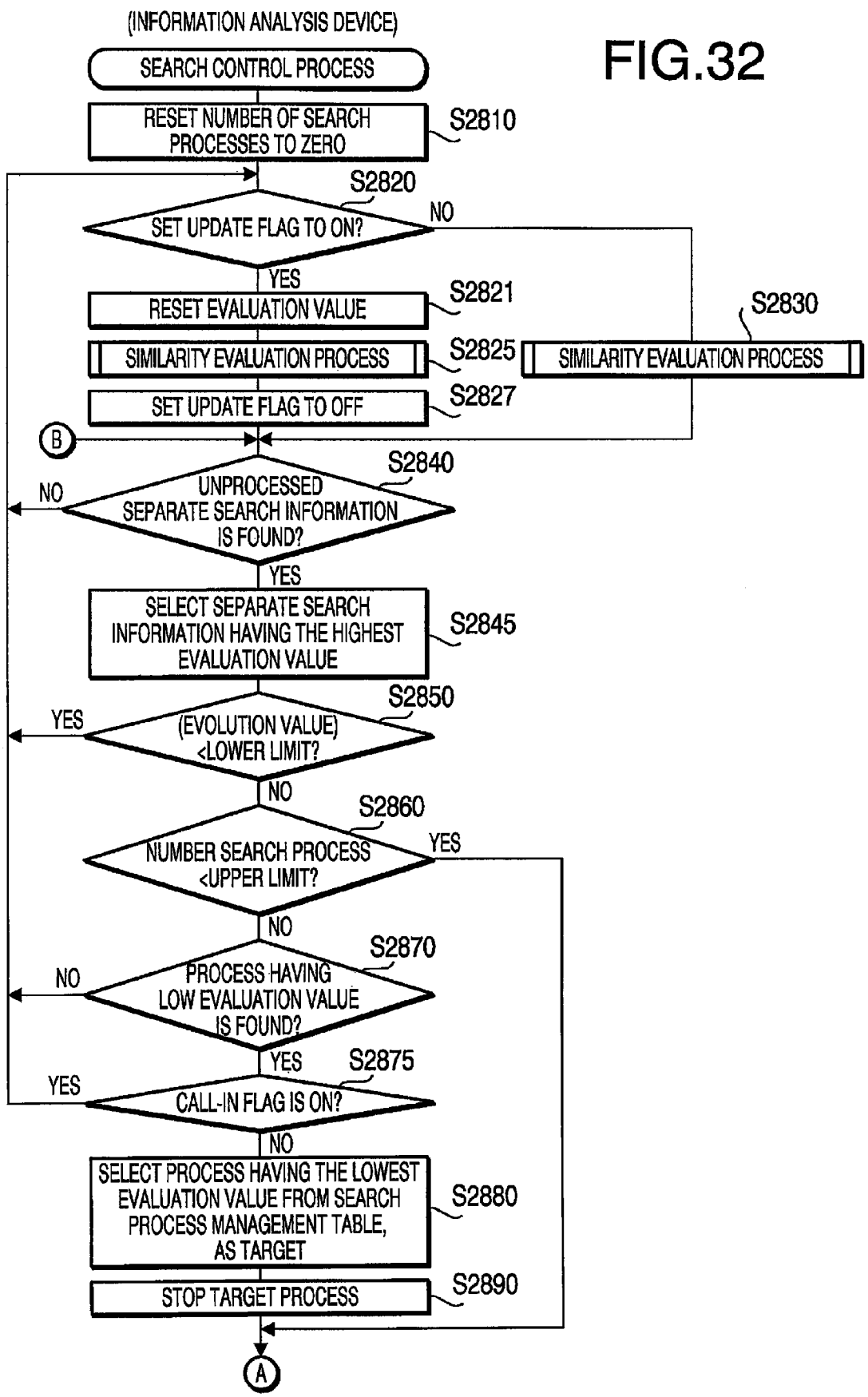
Figure 33:
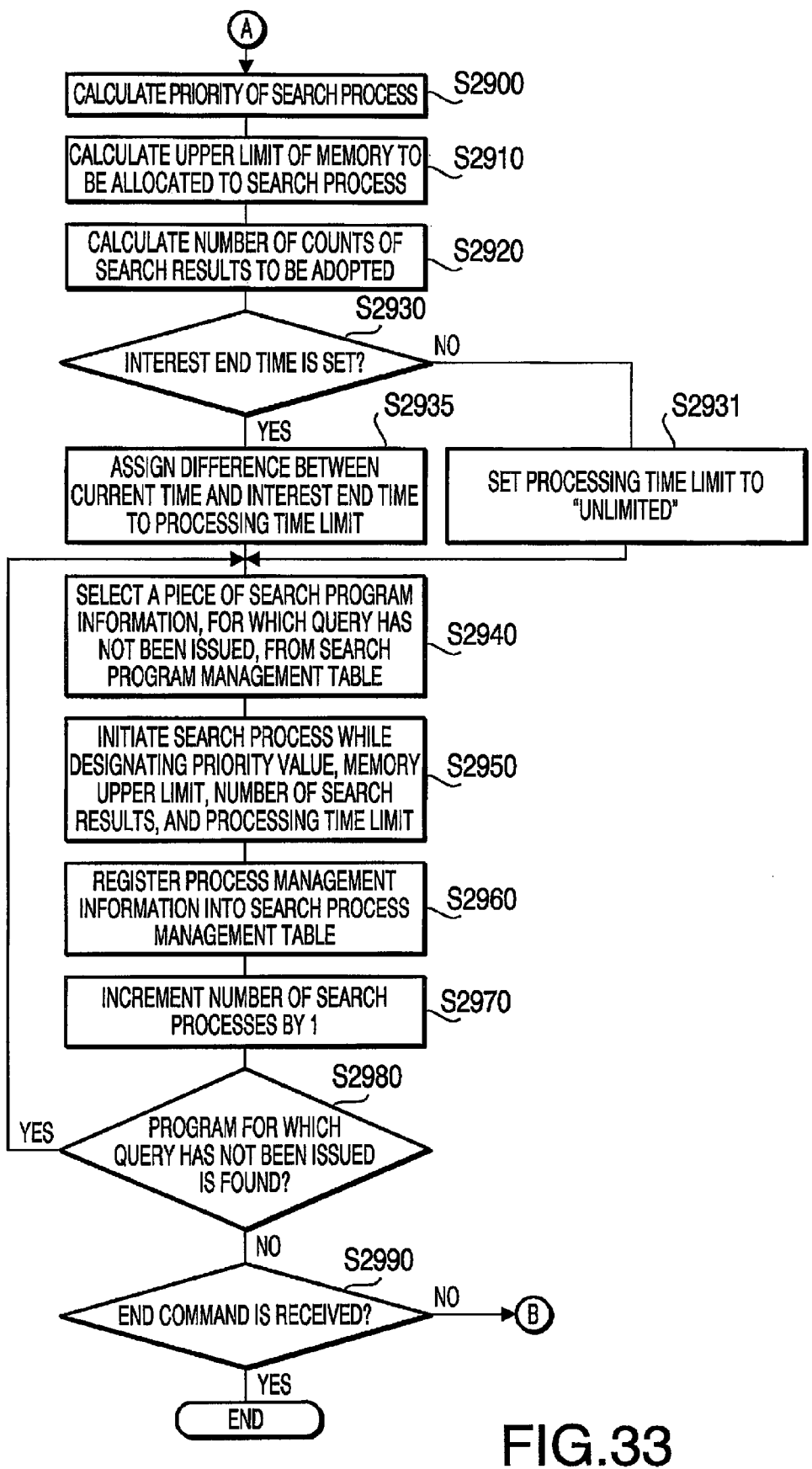

FIGS. 32 and 33 show a flowchart of a search control process executed by the information analysis device according to the second embodiment.

Figure 34:
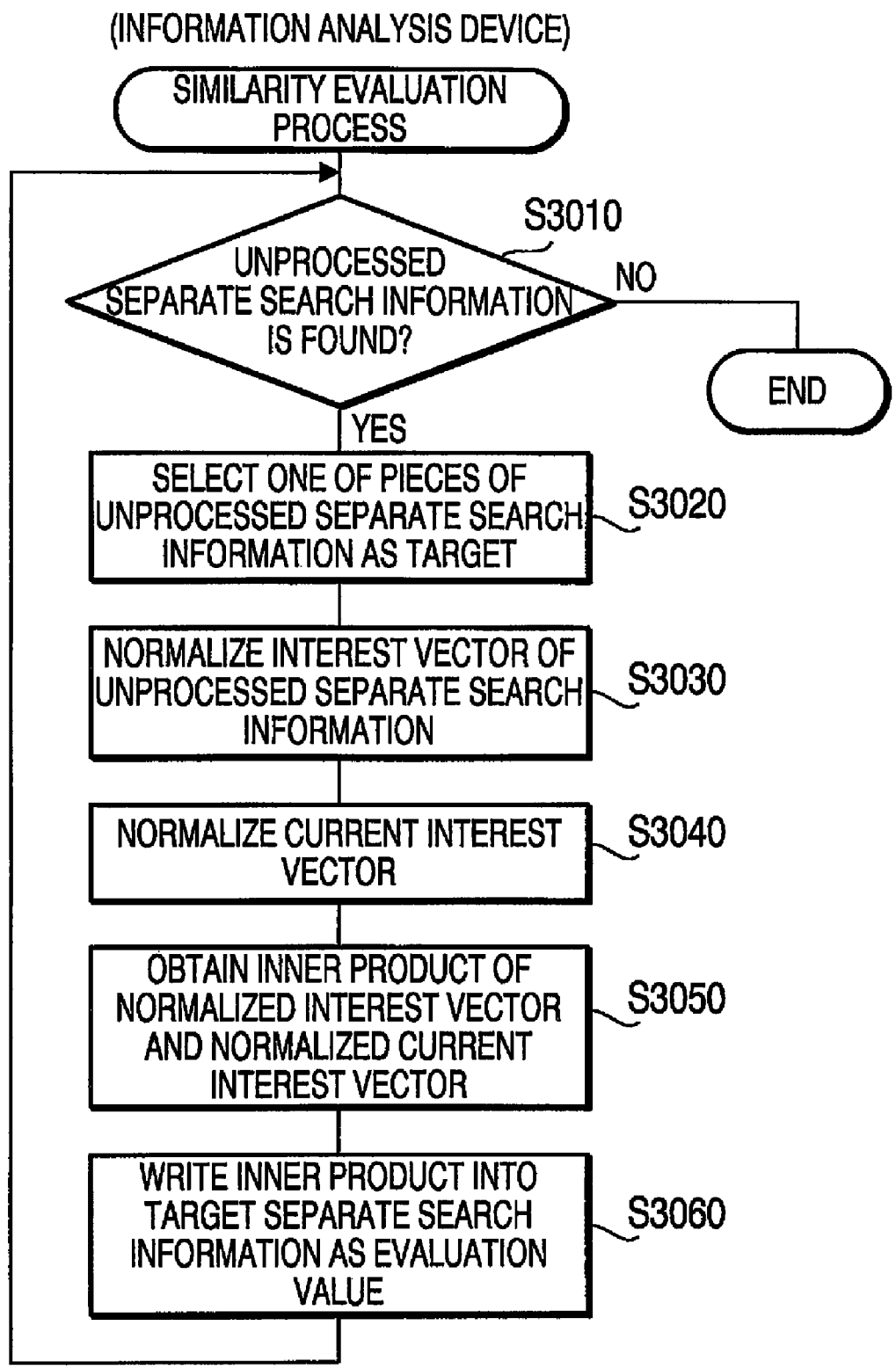

FIG. 34 is a flowchart illustrating a similarity evaluation process executed by the information analysis device according to the second embodiment.

FIG. 35 shows an example of a data structure of a search process management table according to the second embodiment.

FIG. 36 shows an example of a data structure of a search program management table according to the second embodiment.

Figure 37:
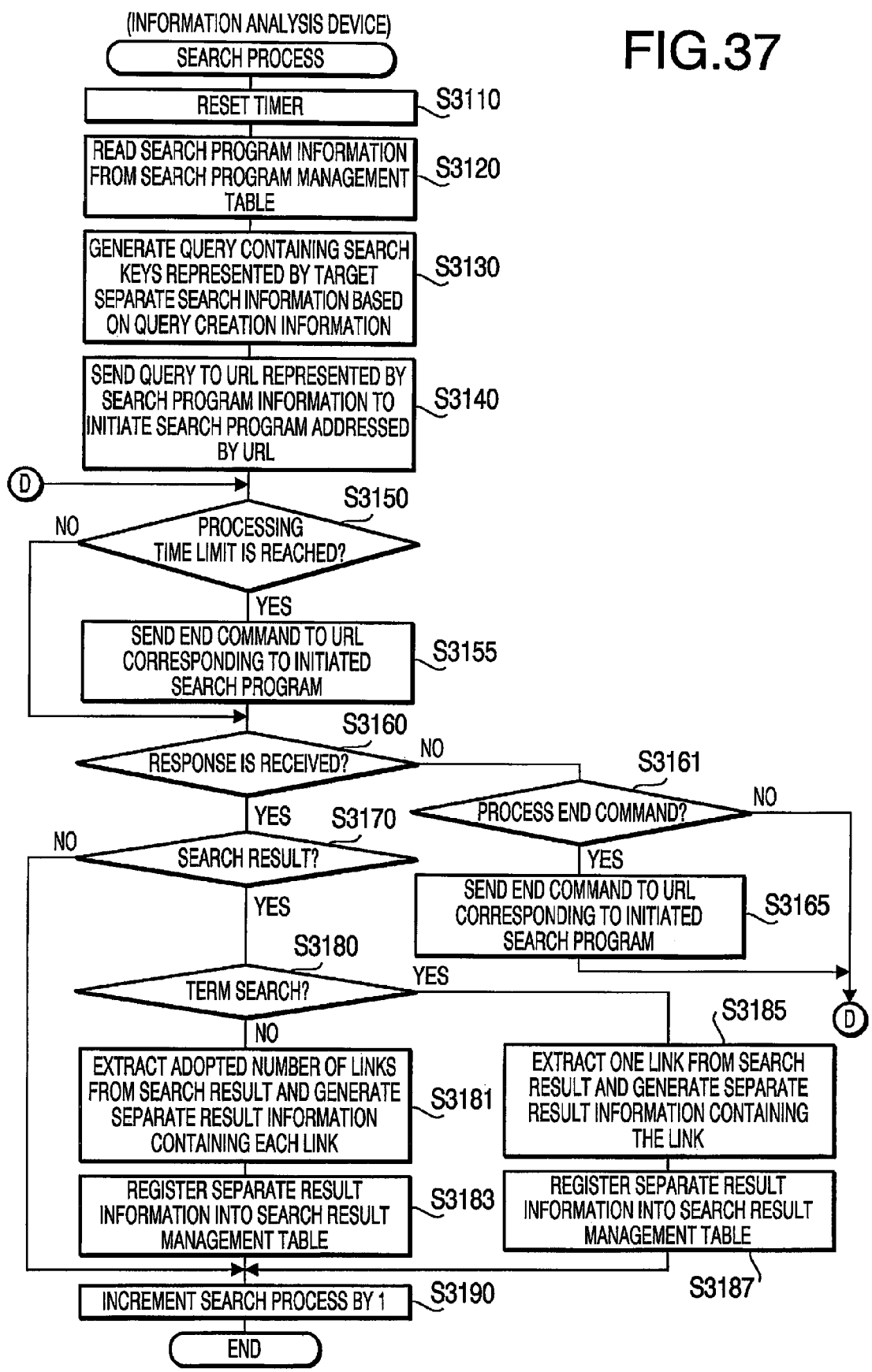

FIG. 37 is a flowchart illustrating a search process executed by the information analysis device according to the second embodiment.

FIG. 38 shows an example of a data structure of a search result management table according to the second embodiment.

Figure 39:
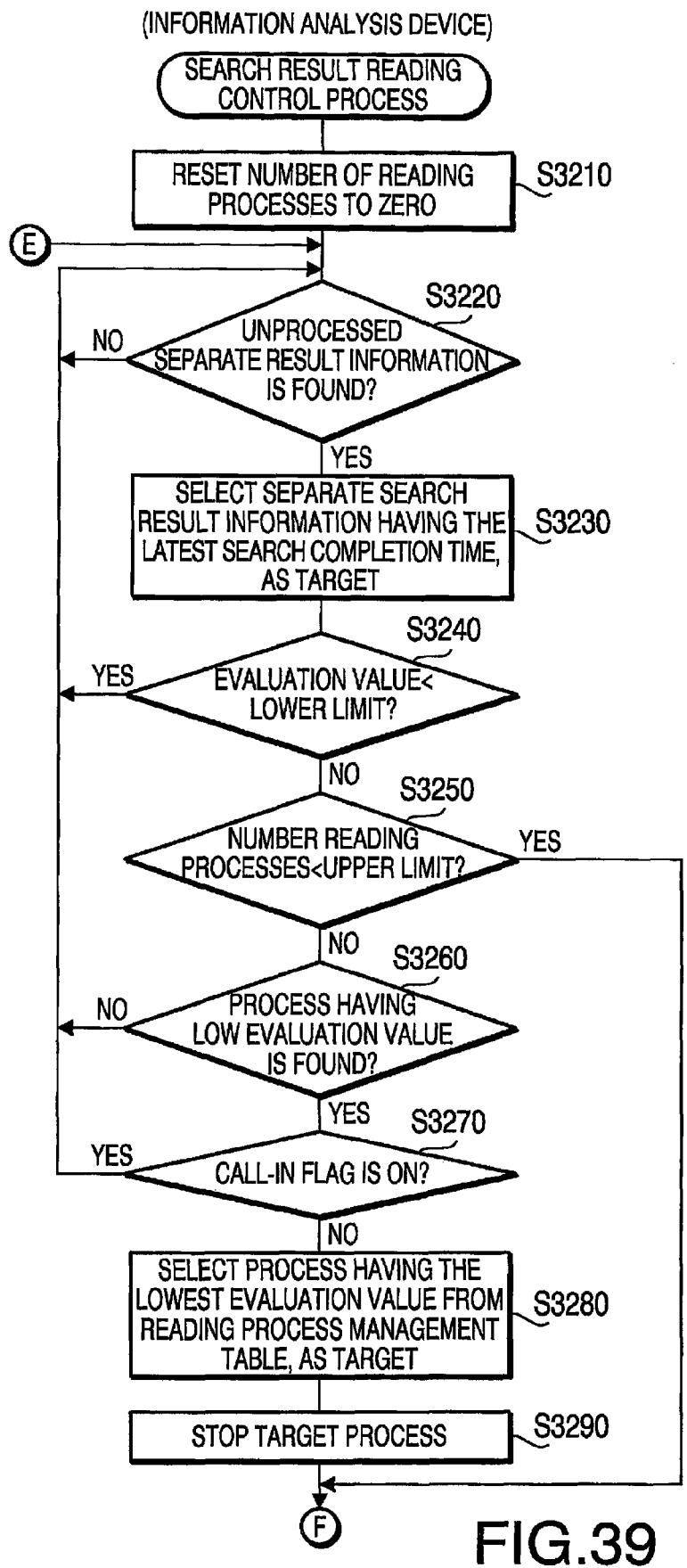
Figure 40:
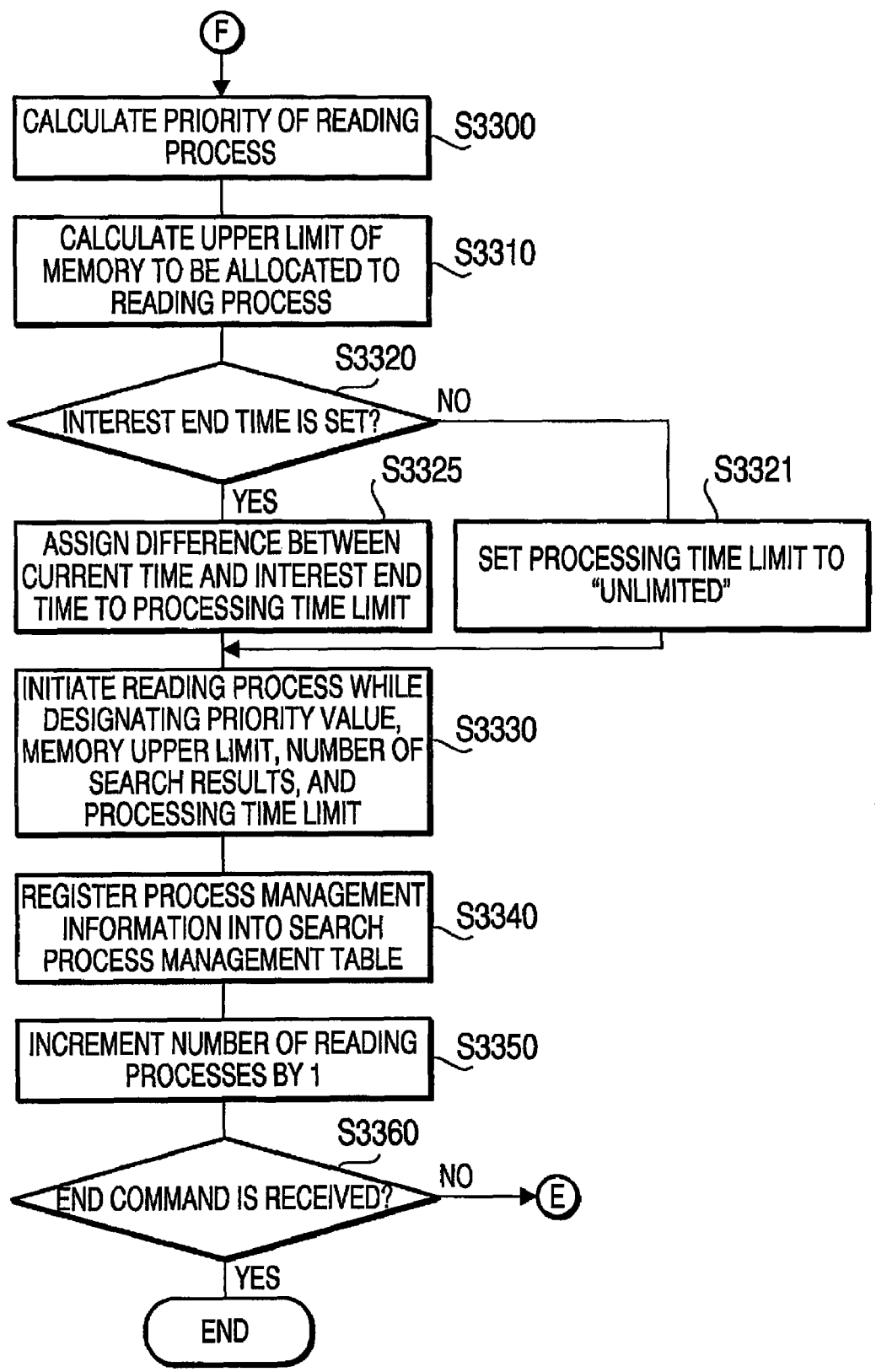

FIGS. 39 and 40 show a flowchart of a search result reading control process executed by the information analysis device according to the second embodiment.

FIG. 41 shows an example of a data structure of a reading process management table according to the second embodiment.

Figure 42:
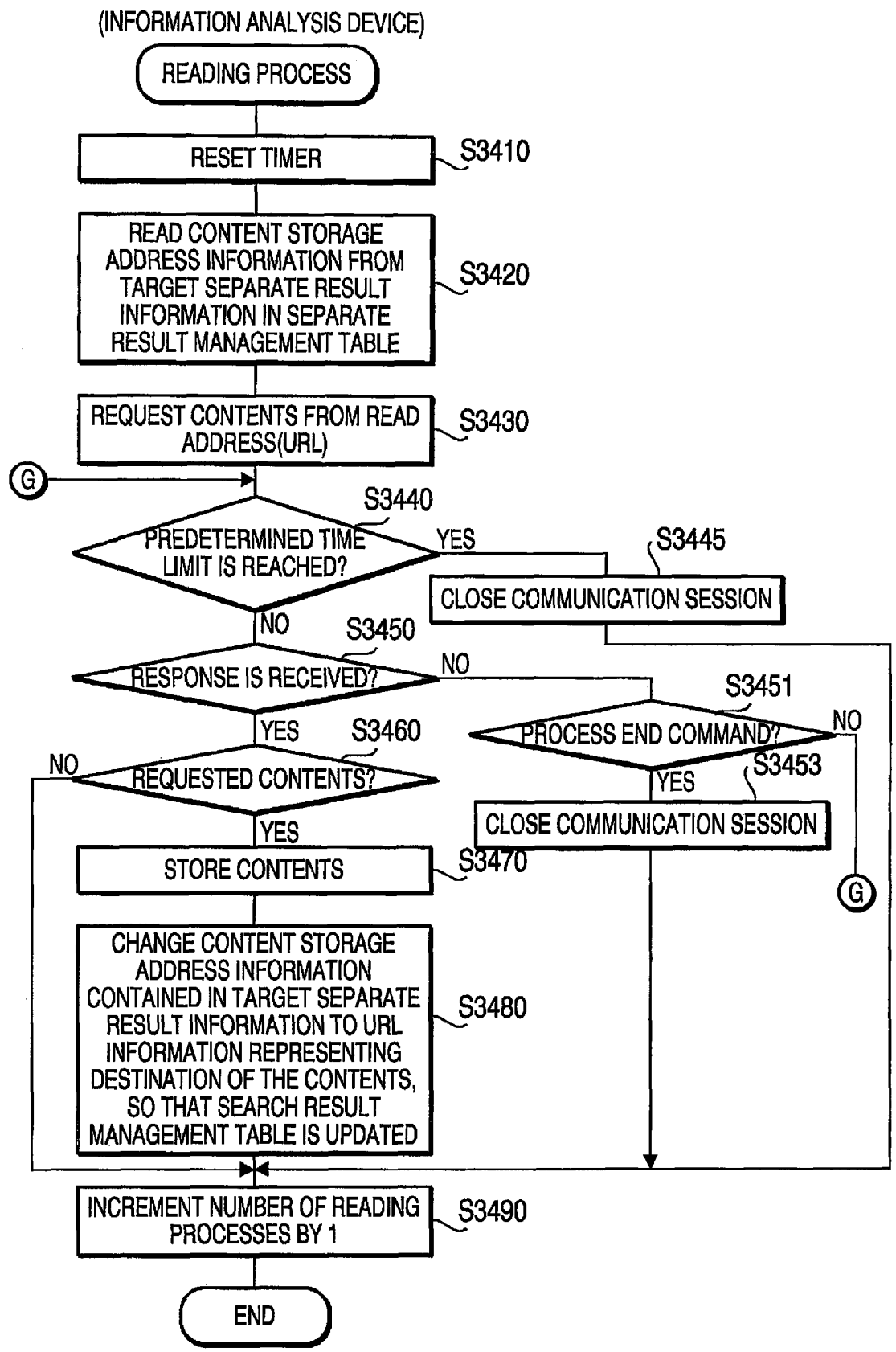

FIG. 42 is a flowchart illustrating a reading process executed by the information analysis device according to the second embodiment.

Figure 43:
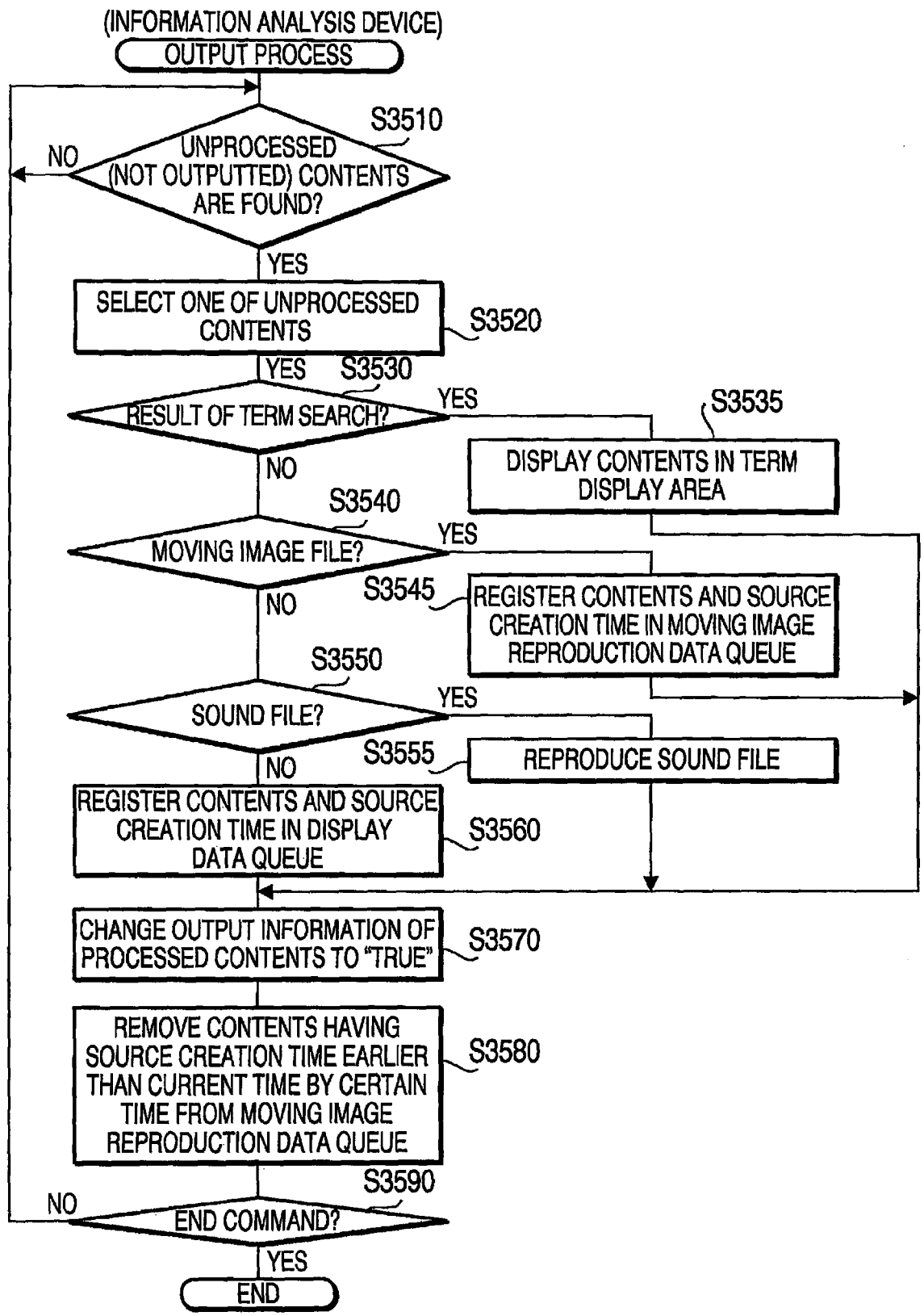

FIG. 43 is a flowchart illustrating an output process executed by the information analysis device according to the second embodiment.

Figure 44:
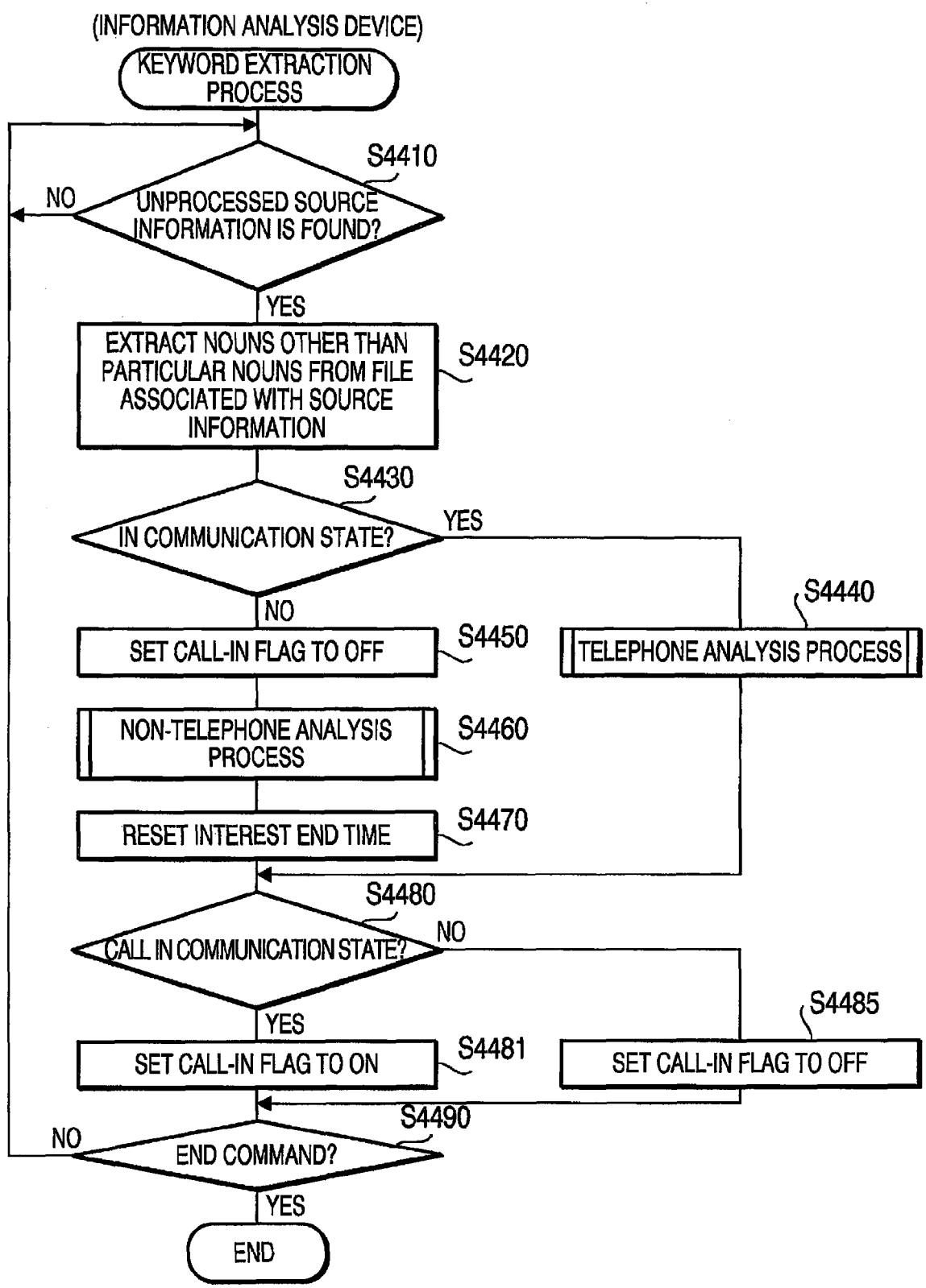

FIG. 44 is a flowchart illustrating a keyword extraction process executed by the information analysis device according to a third embodiment.

Figure 45:
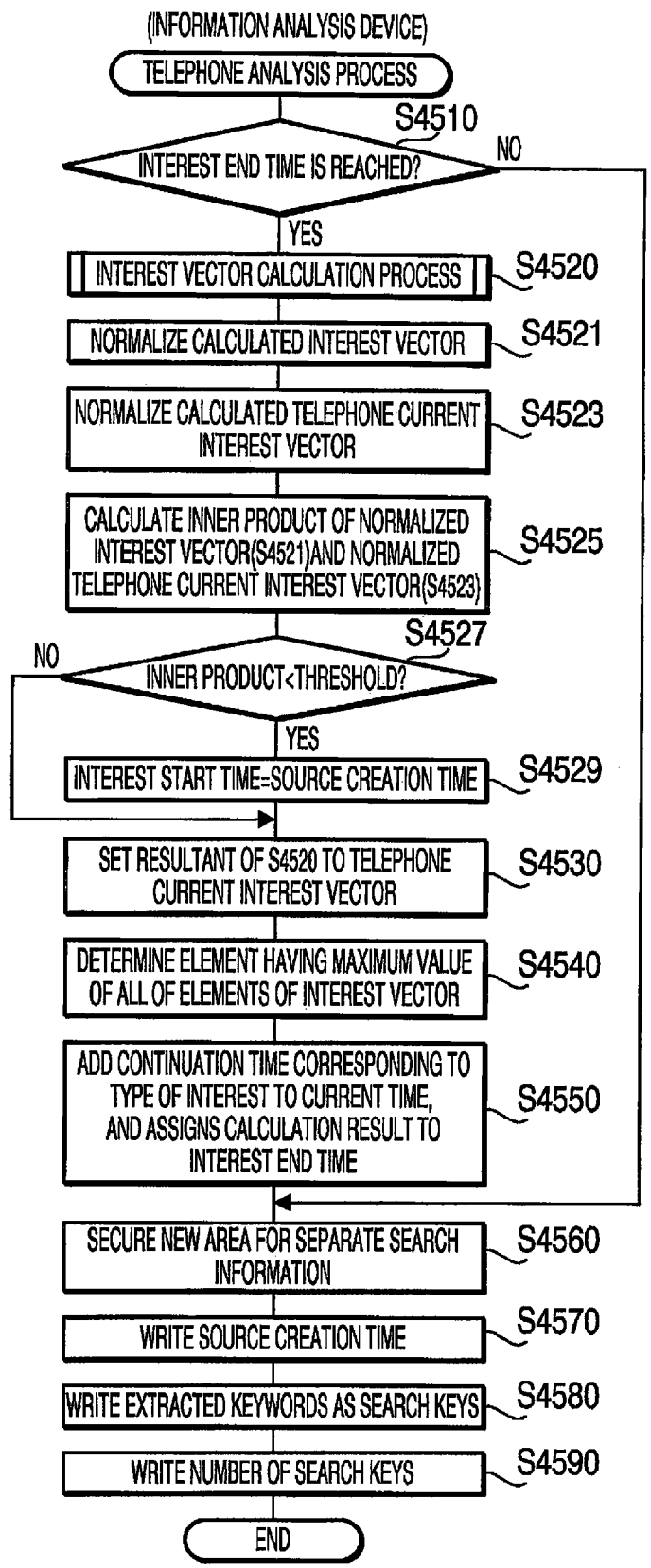

FIG. 45 is a flowchart illustrating a telephone analysis process executed by the information analysis device according to the third embodiment.

Figure 46:
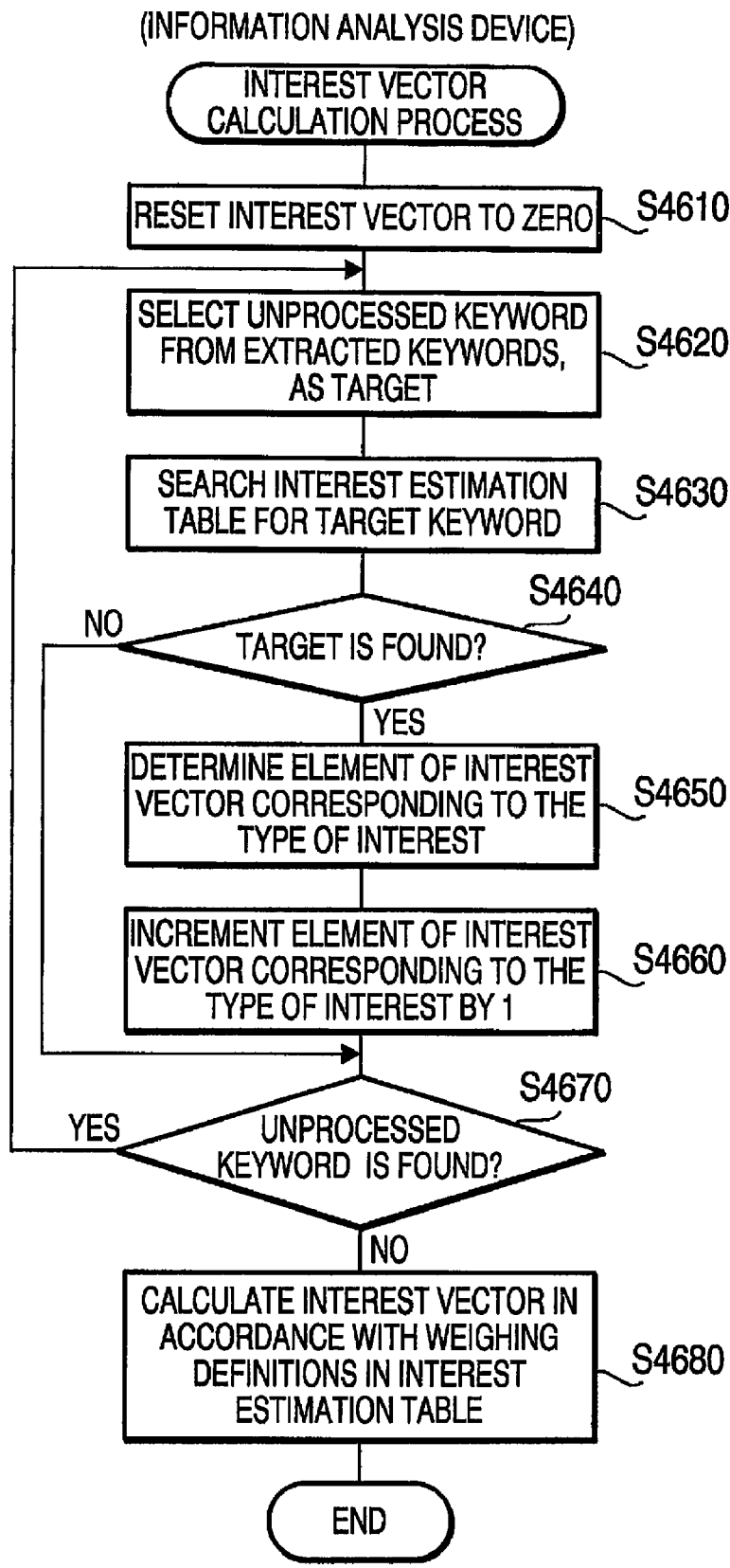

FIG. 46 is a flowchart illustrating an interest vector calculation process executed by the information analysis device according to the third embodiment.

FIG. 47 shows an example of a data structure of an interest estimation table according to the third embodiment.

FIG. 48 shows an example of a data structure of a search information management table according to the third embodiment.

Figure 49:
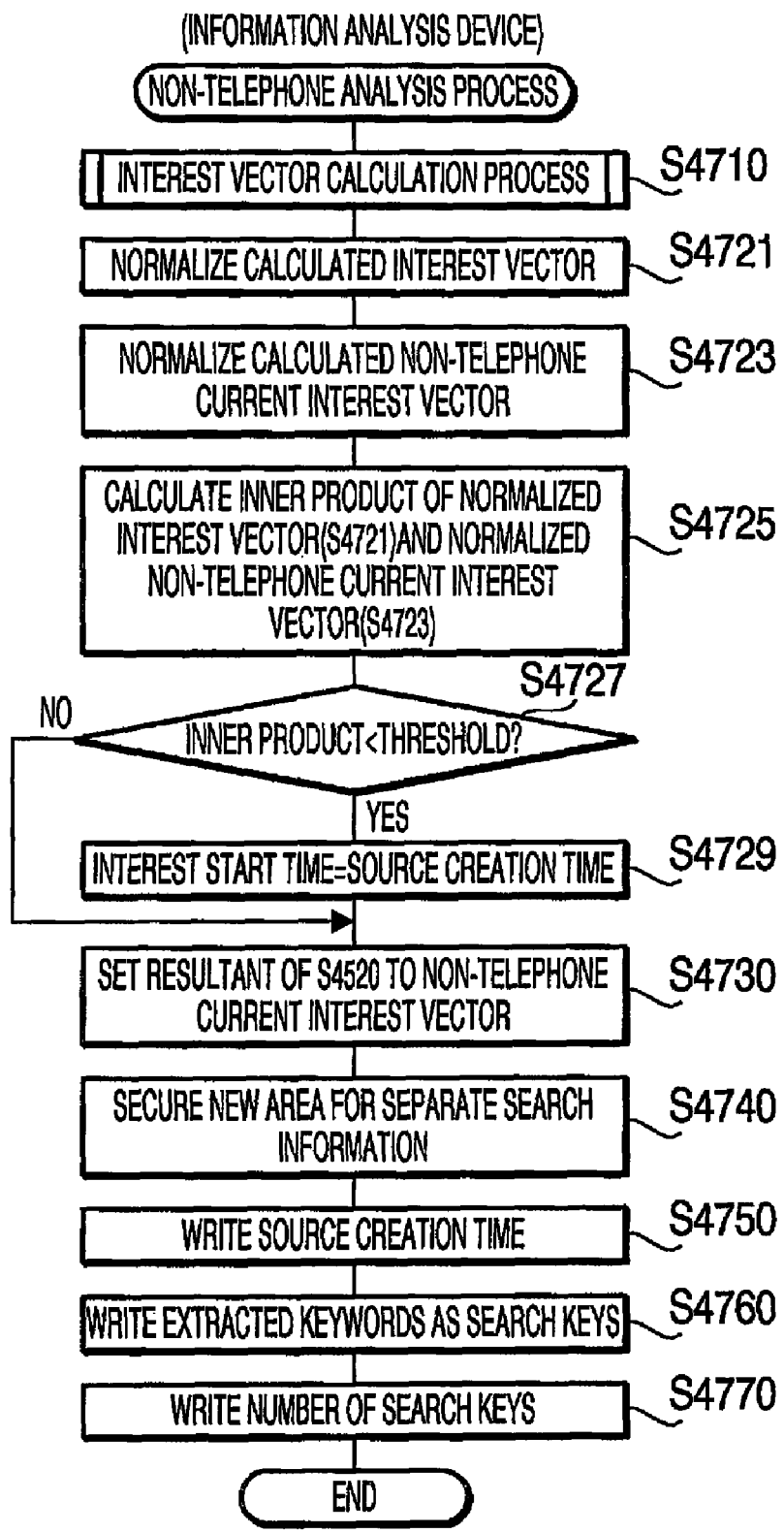

FIG. 49 is a flowchart illustrating a non-telephone analysis process executed by the information analysis device according to the third embodiment.

Figure 50:
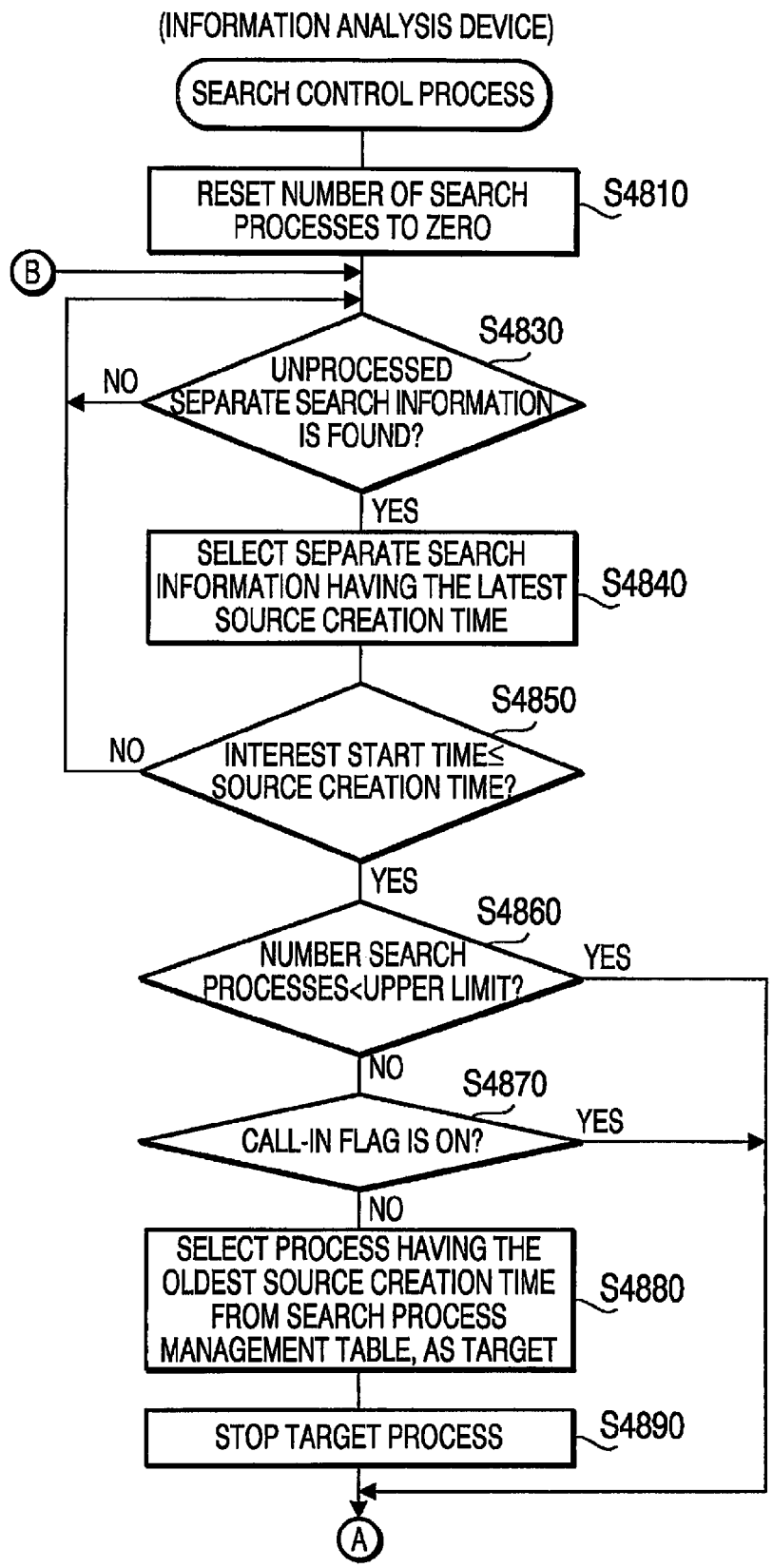
Figure 51:
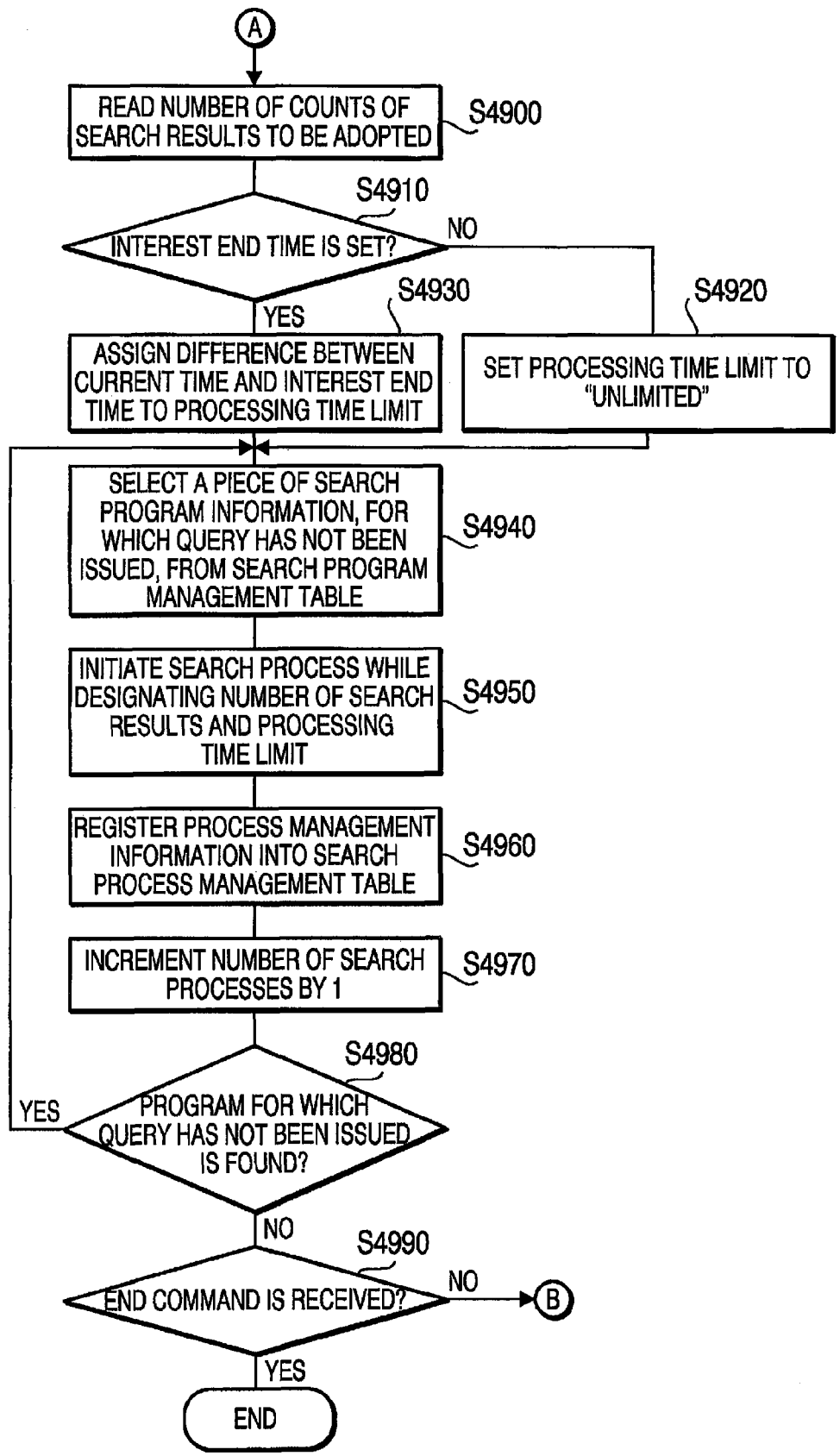

FIGS. 50 and 51 show a flowchart of a search control process executed by the information analysis device according to the third embodiment.

FIG. 52 shows an example of a data structure of a search process management table according to the third embodiment.

FIG. 53 shows an example of a data structure of a search program management table according to the third embodiment.

Figure 54:
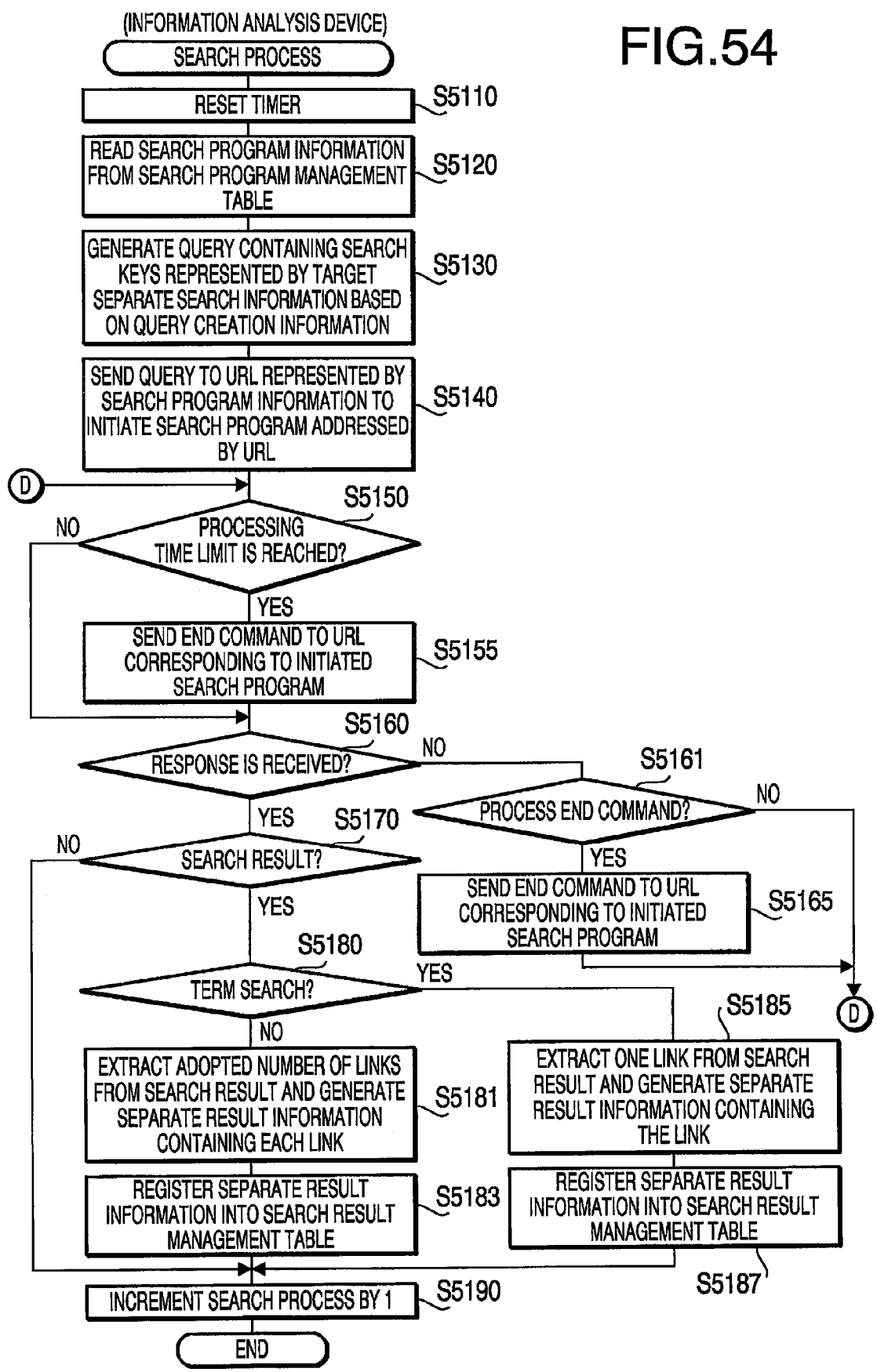

FIG. 54 is a flowchart illustrating a search process executed by the information analysis device according to the third embodiment.

FIG. 55 shows an example of a data structure of a search result management table according to the third embodiment.

Figure 56:
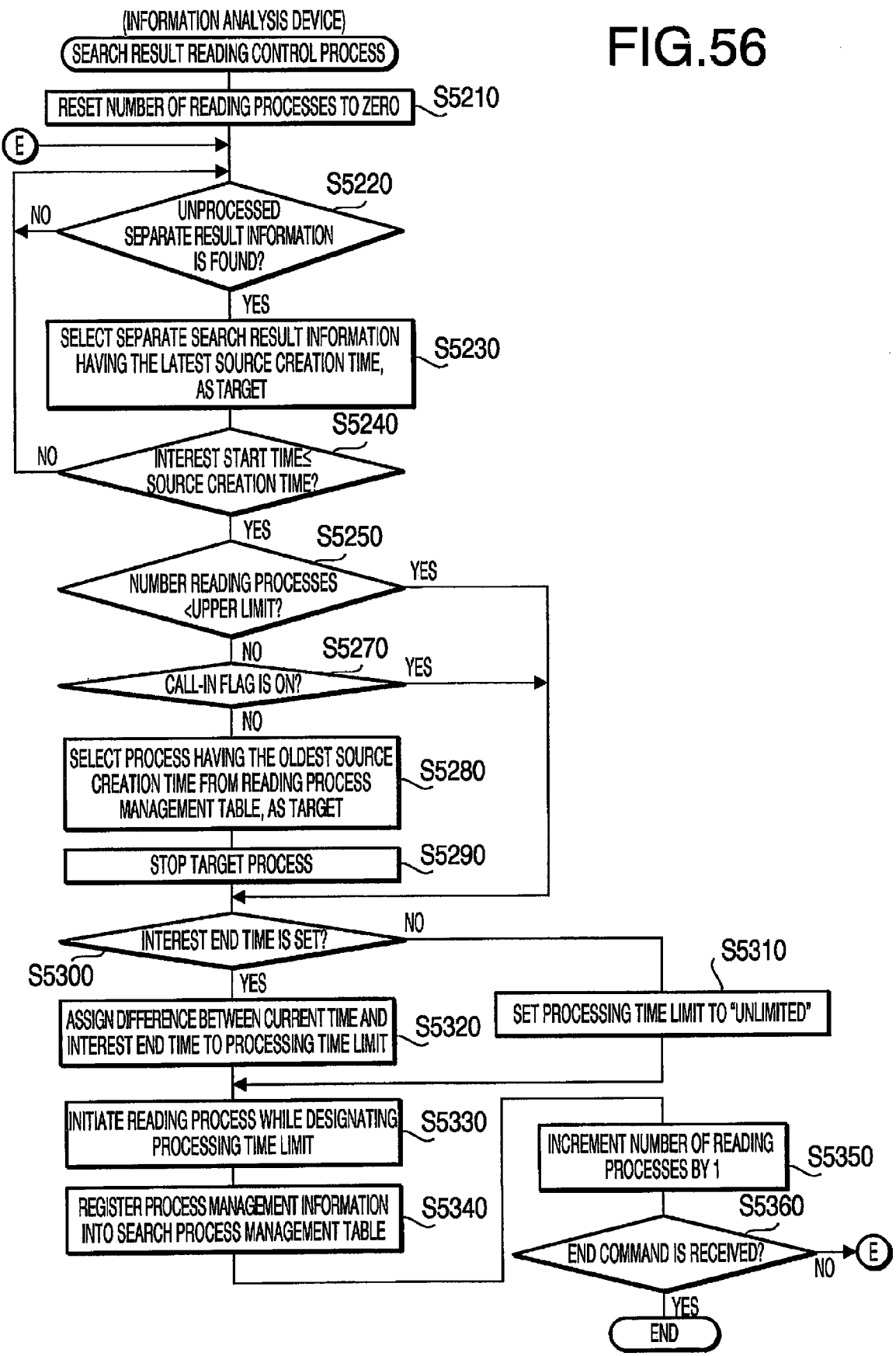

FIG. 56 is a flowchart illustrating a search result reading control process executed by the information analysis device according to the third embodiment.

FIG. 57 shows an example of a data structure of a reading process management table according to the third embodiment.

Figure 58:
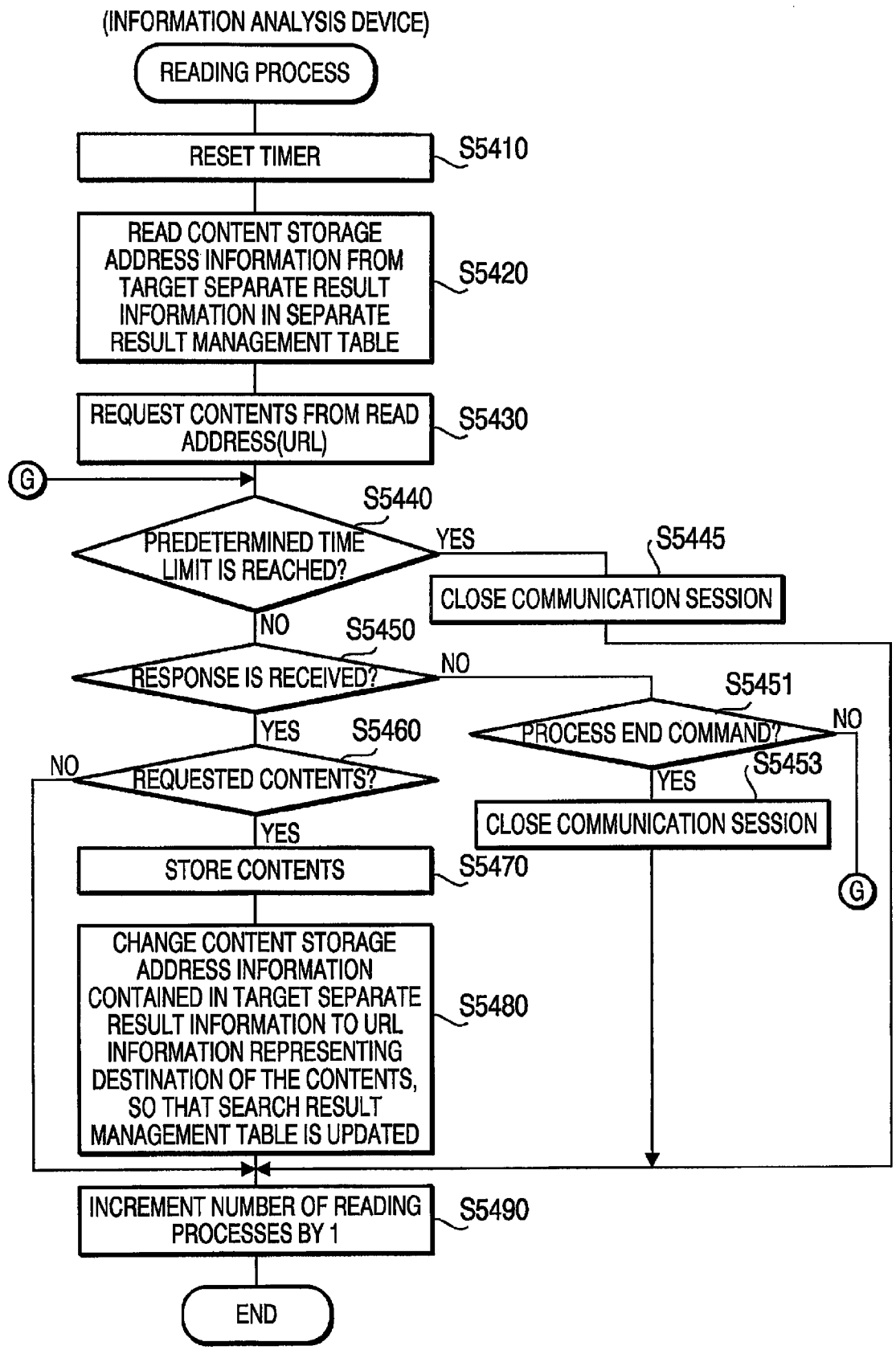

FIG. 58 is a flowchart illustrating a reading process executed by the information analysis device according to the third embodiment.

Figure 59:
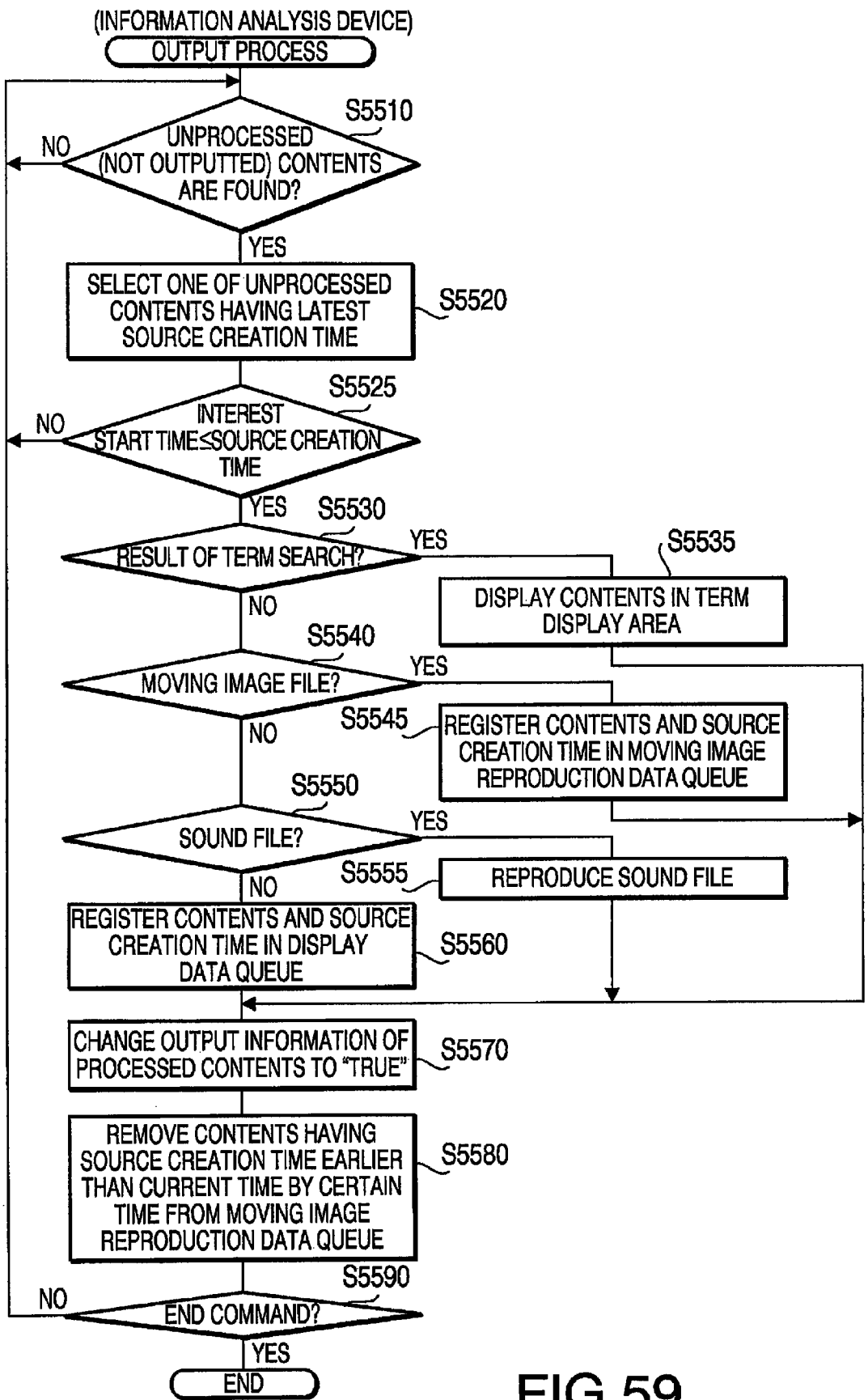

FIG. 59 is a flowchart illustrating an output process executed by the information analysis device according to the third embodiment.

Figure 60:
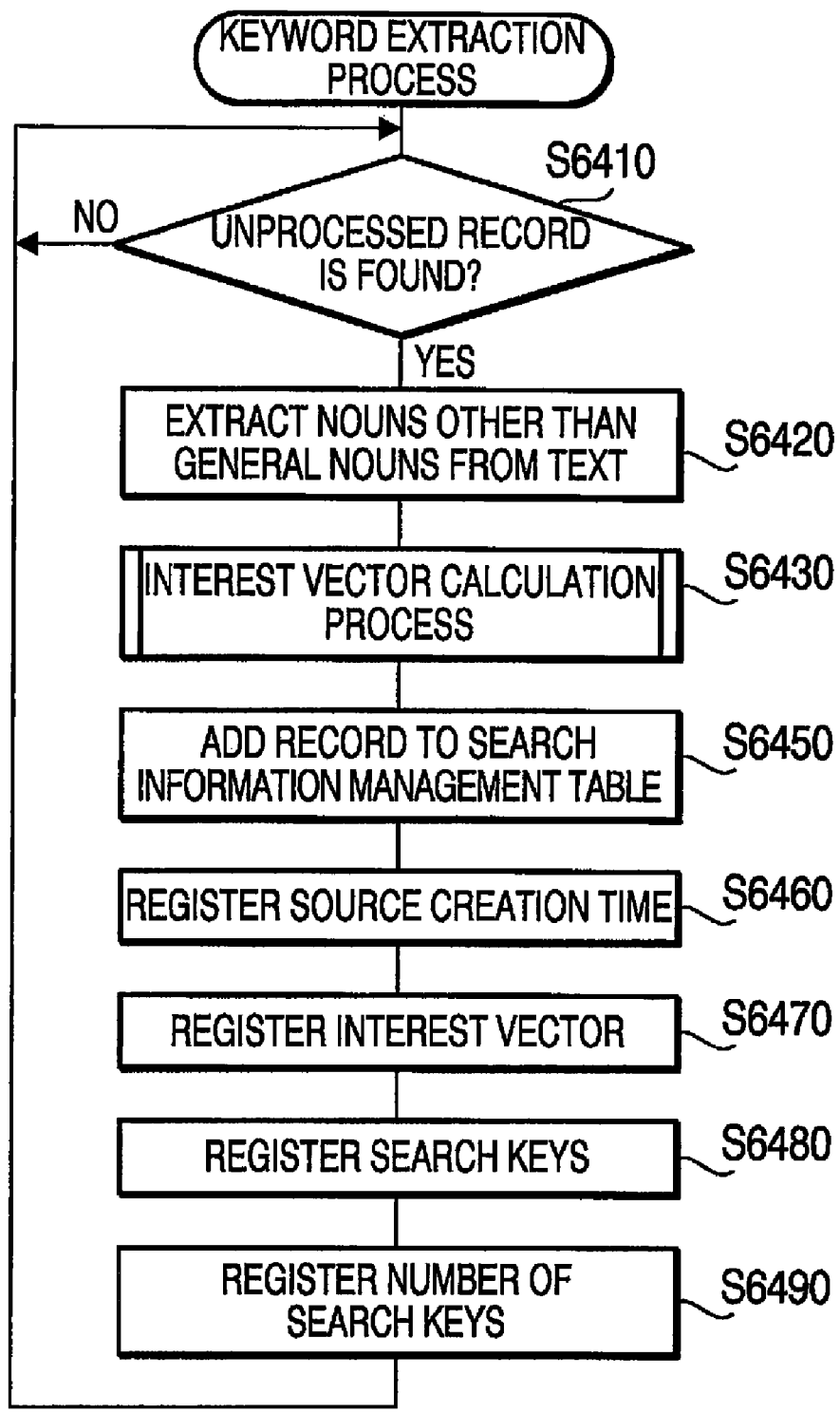

FIG. 60 is a flowchart illustrating a keyword extraction process executed by the information analysis device according to a fourth embodiment.

FIG. 61 shows an example of a data structure of a search information management table according to the fourth embodiment.

Figure 62:
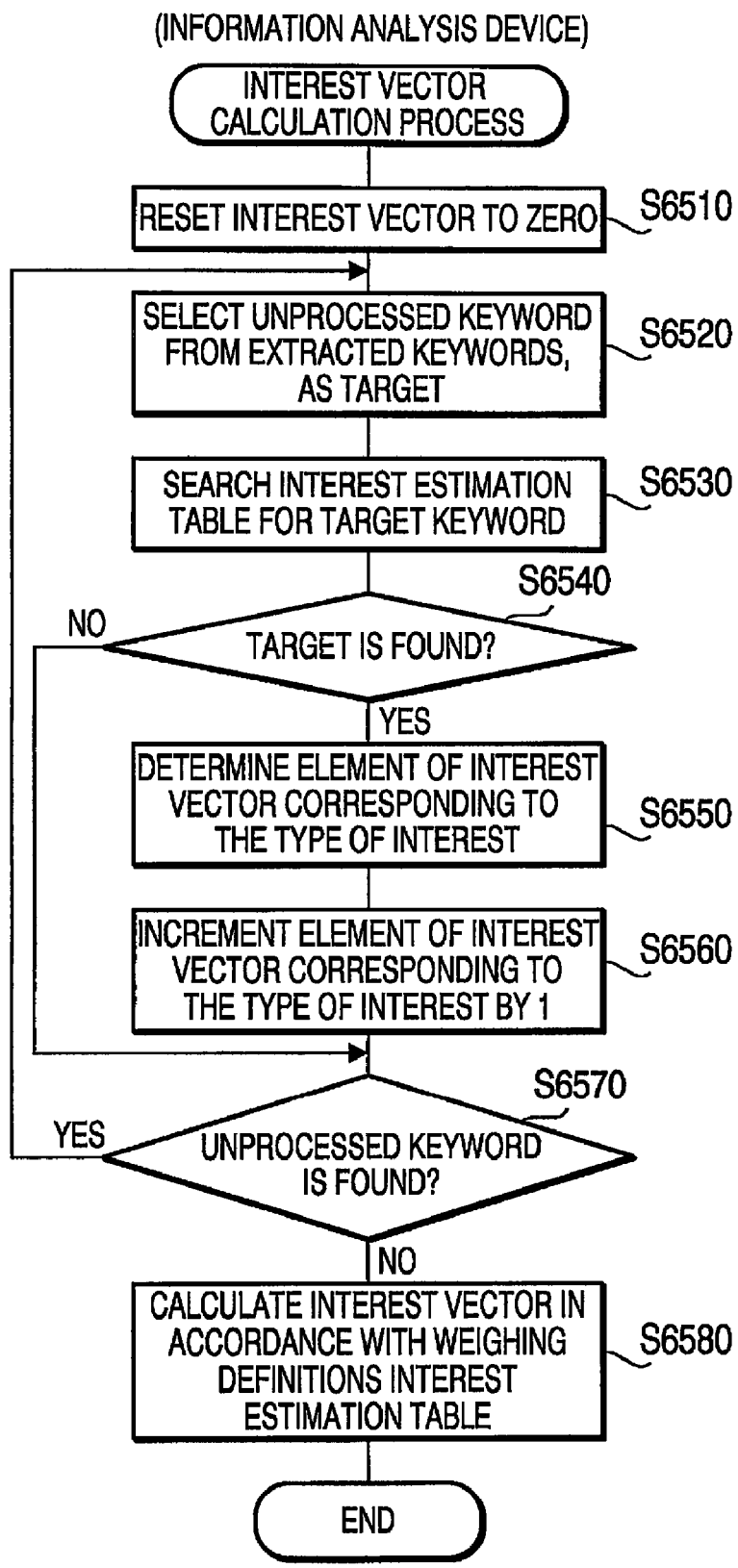

FIG. 62 is a flowchart illustrating an interest vector calculation process executed by the information analysis device according to the fourth embodiment.

FIG. 63 shows an example of a data structure of an interest estimation table according to the fourth embodiment.

Figure 64:
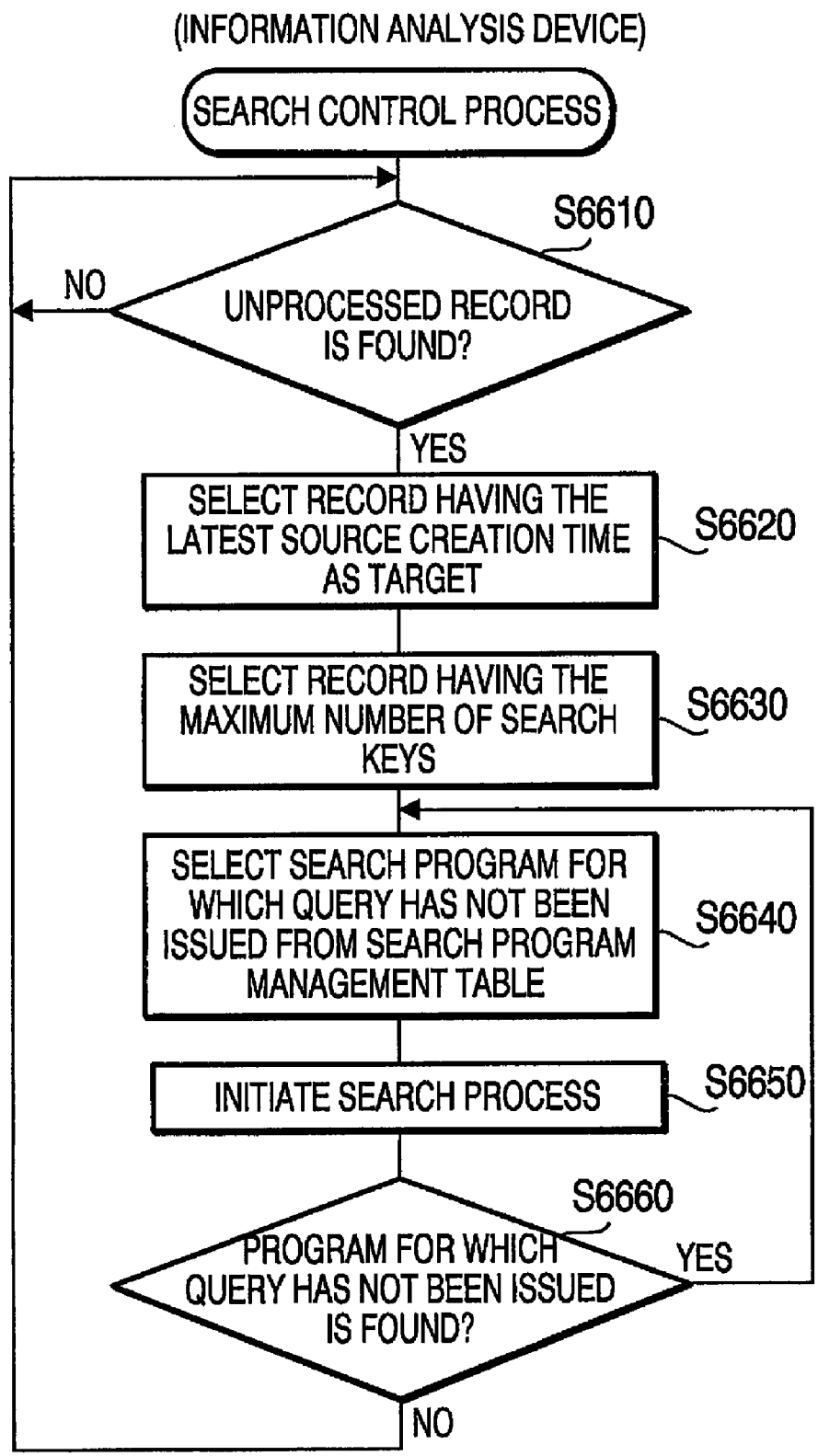

FIG. 64 is a flowchart illustrating a search control process executed by the information analysis device according to the fourth embodiment.

FIG. 65 shows an example of a data structure of a search program management table according to the fourth embodiment.

Figure 66:
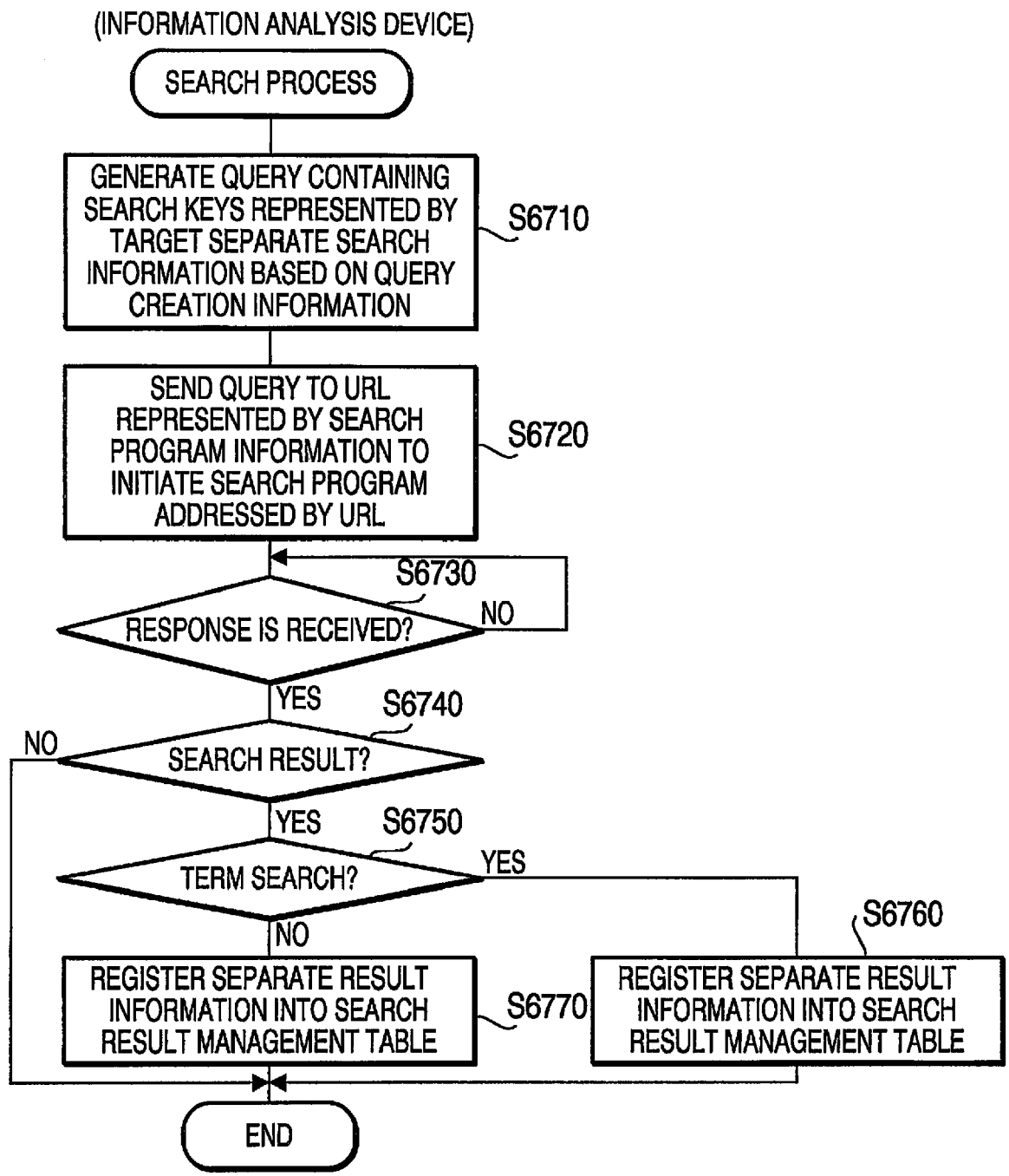

FIG. 66 is a flowchart illustrating a search process executed by the information analysis device according to the fourth embodiment.

FIG. 67 shows an example of a data structure of a search result management table according to the fourth embodiment.

Figure 68:
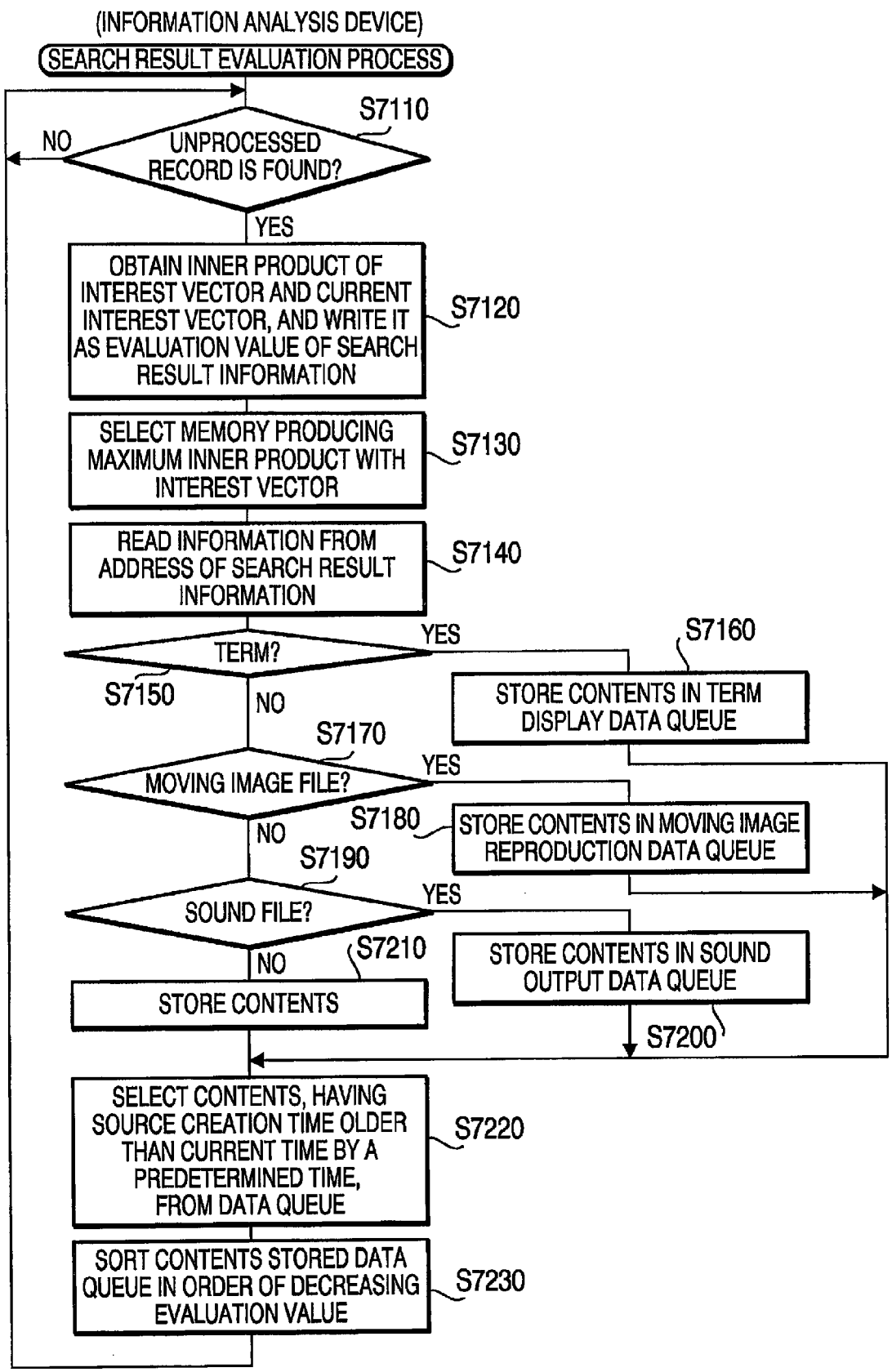

FIG. 68 is a flowchart illustrating a search result evaluation process executed by the information analysis device according to the fourth embodiment.

FIG. 69A shows a data structure of a current interest table according to the fourth embodiment.

FIG. 69B shows an example of a data structure of a memory interest table according to the fourth embodiment.

Figure 70:
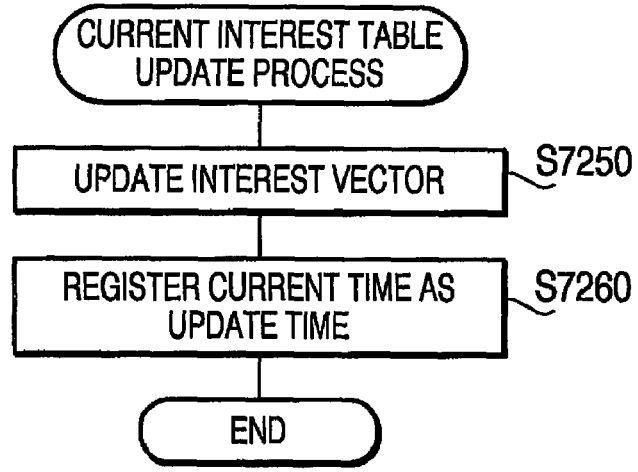

FIG. 70 is a flowchart illustrating a current interest table update process executed by the information analysis device according to the fourth embodiment.

Figure 71:
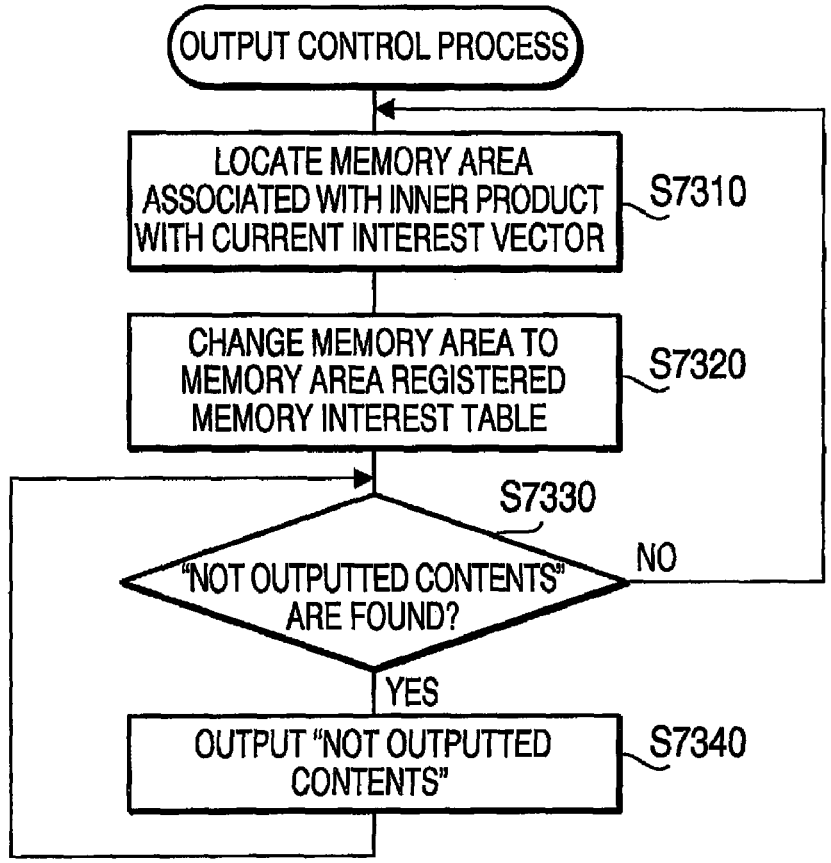

FIG. 71 is a flowchart illustrating an output process executed by the information analysis device according to the fourth embodiment.

Figure 72:
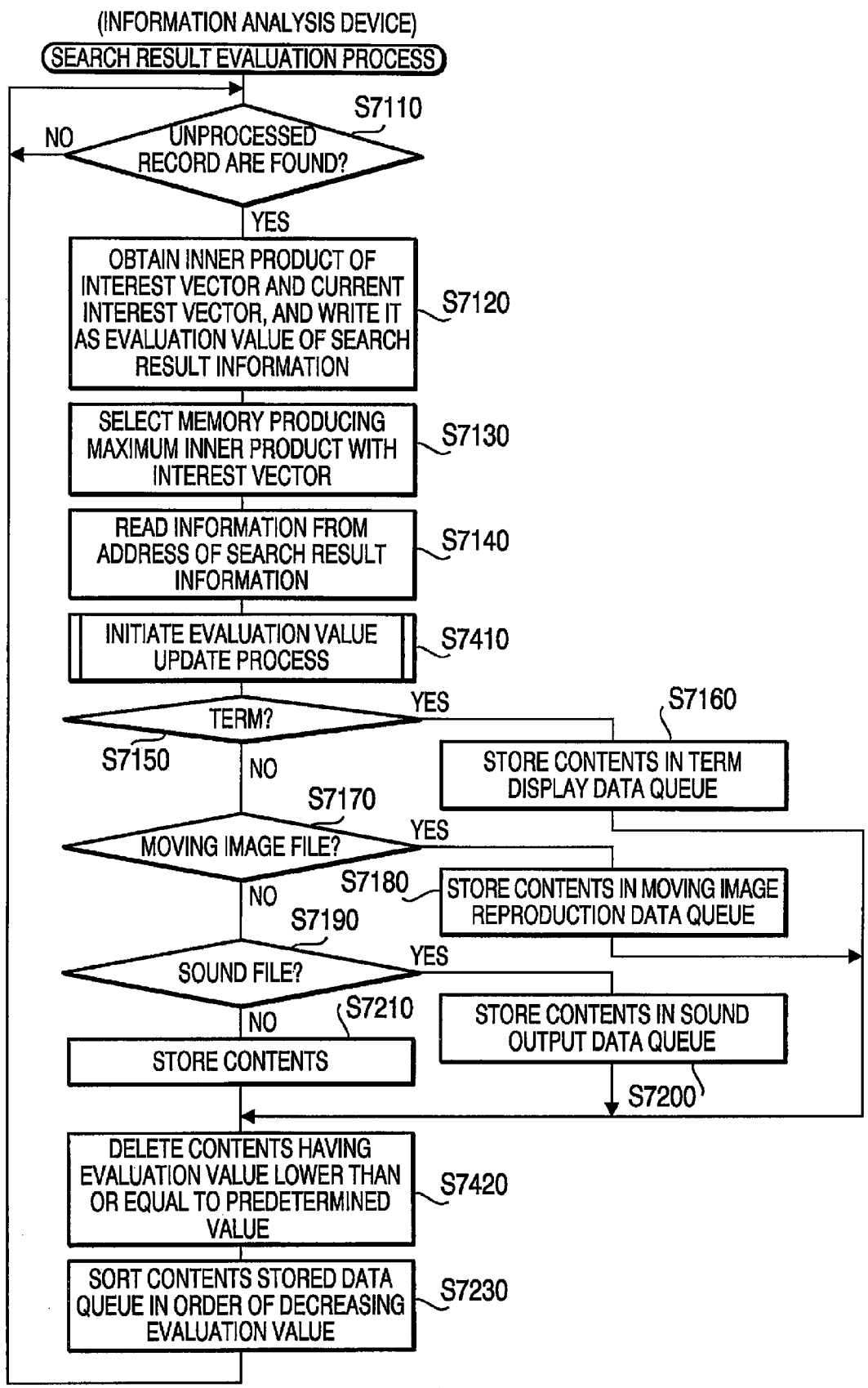

FIG. 72 is a flowchart illustrating a variation of the search result evaluation process of the fourth embodiment.

Figure 73:
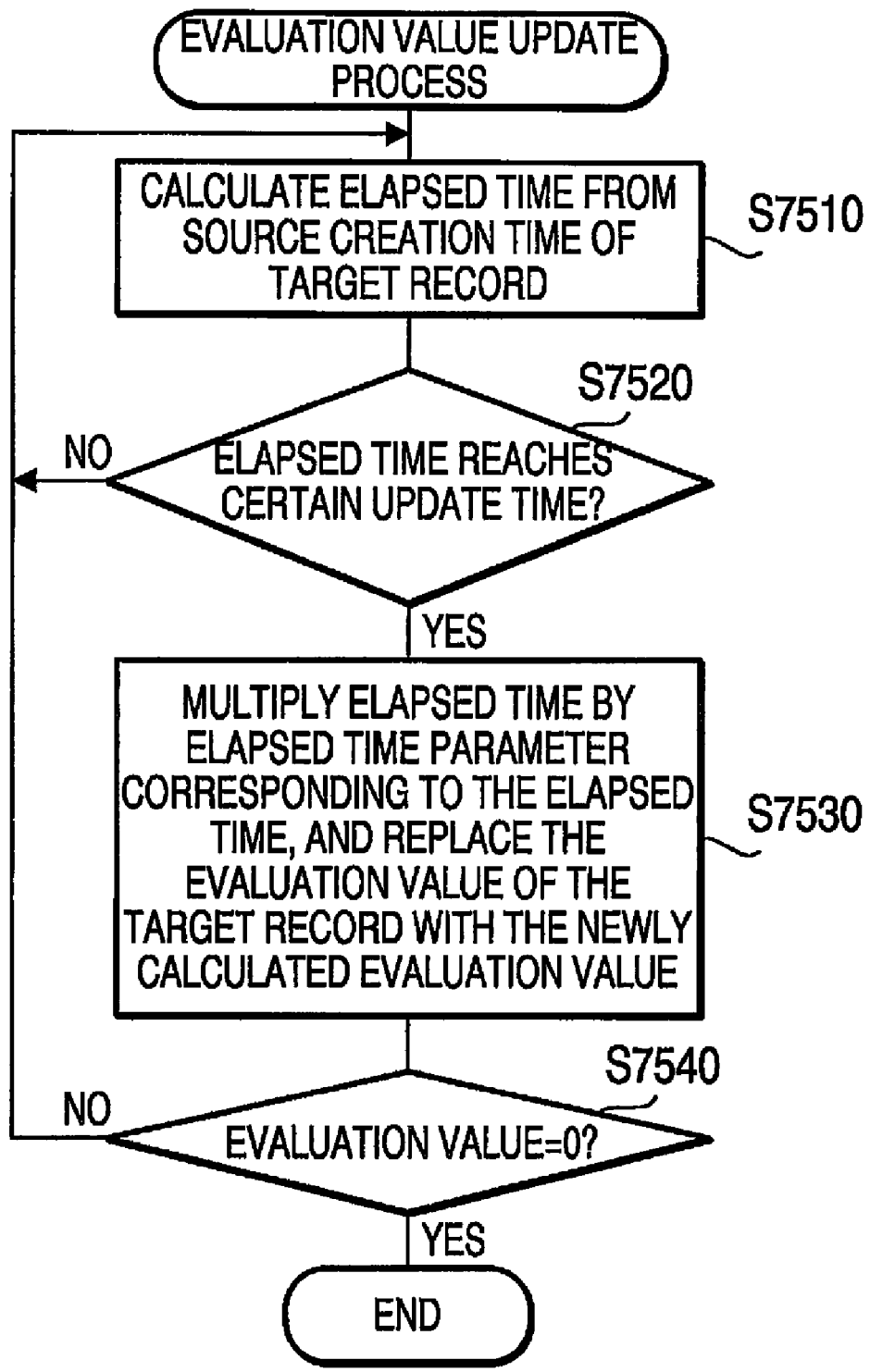

FIG. 73 is a flowchart illustrating an evaluation value update process.

FIG. 74 shows an elapsed time parameter table stored in the information analysis device.

Figure 75:
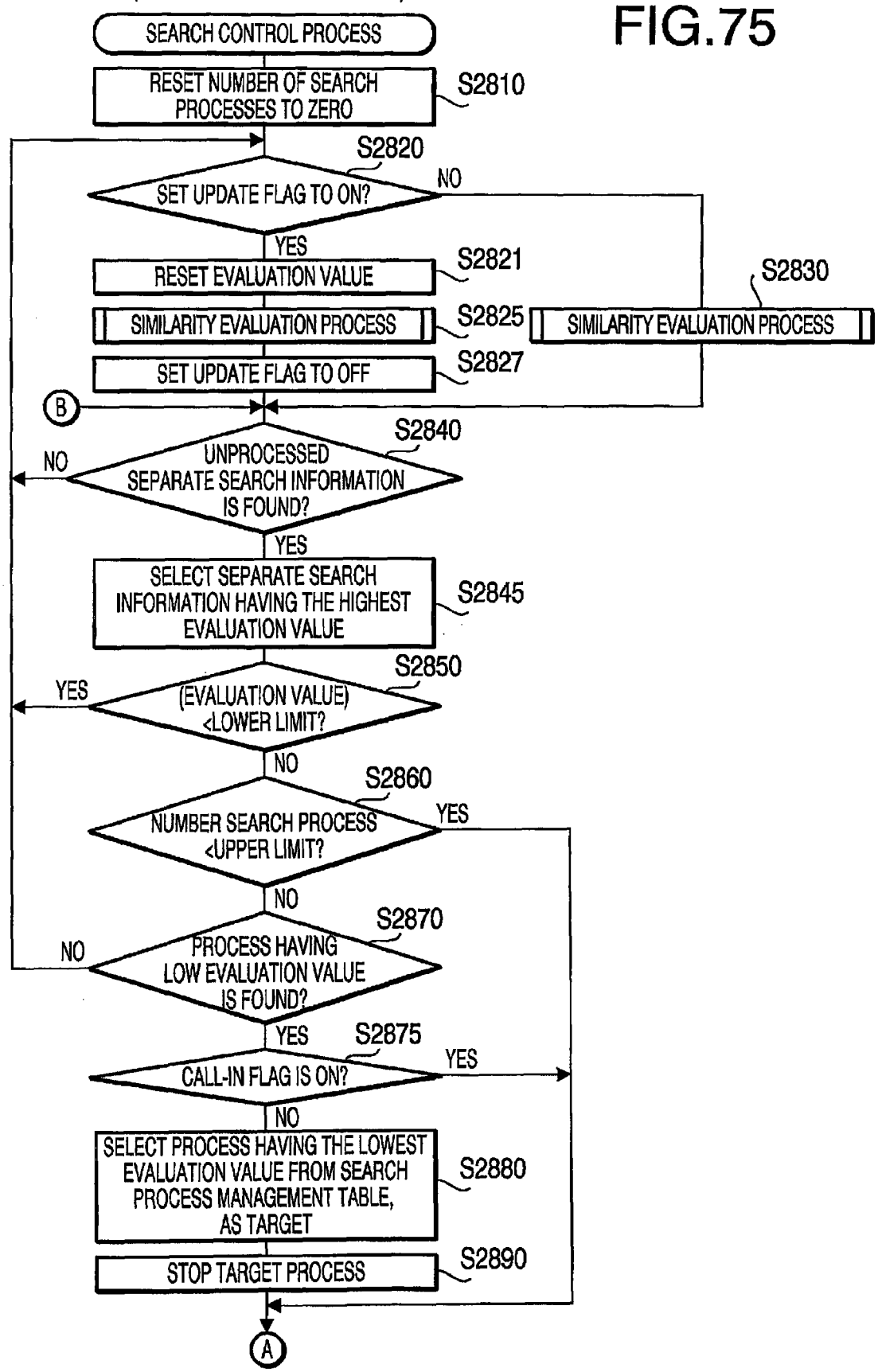
Figure 76:
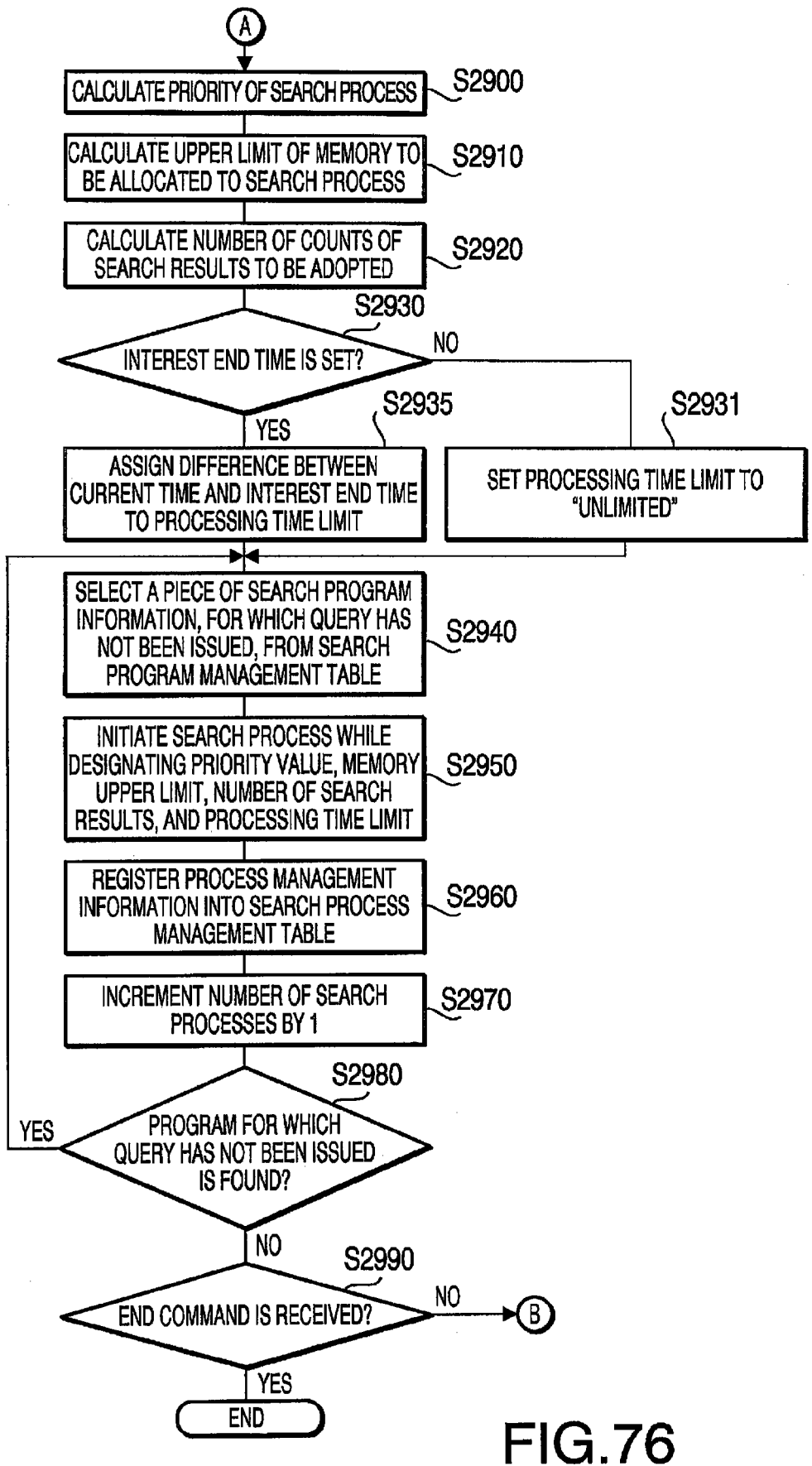

FIGS. 75 and 76 show a search control process according to a fifth embodiment.

Figure 77:
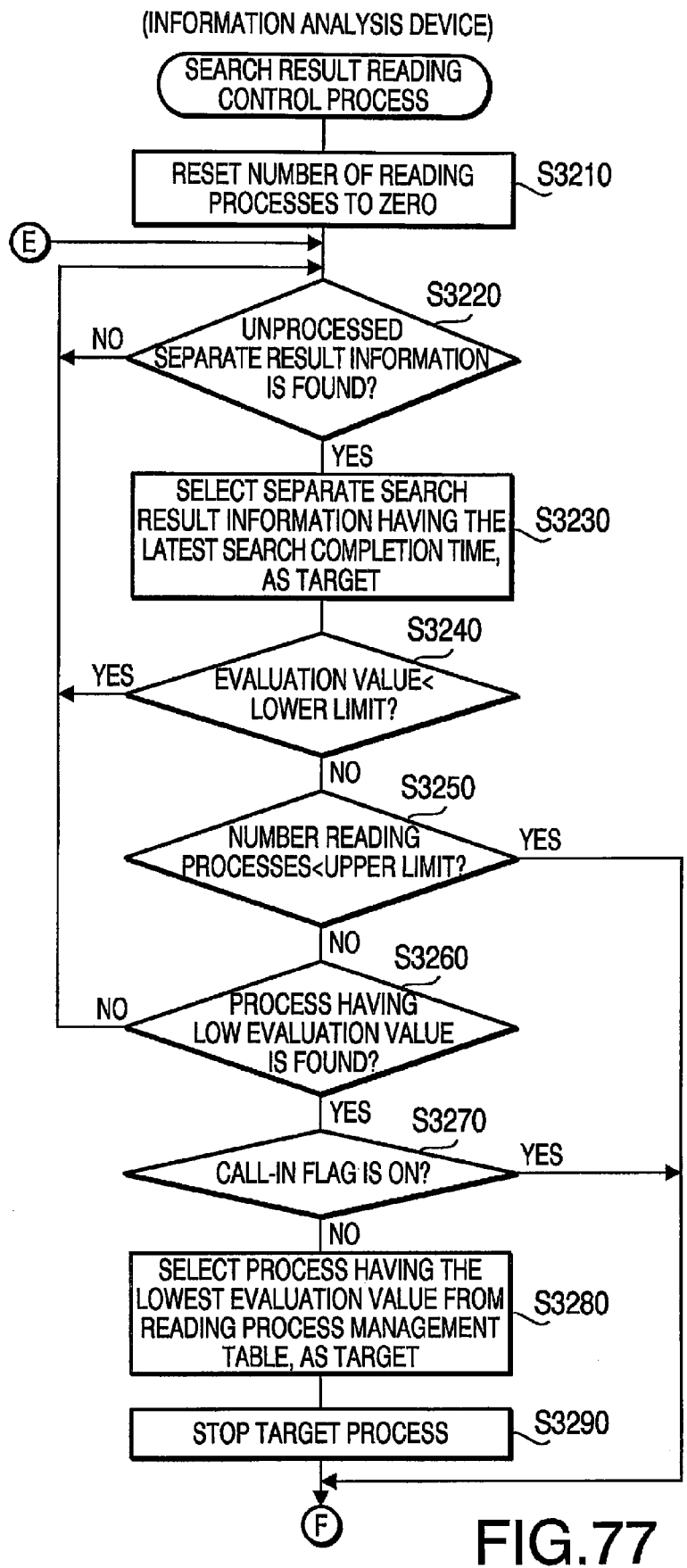
Figure 78:
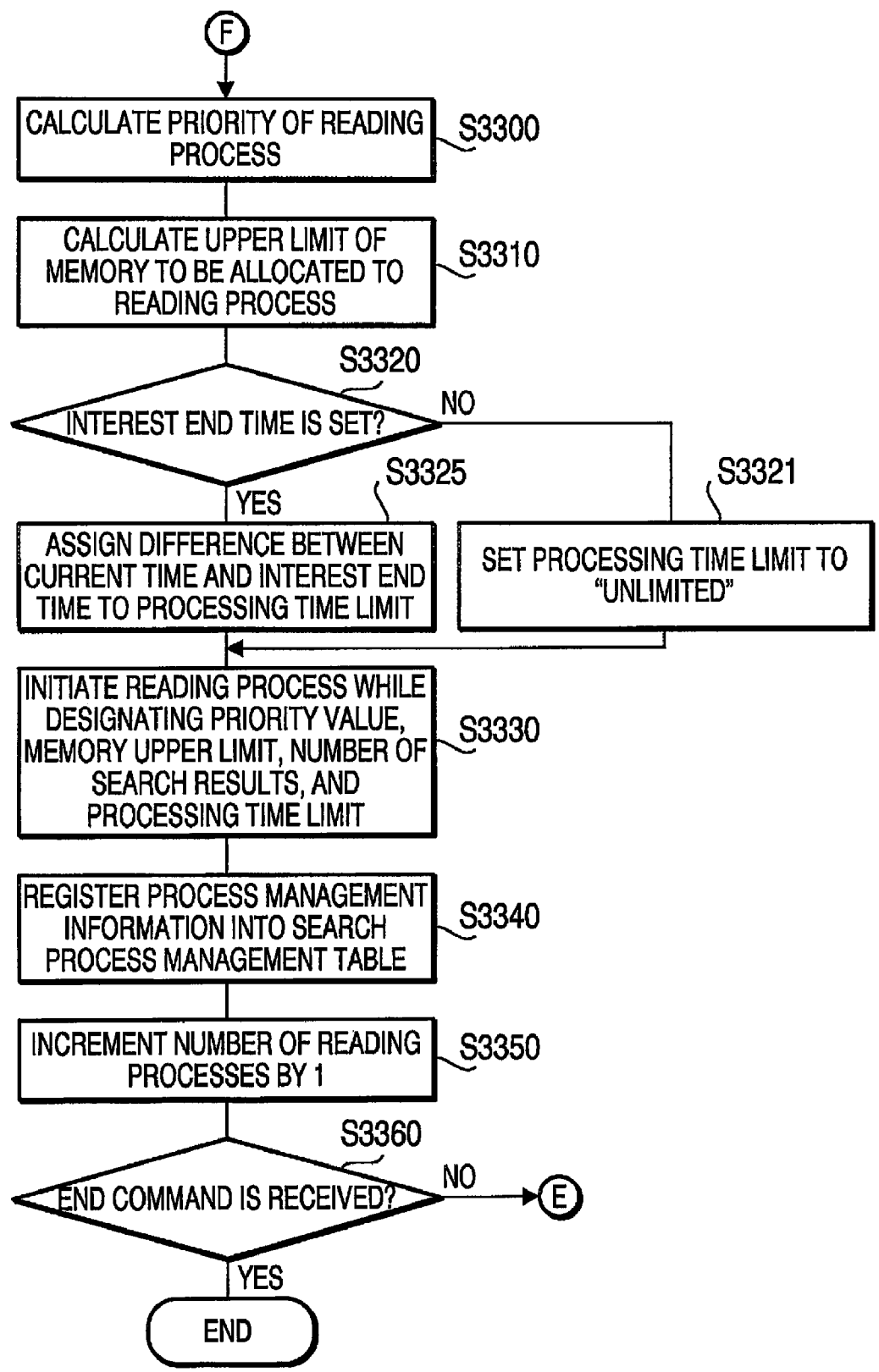

FIGS. 77 and 78 show a search result reading control process configured as a variation of the search result reading control process shown in FIGS. 39 and 40.

FIG. 79 shows an example of a data structure of a search result management table according to a sixth embodiment.

Figure 80:
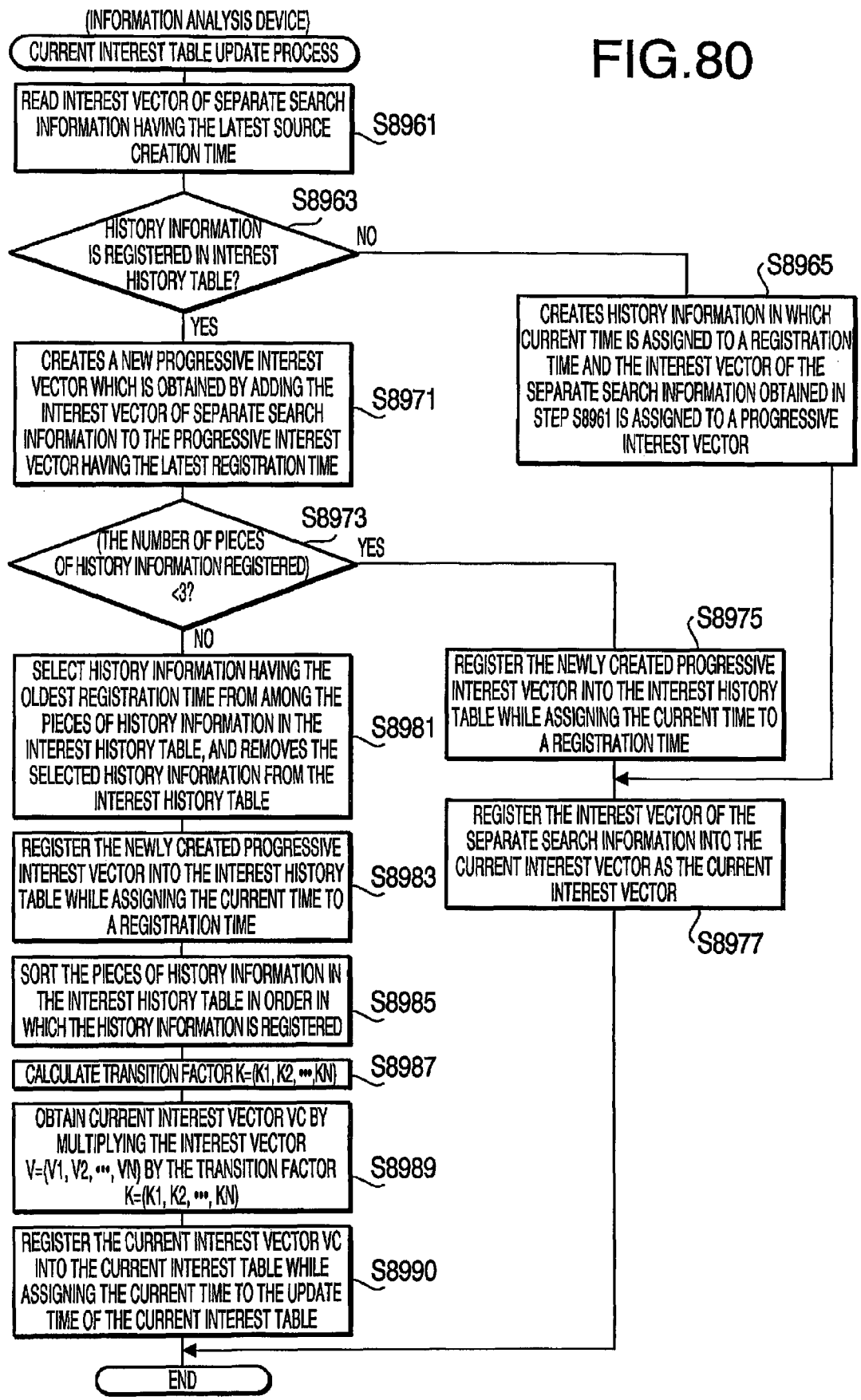

FIG. 80 is a flowchart illustrating a current interest table update process according to the sixth embodiment.

FIG. 81A shows an example of a data structure of an interest history table according to the sixth embodiment.

FIG. 81B shows an example of a data structure of a current interest table according to the sixth embodiment.

Figure 82:
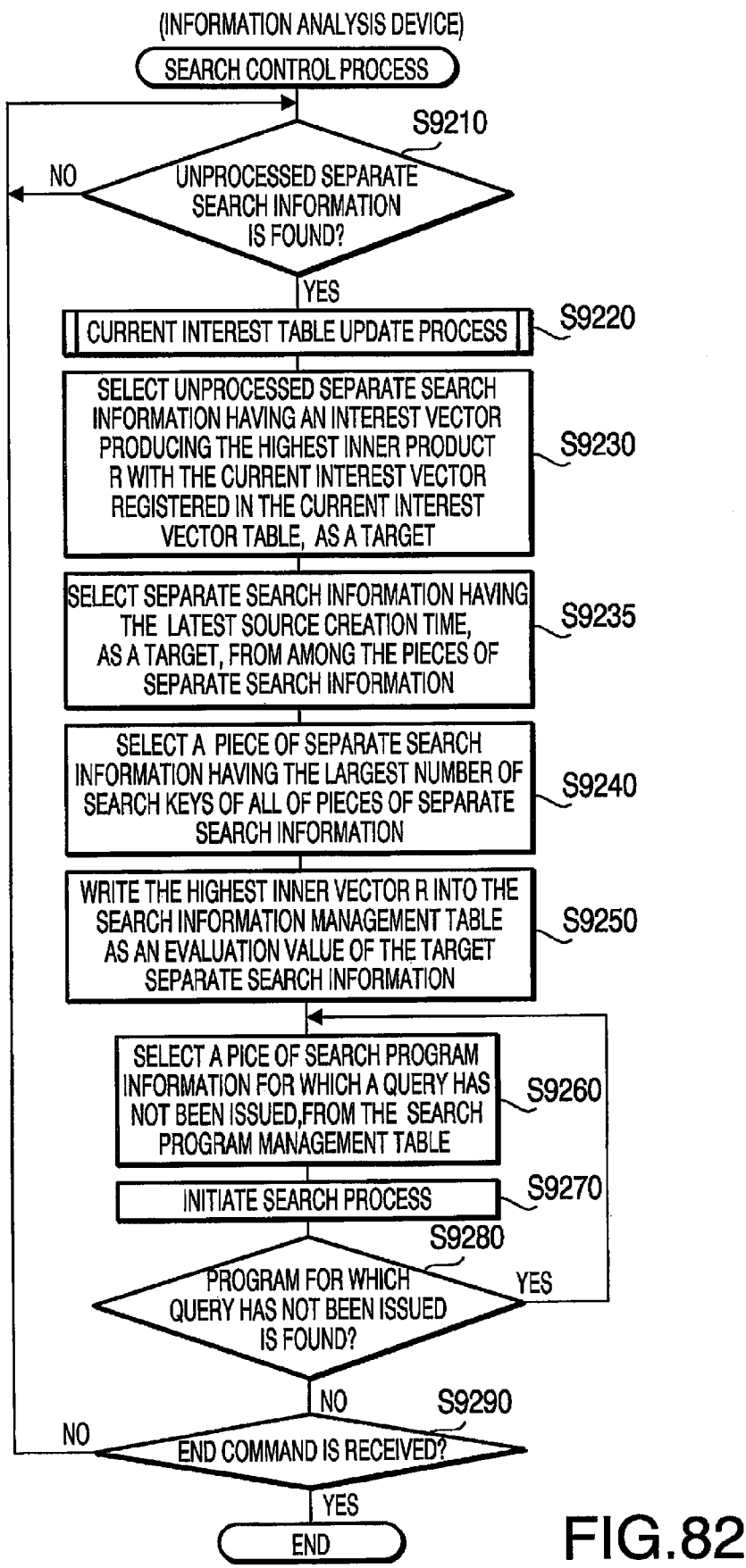

FIG. 82 is a flowchart illustrating a search control process configured as a variation of the sixth embodiment.

FIG. 83 is an example of a data structure of the search information management table configured as a variation of the sixth embodiment.

Figure 84:
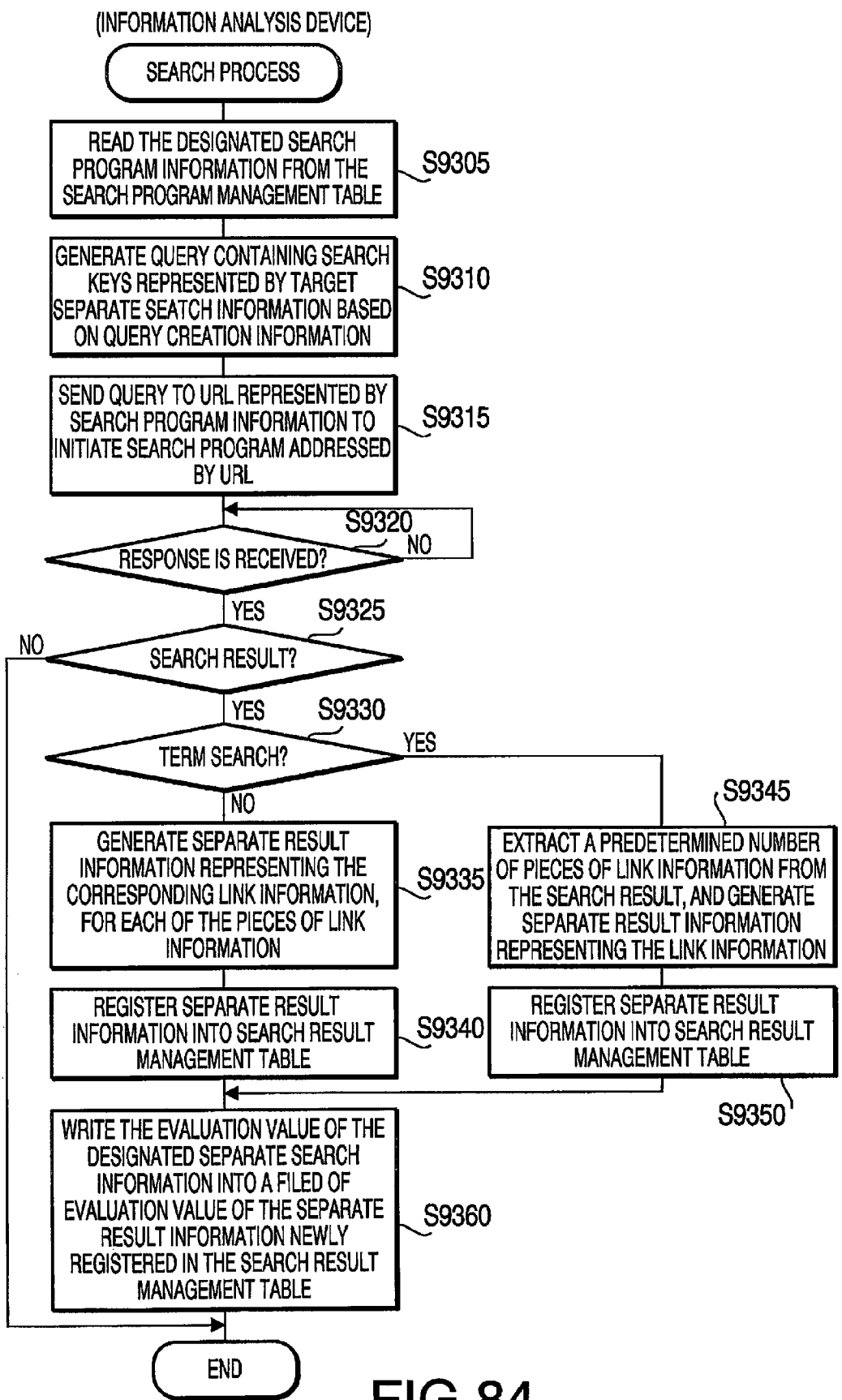

FIG. 84 is a flowchart illustrating a search process configured as a variation of the sixth embodiment.

Figure 85:
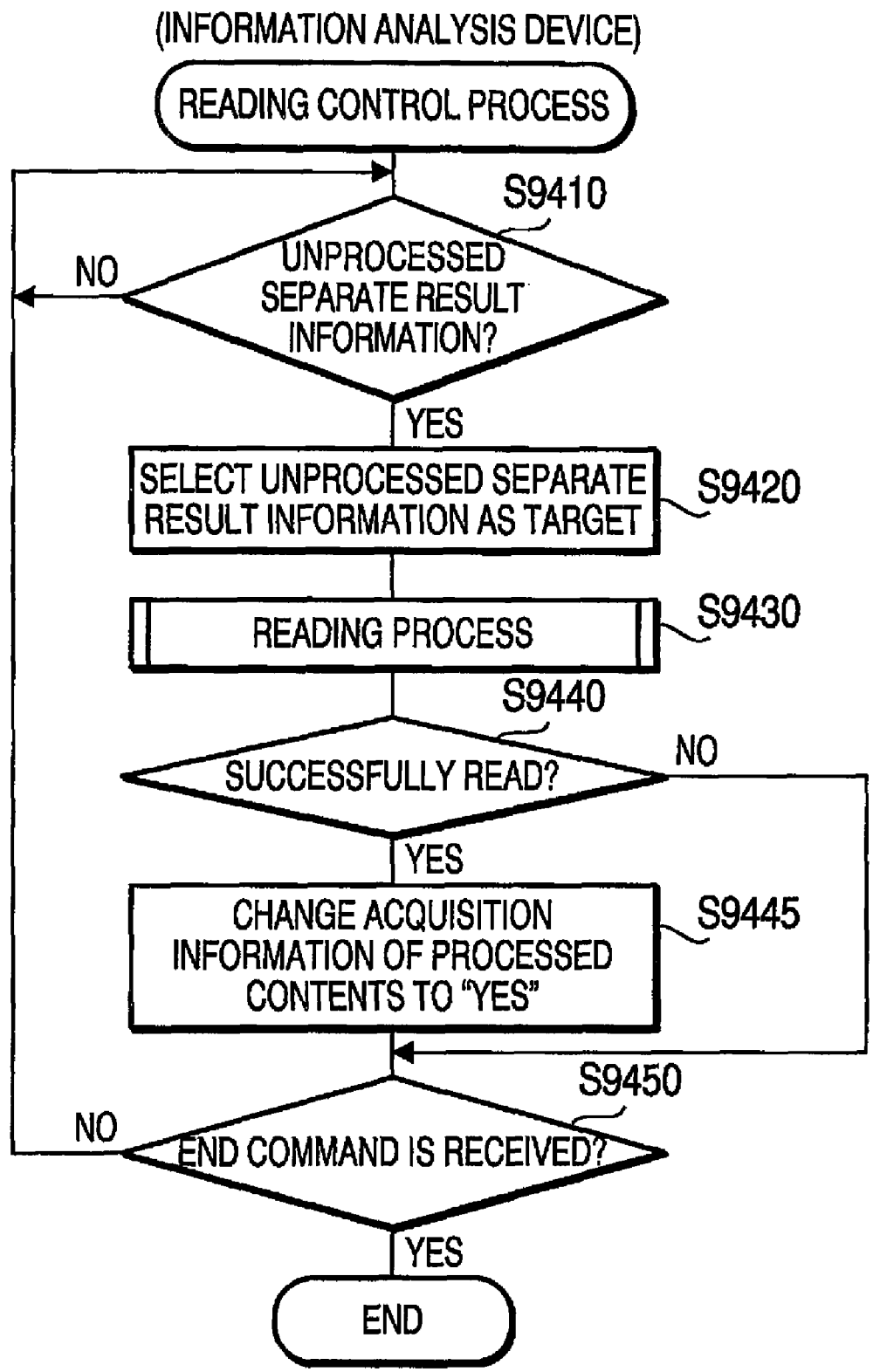

FIG. 85 is a flowchart illustrating a reading process configured as a variation of the sixth embodiment.

DETAILED DESCRIPTION

General Overview

According to an aspect of the invention, there is provided a content providing system, which is provided with a data acquisition unit configured to obtain data inputted and/or outputted through a user interface which is included in an information processing device, an interest estimation unit that generates interest information representing a user's interest by estimating the user's interest based on the data acquired by the data acquisition unit, and a latest estimation result saving unit that saves latest interest information generated by the interest estimation unit so that contents reflecting the latest interest information can be provided to a user.

Since the latest interest information is used to obtain contents, it becomes possible to provide contents reflecting the user's latest interest preferentially.

Optionally, the content providing system may include a content acquisition unit that obtains contents corresponding to the data if the data acquisition unit obtains the data, a content output unit configured to output contents obtained by the content acquisition unit, a similarity evaluation unit that evaluates similarity between the user's latest interest represented by the latest interest information saved by the latest estimation result saving unit and the user's interest represented by the interest information associated with the data acquired by the data acquisition unit, and a content output control unit that controls the content output unit based on the similarity generated by the similarity evaluation unit so that contents corresponding to the data associated with the interest information having higher similarity with the latest interest information are outputted preferentially.

Since a current user's interest to contents is evaluated, it becomes possible to provide contents, to which a user has currently a high interest, to a user preferentially. It is also possible to prevent contents, for which a user's interest may have declined, from being provided to the user.

Still optionally, the content output control unit may control the content output unit so that contents are outputted in decreasing order of similarity evaluated by the similarity evaluation unit.

Since the contents are provided to the user in order in which the user's interest decreases, it is possible to provide contents to which the user would have a high interest promptly.

Still optionally, the content output control unit may control the content output unit so that only contents corresponding to the interest information having the similarity higher than or equal to a predetermined level are outputted.

With this configuration, it is possible to provide contents matching the user's interest. That is, it is possible to provided useful contents to the user.

Still optionally, the latest estimation result saving unit may save the latest estimation information in such a manner that the latest estimation information is not updated for a certain time period determined in accordance with a type of the user's interest corresponding to the latest estimation information.

It should be noted that there is a case where a user's interest stays unchanged. In such a situation, it is preferable that the evaluation is not made frequently. Since the previously generated interest information is maintained while the estimation is stopped, it is possible to prevent the evaluation from being made excessively. It is also possible to provide appropriate contents stably.

Still optionally, the content acquisition unit may extract a keyword from the data and may obtain the contents relating to the extracted keyword.

With this configuration, it is possible to prevent undesired contents from being obtained, and therefore an amount of data (contents) to be sent to a content data based can be reduced.

Still optionally, the data acquisition unit, the interest estimation unit, the latest estimation result saving unit, the content acquisition unit, the content output unit, the similarity evaluation unit and the content output control unit may operate concurrently in cooperation with each other.

Since these units operate concurrently, high efficiency of use of the system is maintained.

In an example, the content providing system may further include a providing unit that obtains contents corresponding to the data and outputs the obtained contents, a data storage unit that stores the interest information and the data each time the data acquisition unit acquires the data, while associating the interest information with the data, and a similarity evaluation unit that evaluates similarity between the user's latest interest represented by the latest interest information saved by the latest estimation result saving unit and the user's interest represented by the interest information associated with the data acquired by the data acquisition unit. In this configuration, the providing unit preferentially selects the data associated with the interest information having higher similarity from pieces of data stored by the data storage unit, and obtains contents corresponding to the selected data.

Since a current user's interest to contents is evaluated, it becomes possible to obtain and provide contents, to which a user has currently high interest, to a user preferentially. It is also possible to prevent contents, for which a user's interest may have declined, from being provided to the user.

Still optionally, the providing unit may select from among pieces of data stored by the data storage unit in decreasing order of similarity evaluated by the similarity evaluation unit, and may obtain contents corresponding to the selected data.

Still optionally, the providing unit may include a selection unit that successively conducts an operation for selecting a piece of data as a process target from among pieces of data stored by the data storage unit. In this case, the providing unit may operate to execute a process for obtaining contents corresponding to the process target each time the selection unit makes a selection and is capable of executing concurrently a plurality of processes for obtaining contents up to a predetermined upper limit. The plurality of processes respectively correspond to process targets selected by the selection unit. The selection unit may include a process number judgment unit that judges whether the number of running processes executed by the providing unit reaches the predetermined upper limit, a similarity judgment unit that judges whether the acquisition data associated with the interest information having the similarity higher than that of the acquisition data corresponding to each of the running processes is found among pieces of unprocessed data stored by the data storage unit, and a process selection unit that selects a process corresponding to the data associated with the interest information having the lowest similarity from among the running processes, as a cancellation target. In this configuration, if the number of running processes reaches the predetermined upper limit and if the acquisition data associated with the interest information having the similarity higher than that of the acquisition data corresponding to each of the running processes is found among pieces of unprocessed data stored by the data storage unit, the process corresponding to the cancellation target is stopped, and the acquisition data associated with the interest information having the highest similarity from among pieces of unprocessed acquisition data stored by the storage unit is selected as the process target.

With this configuration, it is possible to stop a process associated with the low similarity if the number of processes reaches a predetermined upper limit so that a process associated with higher similarity can be executed. Therefore, a situation, in which a process associated with higher similarity can not be executed, is prevented from being occur.

Still optionally, the content providing system may include a mode judgment unit that judges an operation mode of the information processing device. In a case where the number of running processes reaches the predetermined upper limit, the providing unit processes preferentially the data having the higher similarity in accordance with an evaluation result of the similarity evaluation unit as long as the operation mode judged by the mode judgment unit corresponds to modes other than a particular mode.

If the operation mode of the information processing device changes, for example, by an external interrupt, the user's interest would change back to a previous interest after being changed by the interrupt. It is understood that if the particular mode is defined as a mode corresponding to an operation for the interrupt, such a problem is prevented from occurring.

Still optionally, the information processing device may be configured as a telephone having a call-in communication mode in which the telephone is in communication with another telephone after receiving a call from another telephone and having a call communication mode in which the telephone is in communication with another telephone after sending a call to anther telephone. In this case, the particular mode may be the call-in communication mode.

With this configuration, an occurrence of a situation, in which a process for obtaining contents is newly initiated by voice of a person on the other end of the line is inputted to the information processing device, data of the voice is outputted though the user interface, and thereby a previously initiated process having a high possibility that the user's interest soon changes back to the contents corresponding to the previous process is stopped, is prevented from occurring.

Still optionally, the providing unit may be configured to be capable of executing concurrently a plurality of processes for obtaining contents up to a predetermined upper limit, to successively conduct an operation for selecting a piece of data as a process target from among pieces of data stored by the data storage unit, to execute a process for obtaining contents corresponding to the process target, and to allocate resources preferentially for a process corresponding to the data having the higher similarity so that the data having the higher similarity is processed preferentially.

With this configuration, it is possible to preferentially obtain contents associated with higher similarity.

Still optionally, the providing unit may search for contents corresponding to keywords extracted from the data, and obtains the contents relating to the keywords from a database.

Still optionally, the content providing system may include a duration time estimation unit that estimates a duration time during which the user's interest continues each time the user's interest is estimated by the interest estimation unit. In this case, the providing unit may define a processing time limit for the data to execute a process for obtaining contents corresponding to the data within the processing time limit so that acquisition of the contents corresponding to the data can be finished at an end time of the duration time.

With this configuration, an operation for obtaining contents not matching a user's interest is prevented from being executed.

Still optionally, the content providing system may include a judgment unit that determines which of categories determined in advance for categorizing user's interests the user's interest estimated by the interest estimation unit belongs to, and a duration time storing unit that stores a duration time during which the user's interest continues for each of the categories. In this case, the interest estimation unit may operate to read the duration time corresponding to the category determined by the judgment unit, and to estimate a user's interest for next target data after the duration time has elapsed form the user's interest is previously estimated.

With this configuration, it is possible to estimate a user's interest in accordance with the change of the user's interest, and to provide contents matching the user appropriately.

Still optionally, the providing unit may include a selection unit that successively conducts an operation for selecting a piece of data as a process target from among pieces of data stored by the data storage unit. The providing unit may operate to execute a process for obtaining contents corresponding to the process target each time the selection unit makes a selection and is capable of executing concurrently a plurality of processes for obtaining contents. The plurality of processes respectively correspond to process targets selected by the selection unit. Further, the selection unit may include a process number judgment unit that judges whether the number of running processes executed by the providing unit reaches a predetermined upper limit, a similarity judgment unit that judges whether the acquisition data associated with the interest information having the similarity higher than that of the acquisition data corresponding to each of the running processes is found among pieces of unprocessed data stored by the data storage unit, and a process selection unit that selects a process corresponding to the data associated with the interest information having the lowest similarity from among the running processes, as a cancellation target. In this configuration, if the number of running processes is not smaller than the predetermined upper limit a following priority process, in which if the acquisition data associated with the interest information having the similarity higher than that of the acquisition data corresponding to each of the running processes is found among pieces of unprocessed data stored by the data storage unit, the process corresponding to the cancellation target is stopped, and the acquisition data associated with the interest information having the highest similarity from among pieces of unprocessed acquisition data stored by the data storage unit is selected as the process target, and if the acquisition data associated with the interest information having the similarity higher than that of the acquisition data corresponding to each of the running processes is not found among pieces of unprocessed data stored by the data storage unit, the selection unit stops the operation for selecting the process target.

With this configuration, it is possible to prevent a situation, in which a process having higher similarity than those of running processes can not be initiated, from occurring.

Still optionally, the content providing system may include a mode judgment unit that judges an operation mode of the information processing device. In this case, the selection unit may execute the priority process as long as the operation mode judged by the mode judgment unit corresponds to modes other than a particular mode.

If the operation mode of the information processing device changes, for example, by an external interrupt, the user's interest would change back to a previous interest after being changed by the interrupt. It is understood that if the particular mode is defined as a mode corresponding to an operation for the interrupt, such a problem is prevented from occurring.

Still optionally, in a case where the information processing device is in modes other than the particular mode, the selection unit may select the data associated with the highest similarity from among pieces of unprocessed data stored by the data storage unit, as a process target, regardless of the number of running processes. In this case, the providing unit may be capable of processing concurrently the processes exceeding the predetermined upper limit.

With this configuration, it is possible to prevent a situation, in which contents matching a user's interest can not be provided to the user during the particular mode.

In an example, the content providing system may further include a providing unit that obtains contents corresponding to the data and outputs the obtained contents, a data storage unit that stores the interest information and the data each time the data acquisition unit acquires the data, while associating the interest information with the data, and a similarity evaluation unit that evaluates similarity between the user's latest interest represented by the latest interest information saved by the latest estimation result saving unit and the user's interest represented by the interest information associated with the data acquired by the data acquisition unit. In this case, the providing unit may preferentially select the data associated with the interest information having the similarity higher than or equal to a predetermined value from pieces of data stored by the data storage unit, and obtains contents corresponding to the selected data.

Since a current user's interest to contents is evaluated, it becomes possible to obtain and provide contents, to which a user has currently high interest, to a user preferentially. It is also possible to prevent contents, for which a user's interest may have declined, from being provided to the user.

In another example, the content providing system may further include a content acquisition unit that obtains contents corresponding to the data if the data acquisition unit obtains the data, a content storing unit that has a plurality of memory areas respectively corresponding to a plurality of interest types, the content storing unit being configured to store contents to one of memory areas of an interest type corresponding to the interest information of the data corresponding to the contents, and a content output unit that output contents stored in the memory areas. In this case, the content output unit may select one of memory areas corresponding to the latest interest information saved by the latest estimation result saving unit and outputs the contents stored in the selected memory area.

Since a current user's interest to contents is evaluated, it becomes possible to provide contents, to which a user has currently high interest, to a user preferentially. It is also possible to prevent contents, for which a user's interest may have declined, from being provided to the user.

Still optionally, the content acquisition unit may include a content searching unit having a function of searching for contents based on the data and the interest information. In this case, the content acquisition unit may operate to request a search of contents corresponding to the data and to obtain contents searched in response to the request by the content searching unit.

With this configuration, it becomes possible to reduce a processing load on a process for obtaining contents.

Still optionally, the content providing system may include a similarity evaluation unit that evaluates similarity between the user's interest represented by the latest interest information saved by the latest estimation result saving unit and the user's interest represented by the interest information associated with the data acquired by the data acquisition unit. In this case, the content storing unit may store the contents in corresponding one of the memory areas while associating the contents with the similarity evaluated for the interest information corresponding to the contents to be stored. Further, the content output unit may select one of the memory areas corresponding to the latest interest information, and outputs contents from the selected memory area in such a manner that contents corresponding to the data having the high similarity are outputted preferentially.

With this configuration, it becomes possible to provide contents, to which a user would have high interest, to the user preferentially.

Still optionally, each of the memory areas may be configured as a queue in which contents are registered sequentially. The content providing system may include a sorting unit that sorts the contents stored in each memory area each time contents are stored in each memory area, the contents in each memory area being sorted so that the contents having the higher similarity are outputted preferentially. Further, the content output unit may select one of the memory areas corresponding to the latest interest information, and outputs contents from the selected memory area in order in which the contents are sorted by the sorting unit.

Since the contents are stored in the memory area configured as a data queue, it is possible to provide contents in order of decreasing similarity by simply reading contents for the data queue.

Still optionally, the content storing unit may store the contents in the corresponding memory area together with time information representing a time which is later than a time, when the contents were obtained, by a predetermined time. Further, the content providing system may include an evaluation result modification unit that modifies the similarity associated with the contents in response an elapsed time from the time represented by the time information stored together with the contents.

With this configuration, it is possible to change the evaluation result stored together with the contents, in accordance with the time information.

Still optionally, the evaluation result modification unit may modify the similarity associated with contents in such a manner that the longer the elapsed time becomes, the lower the similarity comes.

With this configuration, it is possible to prevent contents, for which the user's interest would decline, for being provided to the user.

Still optionally, the content providing system may include a deletion unit that deletes contents associated with the time information representing the time a predetermined time older than a current time.

With this configuration, it is possible to prevent contents, for which the user's interest would decline, for being provided to the user.

In an example, the content providing system may further include a main interest estimation unit that estimates a user's current main interest by modifying the latest interest information based on transition of the user's interest estimated in a past predetermined time period by the interest estimation unit, a content acquisition unit that obtains contents corresponding to the data, a content storage unit that stores the contents and the interest information corresponding to the contents and generated by the interest estimation unit, while associating the contents with the interest information, a similarity evaluation unit that evaluates similarity between the user's current main interest estimated by the main interest estimation unit and the user's interest represented by the interest information by the interest estimation unit, a content output unit configured to output contents stored by the content storage unit, and a content output control unit that controls the content output unit based on the similarity generated by the similarity evaluation unit so that contents corresponding to the interest information having the higher similarity are outputted preferentially.

Since a current user's interest to contents is evaluated, it becomes possible to output contents, to which a user has currently high interest, to a user preferentially. It is also possible to prevent contents, for which a user's interest may have declined, from being provided to the user.

Still optionally, the content providing system may include an extraction unit that extracts keywords from the data each time the data acquisition unit obtains data. In this case, the interest estimation unit may estimate the user's interest based on the keywords extracted by the extraction unit each time the data acquisition unit obtains data, and the content acquisition unit may obtain contents relating to the keywords extracted the extraction unit for the acquired contents.

Since the user's interest is estimated by keywords, the estimation of the user's interest can be conducted easily in comparison with the case where the user's interest is estimated, for example, by analyzing the context in the data.

Still optionally, the interest estimation unit may generate a vector as the interest information representing a user's interest by classifying keywords extracted from the data by the extraction unit into a plurality of classes respectively corresponding to elements of the vector, obtaining a value of each element for each of the extracted keywords, and representing the vector using the value obtained for each element.

With this configuration, it is possible to obtain the similarity by simply calculating an inner product of the vector corresponding to the user's interest and the vector corresponding to the user's current main interest.

Still optionally, the main interest estimation unit may obtain a changing amount of vectors obtained by the interest estimation unit in a predetermined past time period, and modifies the latest interest information using the changing amount so that the user's current main interest is estimated.

With this configuration, it is possible to estimate the user's current main interest appropriately.

In an example, the content providing system may further include a data storage unit that stores the interest information and the data associated with the interest information each time the data acquisition unit acquires the data, while associating the interest information with the data, a main interest estimation unit that estimates a user's current main interest by modifying the latest interest information based on transition of the user's interest estimated in a past predetermined time period by the interest estimation unit, a content acquisition unit that obtains contents corresponding to the data, a similarity evaluation unit that evaluates similarity between the user's current main interest estimated by the main interest estimation unit and the user's interest represented by the interest information by the interest estimation unit, a content output unit configured to output contents obtained by the content acquisition unit, and a content acquisition control unit that controls the content acquisition unit so that the data associated with the interest information having higher similarity is selected preferentially from pieces of data stored by the data storage unit, and contents corresponding to the selected data are obtained preferentially.

Since a current user's interest to contents is evaluated, it becomes possible to output contents, to which a user has currently high interest, to a user preferentially. It is also possible to prevent contents, for which a user's interest may have declined, from being provided to the user.

According to another aspect of the invention, there is provided a content providing system, which is provided with a data acquisition unit configured to obtain data inputted and/or outputted through a user interface which is included in an information processing device, an interest estimation unit that generates interest information representing a user's interest by estimating the user's interest based on the data acquired by the data acquisition unit, a content acquisition unit that obtains contents corresponding to the data if the data acquisition unit obtains the data, a content output unit configured to output contents obtained by the content acquisition unit, a time evaluation unit that operates, each time the content acquisition unit obtains contents, to subtract a lapse of time between a time when the data was obtained by the data acquisition unit and a time when the contents corresponding to the data are obtained by the content acquisition unit, from a certain valid duration defined for the user's interest estimated for the data by the interest estimation unit, and to define a subtraction result as a remaining time, and a content output control unit that controls the content output unit so that contents having a longer remaining time are outputted preferentially.

With this configuration, it is possible to provide contents matching the user's interest to a user in a timely fashion.

Optionally, the content output control unit may control the content output unit so that contents are outputted in decreasing order of the remaining time.

With this configuration, it is possible to provide desirable contents to a user quickly.

Still optionally, the content output control unit may control the content output unit so that only contents associated with the remaining time higher than or equal to a predetermined time are outputted.

With this configuration, it is possible to provide only contents matching the user's interest, to the user.

According to another aspect of the invention, there is provided a content providing system, which is provided with a data acquisition unit. The data acquisition unit is configured to obtain data inputted and/or outputted through a user interface which is included in an information processing device. The content providing system further includes a providing unit that obtains contents corresponding to the data and provides the obtained contents, a data storage unit that stores the data in a memory, a time recordation unit that records an input time when the data is inputted through the user interface or an output time when the data is outputted through the user interface, in the memory, while associating input time or the output time with the data, an interest estimation unit that generates interest information representing a user's interest by estimating the user's interest based on the data acquired by the data acquisition unit, and a detection unit that detects a transition time when the user's interest changes based on changes of the interest information. In this configuration, the providing unit selects the data associated with the input time or the output time later than or equal to the transition time from pieces of data in the memory and obtains contents corresponding to the selected data.

With this configuration, it is possible to provide contents matching the user's interest to a user in a timely fashion.

Optionally, the information processing device may be configured to output data inputted thereto through the user interface along with input time information representing a time when the data is inputted. In this case, the time recordation unit may obtain the input time information outputted by the information processing device and stores the input time information in the memory as the input time.

With this configuration, it is possible to provide contents to a user accurately within a time period where a user keeps the use's interest to the contents.

Still optionally, the information processing device may be configured to output data outputted therefrom through the user interface along with output time information representing a time when the data is outputted. In this case, the time recordation unit may obtain the output time information outputted by the information processing device and stores the output time information in the memory as the output time.

With this configuration, it is possible to provide contents to a user accurately within a time period where a user keeps the user's interest to the contents.

Still optionally, the providing unit may searches for contents relating to keywords extracted from the data, and obtains the contents relating to the keywords.

According another aspect of the invention, there is provided a computer program comprising computer readable instructions that cause a device to: acquire data inputted to and/or outputted from an information processing device through a user interface of the information processing device, from the information processing device, generate interest information representing a user's interest by estimating the user's interest based on the data acquired from the information processing device, and save latest interest information so that contents reflecting the latest interest information can be provided to a user.

Since the latest interest information is used to obtain contents, it becomes possible to provide contents reflecting the user's latest interest preferentially.

In a first example, the computer readable instructions may further cause the device to: obtain contents corresponding to the data if the data is acquired, evaluate similarity between the user's latest interest represented by the latest interest information and the user's interest represented by the interest information associated with the data, output contents based on the similarity so that contents corresponding to the data associated with the interest information having higher similarity with the latest interest information are outputted preferentially.

Since a current user's interest to contents is evaluated, it becomes possible to provide contents, to which a user has currently a high interest, to a user preferentially. It is also possible to prevent contents, for which a user's interest may have declined, from being provided to the user.

In a second example, the computer readable instructions may further cause the device to: store the interest information and the data each time the data is acquired, while associating the interest information with the data, evaluate similarity between the user's latest interest represented by the latest interest information and the user's interest represented by the interest information associated with the data, and select preferentially the data associated with the interest information having higher similarity from pieces of data, and obtain contents corresponding to the selected data.

Since a current user's interest to contents is evaluated, it becomes possible to obtain and provide contents, to which a user has currently high interest, to a user preferentially. It is also possible to prevent contents, for which a user's interest may have declined, from being provided to the user.

In a third example, the computer readable instructions may further cause the device to: store the interest information and the data each time the data is acquired, while associating the interest information with the data, evaluate similarity between the user's latest interest represented by the latest interest information and the user's interest represented by the interest information associated with the data, select preferentially the data associated with the interest information having the similarity higher than or equal to a predetermined value from pieces of stored data, and obtain contents corresponding to the selected data.

Since a current user's interest to contents is evaluated, it becomes possible to obtain and provide contents, to which a user has currently high interest, to a user preferentially. It is also possible to prevent contents, for which a user's interest may have declined, from being provided to the user.

In a fourth example, the computer readable instructions may further cause the device to: obtain contents corresponding to the data if the data is acquired, store contents to one of memory areas of an interest type corresponding to the interest information of the data corresponding to the contents to be stored, and select one of memory areas corresponding to the latest interest information and output the contents stored in the selected memory area.

Since a current user's interest to contents is evaluated, it becomes possible to provide contents, to which a user has currently high interest, to a user preferentially. It is also possible to prevent contents, for which a user's interest may have declined, from being provided to the user.

In a fifth example, the computer readable instructions may further cause the device to: estimate a user's current main interest by modifying the latest interest information based on transition of the user's interest estimated in a past predetermined time period, store the contents and the interest information corresponding to the contents, while associating the contents with the interest information, evaluate similarity between the user's current main interest and the user's interest represented by the interest information associated with the data, and output contents based on the similarity so that contents corresponding to the interest information having the higher similarity are outputted preferentially.

Since a current user's interest to contents is evaluated, it becomes possible to output contents, to which a user has currently high interest, to a user preferentially. It is also possible to prevent contents, for which a user's interest may have declined, from being provided to the user.

In a sixth example, the computer readable instructions may further cause the device to: store the interest information and the data associated with the interest information each time the data is acquired, while associating the interest information with the data, estimate a user's current main interest by modifying the latest interest information based on transition of the user's interest estimated in a past predetermined time period, evaluate similarity between the user's current main interest and the user's interest represented by the interest information, and obtain contents so that the data associated with the interest information having higher similarity is selected preferentially from pieces of stored data, and contents corresponding to the selected data are obtained preferentially.

Since a current user's interest to contents is evaluated, it becomes possible to output contents, to which a user has currently high interest, to a user preferentially. It is also possible to prevent contents, for which a user's interest may have declined, from being provided to the user.

According to another aspect of the invention, there is provided a computer program comprising computer readable instructions that cause a device to: acquire data inputted to and/or outputted from an information processing device through a user interface of the information processing device, from the information processing device, generate interest information representing a user's interest by estimating the user's interest based on the data acquired from the information processing device, obtain contents corresponding to the data if the data is acquired; calculate a remaining time, each time the contents are obtained, by subtracting a lapse of time between a time when the data was acquired and a time when the corresponding contents are obtained, from a certain valid duration defined for the user's interest estimated for the data, and define a subtraction result as the remaining time, and output contents so that contents having a longer remaining time are outputted preferentially.

With this configuration, it is possible to provide contents matching the user's interest to a user in a timely fashion.

According to another aspect of the invention, there is provided a computer program comprising computer readable instructions that cause a device to: acquire data inputted to and/or outputted from a an information processing device through a user interface of the information processing device, from the information processing device, store the data in a memory, record an input time when the data is inputted through the user interface or an output time when the data is outputted through the user interface, in the memory, while associating the input time or the output time with the data, generate interest information representing a user's interest by estimating the user's interest based on the data acquired from the information processing device, detect a transition time when the user's interest changes based on changes of the interest information, and obtain contents in such a manner that the data associated with the input time or the output time later than or equal to the transition time is selected from pieces of data in the memory and contents corresponding to the selected data are obtained.

With this configuration, it is possible to provide contents matching the user's interest to a user in a timely fashion.

It is understood that the units of the above mentioned content providing system may be implemented in a device. In this case, a data acquisition unit implemented in the device may be configured to acquire data from an information processing device. The data is inputted to or outputted from the information processing device through a user interface of the information processing device.

ILLUSTRATIVE EMBODIMENTS

Hereafter, illustrative embodiments according to the invention will be described with reference to the accompanying drawings.

First Embodiment

Figure 1:
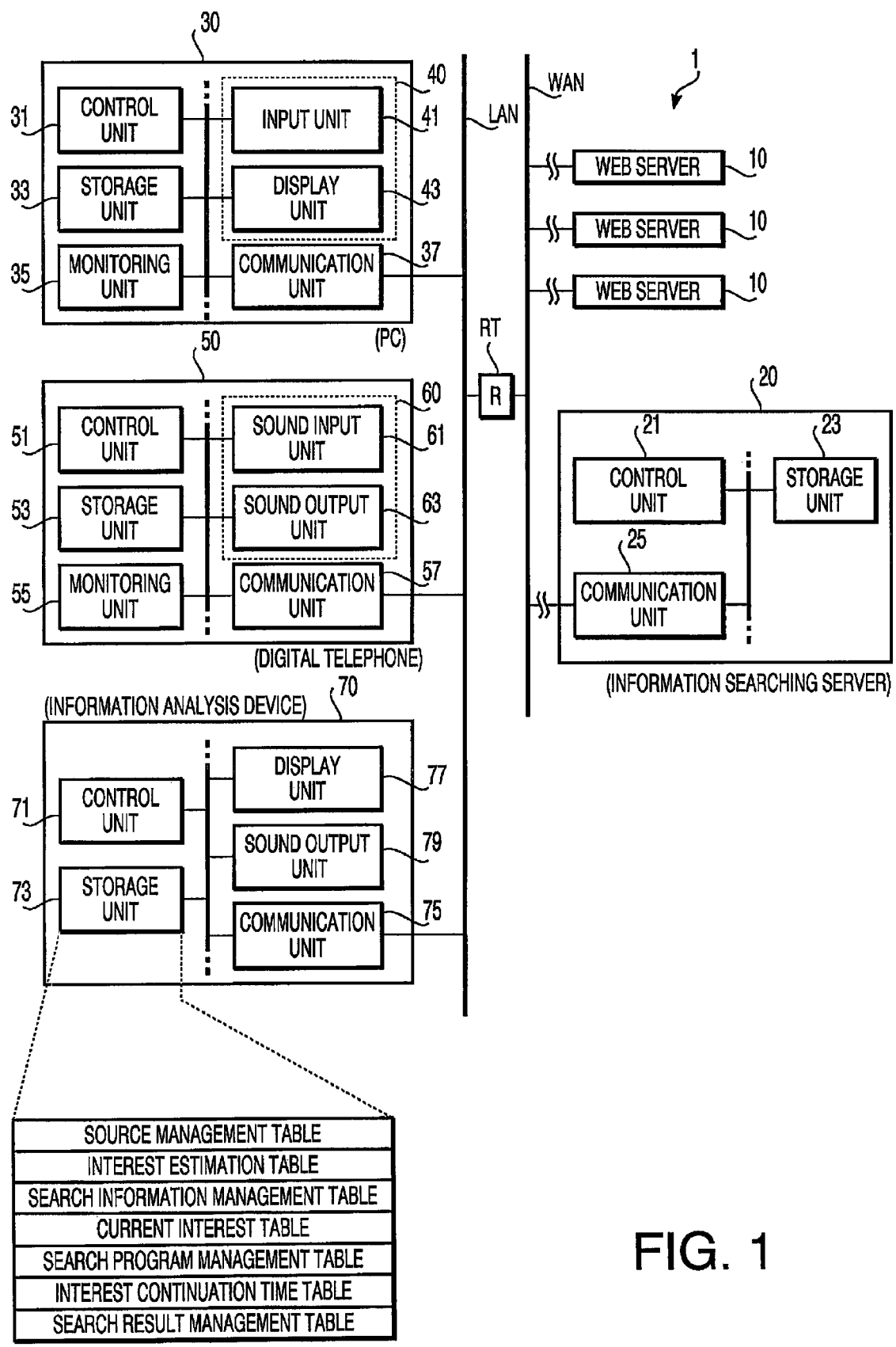
FIG. 1 is a block diagram of a content providing system according to a first embodiment.

FIG. 1 is a block diagram of a content providing system 1 according to a first embodiment. The content providing system 1 includes web servers 10 which provide contents, and an information searching server 20. Each web server 10 and the information server 20 are connected to a WAN (wide area network). The content providing system 1 further includes a personal computer (PC) 30, a digital telephone 50, and an information analysis device 70, which are connected to the WAN via a router RT.

The information searching server 20 includes a control unit 21, a storage unit 23 and a communication unit 25. The control unit 21 includes a CPU, a ROM, and a RAM. The CPU executes programs stored in the ROM and the storage unit 23 to control entirely the information searching server 20. The storage unit 23 includes a hard disk drive. The communication unit 25 functions as an interface with another device through the WAN. In the storage unit 23, a database containing link information (URLs) to contents, that the web server 10 has, and various types of searching programs are stored.

Execution of the searching program is controlled by a web server program running on the information searching server 20, and is initiated, when accessed by an external device, by the control unit 21. Specifically, when receiving a query to the searching program, the information searching server 20 (the searching program) executes a searching process according to a search condition contained in the query, and sends link information of the requested contents back to a source device of the query, as a search result.

The personal computer 30 includes a control unit 31, a storage unit 33, an input unit 41, a display unit 43, a monitoring unit 35 and a communication unit 37. The control unit 31 includes a CPU, a ROM and a RAM, and executes various types of processing by the CPU. The storage unit 33 includes a hard disk drive. The communication unit 37 functions as an interface with another device through the LAN and WAN. The input unit 41 (e.g., a keyboard and a pointing device) and the display unit 43 function as a user interface.

In the storage unit 33, various types of programs various types of programs including a browser for displaying information on the display unit 43 and a document editor are stored. The control unit 31 operates to create and update a document file and displays text information of the document file on the display unit 43 by executing the program stored in the storage unit 33.

The monitoring unit 35 monitors execution of the program by the control unit 31 and collects information output by the program so that the collected information is displayed on the display unit 43. The control unit 31 sends the collected information to the information analysis device 70 via the communication unit 37.

Figure 2:
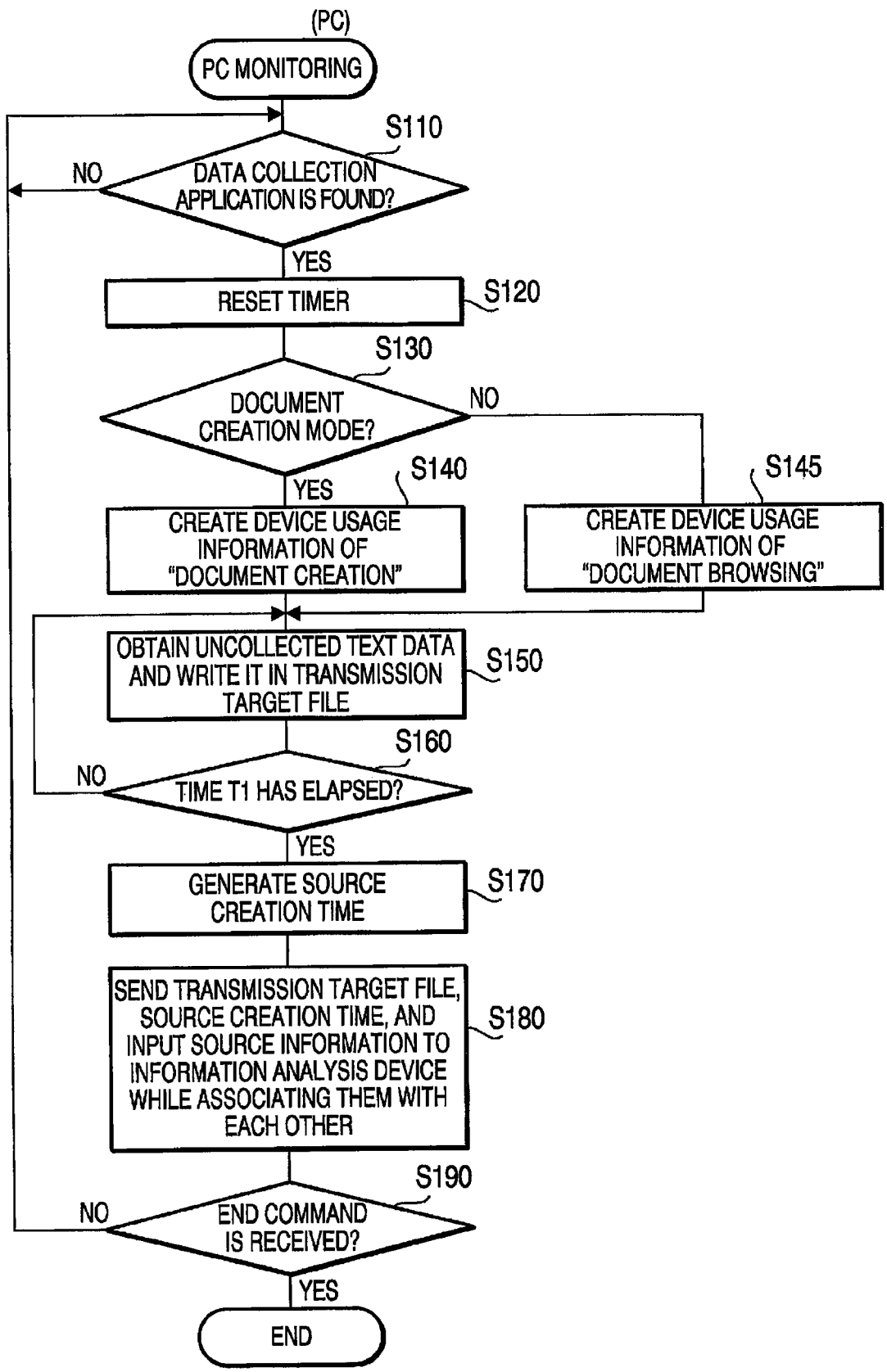
FIG. 2 is a flowchart illustrating a PC monitoring process executed under control of a monitoring unit of a PC in the content providing system according to the first embodiment.

FIG. 2 is a flowchart illustrating a PC monitoring process executed under control of the monitoring unit 35 of the PC 30.

First, the monitoring unit 35 judges whether software having uncollected display target data (i.e., data to be displayed on the display unit 43) exists among one or more pieces of software targeted for the data collection. If software having uncollected display target data is not found (S110: NO), the monitoring unit 35 waits until software having uncollected display target data is found. If software having uncollected display target data is found (S110: YES), the monitoring unit 35 resets a timer (S120).

Next, the monitoring unit 35 judges whether the software having uncollected display target data is in a document creation mode or in a document browsing mode (S130). If the software is in the document creation mode (S130: YES), the monitoring unit 35 generates device usage information representing "document creation" (S140). If the software is not in the document creation mode (i.e., the software is in the document browsing mode) (S130: NO), the monitoring unit 35 generates device usage information representing "document browsing" (S145).

The document creation mode means that the software is accepting user inputs, and is updating the document file and onscreen representation based on the user's inputs. The document browsing mode means that the software is displaying text information of the document file selected by the user. In this embodiment, each of the pieces of software targeted for the data collection of the PC monitoring process is configured to notify the monitoring unit 35 of information indicating whether the software is in the document creation mode or in the document browsing mode.

Next, the monitoring unit 35 obtains uncollected data (text data to be displayed on the display unit 43) from the software, and write the obtained data into a transmission target file (S150). Specifically, the monitoring unit 35 writes uncollected data in the transmission target file each time a predetermined time period T1 (e.g., 1 minute) has elapsed (i.e., an operation, where uncollected data obtained in the predetermined time period T1 is written into the transmission target file, is executed repeatedly).

When the predetermined time period T1 has elapsed (S160: YES), the monitoring unit 35 generates source creation time information (S170), and thereafter sends the transmission target file having text data obtained within the predetermined time period, the source creation time information generated in step S170, input source information indicating a PC, and the device usage information to the information analysis device 70, while associating the transmission target file, the source creation time information, the input source information and the device usage information with each other (S180).

Next, the monitoring unit 35 judges whether an end command from the control unit 31 is received (S190). If the end command in not received (S190: NO), control returns to step S110 to wait until next uncollected data is found. If the end command is received (S190: YES), the PC monitoring process terminates.

Referring back to FIG. 1, the digital telephone 50 includes a control unit 51, a storage unit 53 storing, for example setting information, a monitoring unit 55, a communication unit 57 for communication with devices through LAN or WAN, and a user interface 60 for inputting information from a user into internal components and for outputting information to the user. The control unit 51 includes a CPU, a ROM and a RAM 8 not shown in FIG. 1), and the CPU executes various programs for controlling entirely internal components of the digital telephone 50.

The communication unit 57 is able to communicate with an external telephone through the WAN. For example, the communication unit 57 may be configured to use an IP (internet protocol) to communicate with an external telephone. The user interface 60 includes a sound input unit 60 having a microphone through which user's voice is inputted, and a sound output unit 63 having a speaker through which voice received from an external device is outputted. The sound input unit 60 converts the inputted voice into voice data.

The monitoring unit 55 obtains voice data which is inputted to the digital telephone 50 through the microphone and is inputted to the communication unit 57 by the control unit 31, and voice data outputted to the sound output unit 63 from the communication unit 57 by the control unit 51. Then, the monitoring unit 55 converts the voice data obtained within a predetermined time period T2 (e.g., ten seconds) into text data, generates a transmission target file containing the obtained text data, and transmits the transmission target information to the information analysis device 70.

Figure 3:
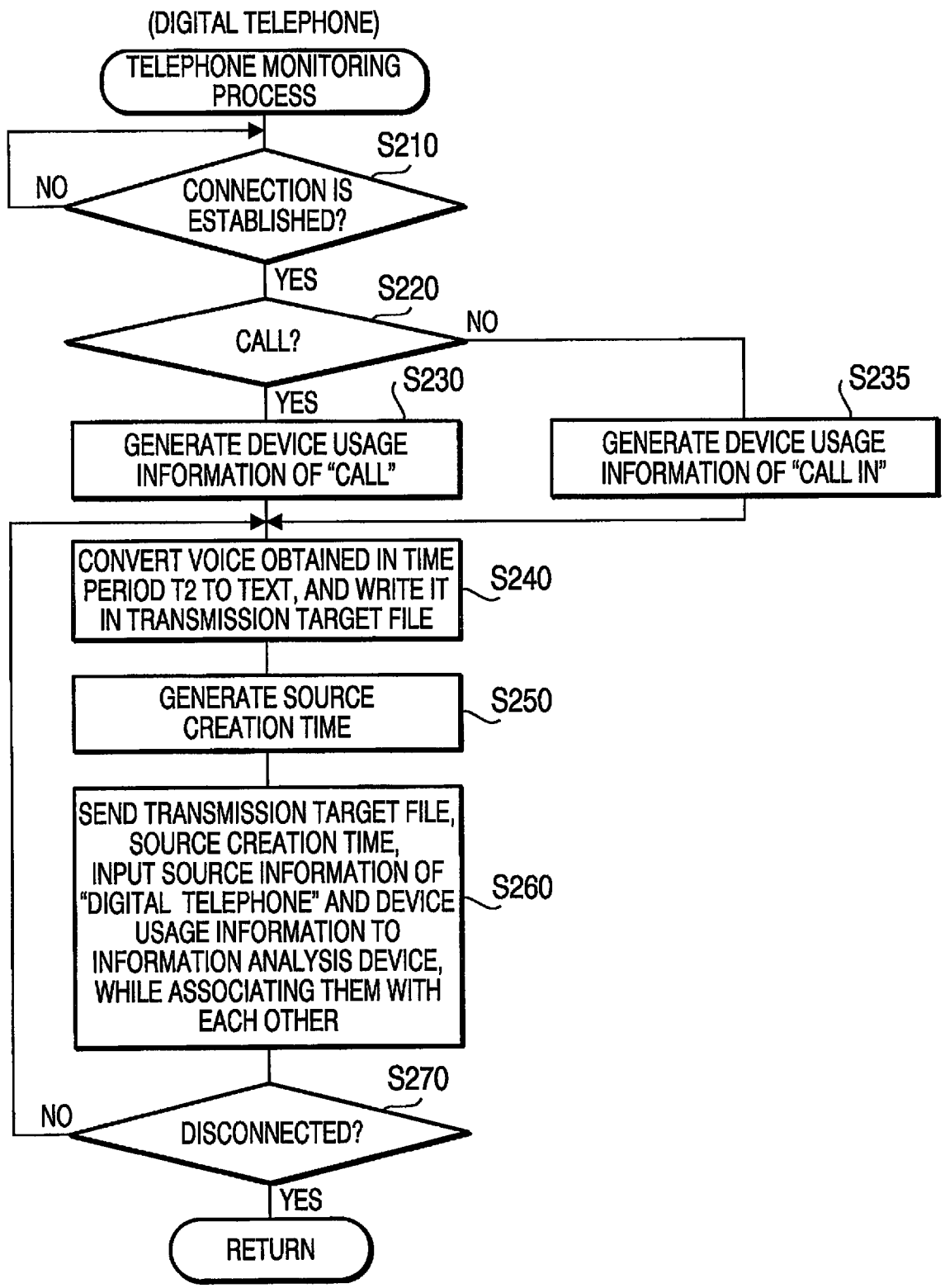
FIG. 3 is a flowchart illustrating a telephone monitoring process executed repeatedly by a monitoring unit of a digital telephone in the content providing system according to the first embodiment.

FIG. 3 is a flowchart illustrating a telephone monitoring process executed repeatedly by the monitoring unit 55 of the digital telephone 50.

First, the monitoring unit 55 waits a connection with an external telephone is established (S210: NO). If a connection between the digital telephone 50 and an external telephone is established (S210: YES), the monitoring unit 55 judges whether the connection is based on a call outputted by the digital telephone 50 (S220). If the connection is based on a call outputted by the digital telephone 50 (S220: YES), the monitoring unit 55 generates device usage information representing a "call" (S230).

If the connection is based on a call outputted by an external telephone (i.e., "call in" on the digital telephone 50) (S220: NO), the monitoring unit 55 generates device usage information representing a "call in" (S235). Next, in step S240, the monitoring unit 55 obtains voice having a size corresponding to the predetermined time period T2, converts the obtained voice data into text data, and then generates a transmission target file containing the text data.

Next, the monitoring unit 55 generates source creation time information representing the current time (S250). Then, the monitoring unit 55 sends the transmission target file, the source creation time information generated in step S250, input source information representing "digital telephone", and the device usage information generated in step S230 or S235 to the information analysis device 70, while associating the transmission target file, the source creation time information, the input source information and the device usage information with each other.

After step S260 is processed, the monitoring unit 55 judges whether the connection is disconnected (S270). If the connection is not disconnected (S270: NO), control returns to step S240 to convert next voice data obtained within the next predetermined time period T2 into text data. If the connection is disconnected (S270: YES), the telephone monitoring process terminates, and thereafter the monitoring unit 55 waits until a next connection is established (S210).

Hereafter, functions of the information analysis device 70 will be described. As shown in FIG. 1, the information analysis device 70 includes a control unit 71, a storage unit 73 having a hard disk, a communication unit 71 for communication with external devices via the LAN or WAN, a display unit 77 on which various information such as contents obtained from the web server 10 are displayed, and a sound output unit 79 for reproducing sound data contained in contents. The control unit 71 includes a CPU, a ROM and a RAM, and the CPU executes various programs to control entirely the internal components of the information analysis device 70.

In the storage unit 73, various types of programs to be executed under control f the control unit 71 and various types tables used for execution of the programs are stored. The information analysis device 70 operates to send a query to the information searching server 20 to obtain location information (e.g., a URL) for locating a device (the web server 10) having contents corresponding to keywords which the information analysis device 70 added to the query. After receiving a search result (the location information) from the information searching server 20, the information analysis device 70 accesses the web server 10 corresponding to the search result, obtains the contents from the web server 10, and displays or reproduces the obtained contents.

Figure 4:
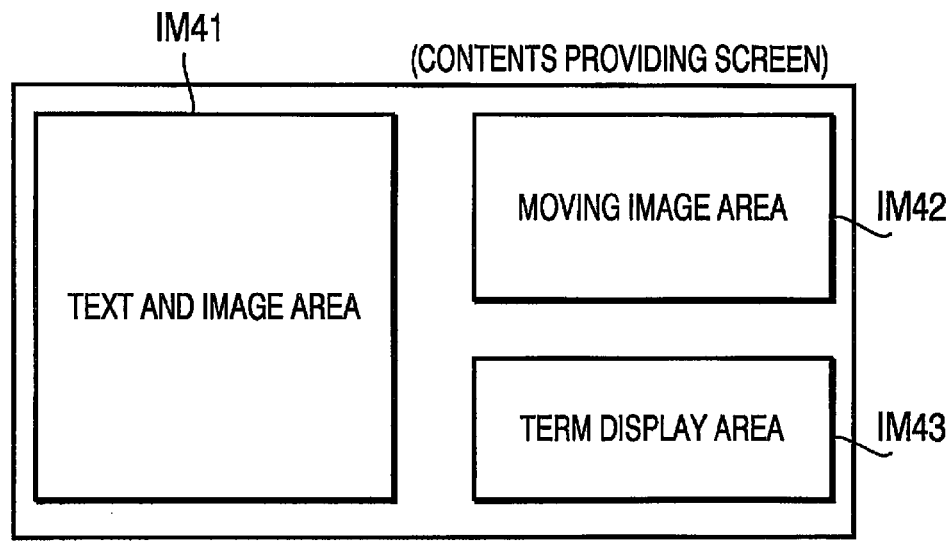
FIG. 4 shows an example of a content providing screen displayed on a display unit of an information analysis device in the content providing system according to the first embodiment.

FIG. 4 shows an example of a content providing screen displayed on the display unit 177. As shown in FIG. 4, the content providing screen includes a text and image area IM41 in which newly obtained text and images are displayed in such a manner that a user is able to scroll up or down the text and images, a moving image area IM42 in which an moving image is displayed, and a term display area IM 43 in which searching results of terms are displayed.

The information analysis device 70 further operates to output a query based on text data contained in a file (the transmission target file) received from the PC 30 or the digital telephone 50 so as to obtain contents to be displayed on the content providing screen from the web server 10. Then, the information analysis device 70 provides contents by displaying images and reproducing sounds.

Hereafter, processed executed by the control unit 71 to provide contents will be explained.

Figure 5:
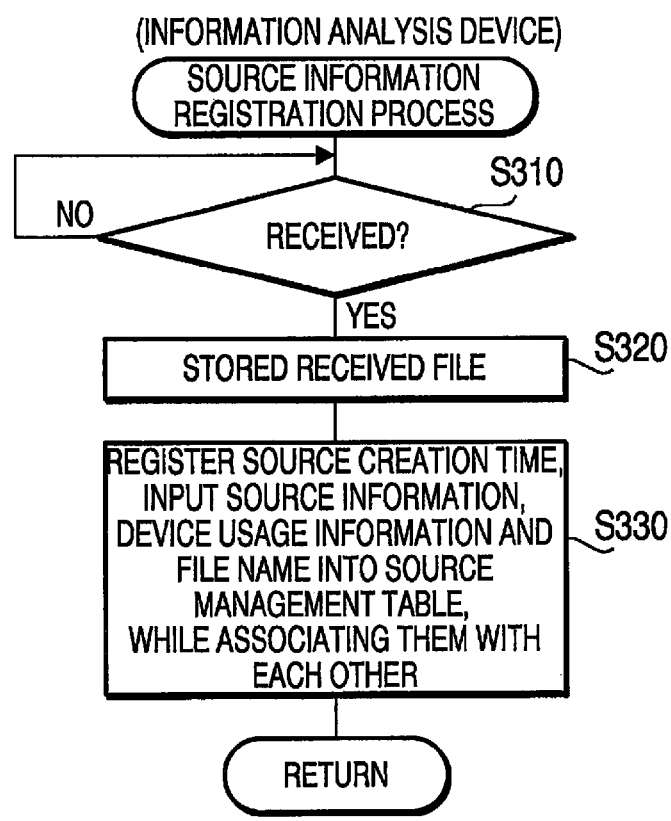
FIG. 5 is a flowchart illustrating a source information registration process executed repeatedly by the information analysis device according to the first embodiment.

FIG. 5 is a flowchart illustrating a source information registration process executed repeatedly by the control unit 71. First, the control unit 71 waits until data transmitted form the PC 30 in step S180 (FIG. 2) or data transmitted from the digital telephone 50 in step S260 (FIG. 3) is received (S310). If the data is received (S310: YES), the control unit 71 stored the transmission target file contained in the received data into the storage unit 73 (S320). Then, the control unit 71 generates source information containing the source creation tine information, the input source information, the device usage information and a file name of the transmission target file, which accompany the transmission target file. Next, the control unit 71 registers the source information in a source management table (S330).

Then, the source information registration process terminates, and thereafter the control unit 71 wais again until next data is received (S310).

FIG. 6 shows an example of a data structure of source management table. As shown in FIG. 6, the source management table includes one or more pieces of source information, each of which includes source creation time information, input source information, device usage information and a file name. The control unit 71 reads a received file from the storage unit 73, based on the source information registered in the source management table, and analyzes the received file.

Figure 7:
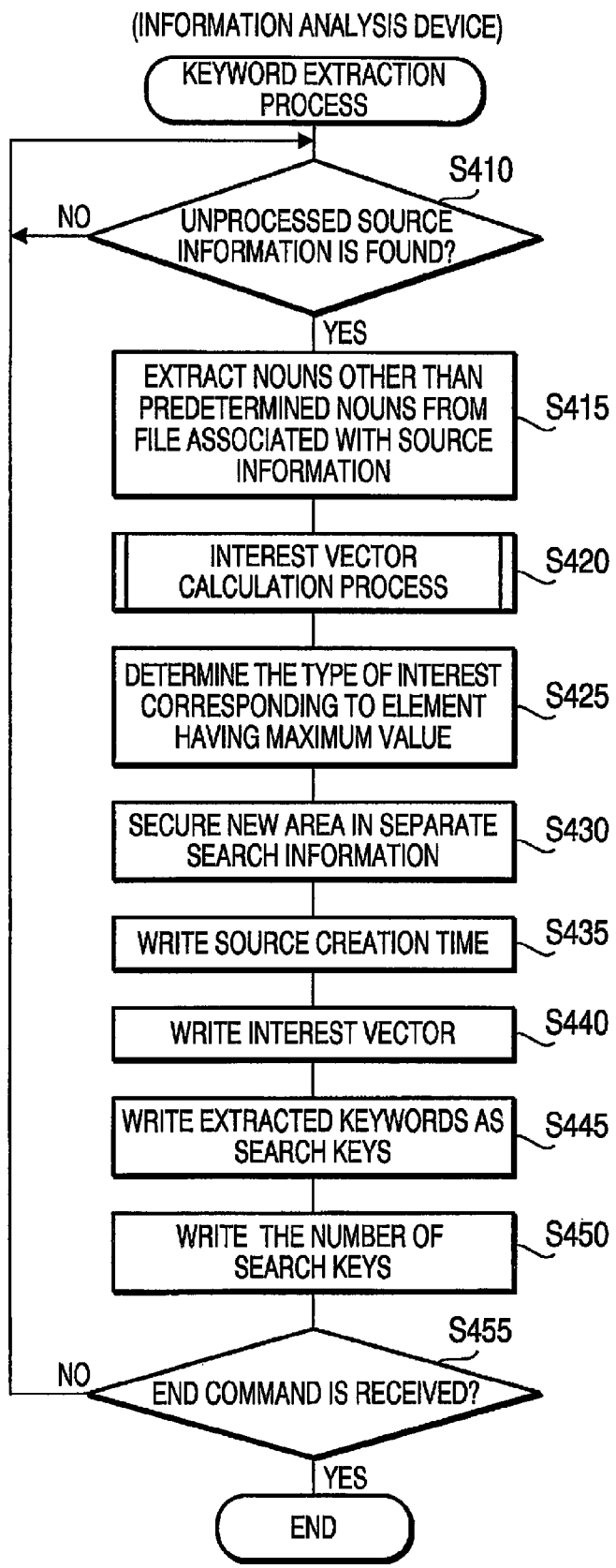
FIG. 7 is a flowchart illustrating a keyword extraction process executed by the information analysis device according to the first embodiment.

Hereafter, a keyword extraction process executed by the control unit 71 will be explained with reference to FIG. 7. The keyword extraction process is executed concurrently with the source information registration process.

First, the control unit 71 judges whether unprocessed source information is found in the source management table (S410). If unprocessed source information is not found (S410: NO), the control unit 71 waits until unprocessed source information is found. If unprocessed source information is found (S410: YES), the control unit 71 analyzes text data of the file associated with the unprocessed source information so as to extract nouns from the text data. Further, the control unit 71 decides to assign the extracted nouns other than predetermined nouns to keywords (S415). In this embodiment, general nouns not used for keywords to search contents are stored in advance in the storage unit 73.

Figure 8:
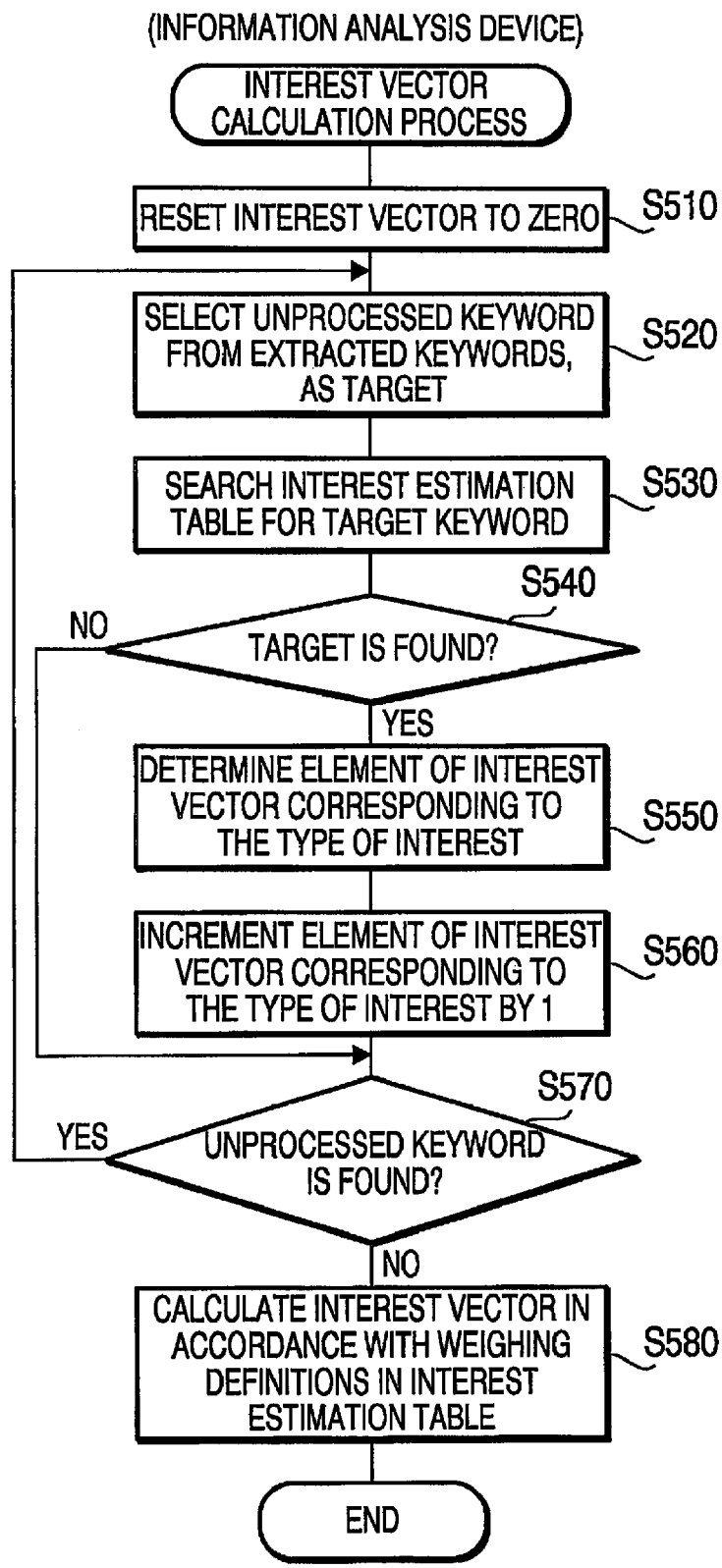
FIG. 8 is a flowchart illustrating an interest vector calculation process executed by the information analysis device according to the first embodiment.

After step S415 is processed, the control unit 71 executes an interest vector calculation process (S420). FIG. 8 is a flowchart illustrating the interest vector calculation process executed under control of the control unit 71. In the embodiment, matters of concern to a user (i.e., a user's interest) are represented by interest vectors, and the priority of content output is determined by the interest vectors.

The term interest vector means a vector obtained by expressing numerically user's interest. Specifically, an interest vector V is expressed by a one row and n column vector:

$$V=(v1,v2,\ldots vn)$$

where elements v1, v2, . . . vn respectively correspond to types of interest categorized in advance.

When the interest vector calculation process is started, the control unit 71 resets an interest vector V to zero (S510). Then, the control unit 71 selects an unprocessed keyword from among keywords extracted in step S415 (FIG. 7) as a target keyword (S520). Further, the control unit 71 searches an interest estimation table stored in the storage unit 73 for the target keyword (S530). FIG. 9 shows an example of a data structure of the interest estimation table. As shown in FIG. 9, the interest estimation table includes keywords and parameters for weight (weighting definitions) for each of the types of interest.

After step S530 is processed, the control unit 71 judges whether the target keyword is found (S540). If the target keyword is found among the keywords registered in the interest estimation table (S540: YES), the control unit 71 determines the type of interest to which the target keyword belongs, using the interest estimation table (S550). Then, the control unit 71 adds 1 to the element vi (where i (i=1, 2, . . . , n) corresponds to the type of interest) of the interest vector V. Then, control proceeds to step S570.

If the target keyword is not found in the keywords registered in the interest estimation table (S540: NO), control proceeds to step S570. In step S570, the control unit 71 judges whether an unprocessed keyword exists in the extracted keywords. If an unprocessed keyword is found (S570: YES), control returns to step S520 to select one of the unprocessed keywords as a target keyword. In this embodiment, if one or more same keywords are found among the keywords obtained in step S530, all of the same keywords undergo the steps S540 to S560.

If an unprocessed keyword is not found (S570: NO), the interest vector V is calculated in accordance with weighing definitions in the interest estimation table. That is, each element vi is weighted in accordance with the weighting definitions.

The weighting definitions are categorized in two groups. A first weighting definition is represented by a combination of the device usage information and a weighting factor W. A second weighting definition is represented by the time information and a weighting factor W. The control unit 71 weights each element vi corresponding to the first weighting definition if the device usage information of the source information corresponding to the file (of which keywords are extracted in step S415) is equal to the device usage information represented by the weighting definition.

More specifically, in step S580, the control unit 71 selects the element vi corresponding to the type of interest having the first weighting definition of which device usage information is equal to the device usage information of the source information corresponding to the file (of which keywords are extracted in step S415), as a weighting target. The control unit 71 further multiplies the weighting target vi by the weighting factor W as shown below.

$$vi \leftarrow vi \times W$$

Then, the control unit 71 weights the element vi corresponding to the type of weighting to which the second weighting definition is assigned if the current time is within the time period represented by the time information of the weighting definition of the element vi.

In step S580, the control unit 71 multiplies the element vi, which corresponds to the type of weighting to which the second weighting definition and has the time information within which the current time lies, by the weighting factor W.

After S580 is processed, the control unit 71 outputs the calculation result as a return value. Then, the interest vector calculation process terminates.

Referring back to FIG. 7, after step S420 is processed, control proceeds to step S425. In step S425, the control unit 71 determines the type of interest corresponding to the element having the maximum value.

Next, the control unit 71 secures a new writing area for separate search information in a search information management table stored in the storage unit 73 (S430). Then, the control unit 71 writes the source creation time information of the source information, of which keywords are extracted in step S415, into the new writing area (S435), and writes the interest vector V calculated in step S420 into the new writing area (S440).

Next, the control unit 71 writes the keywords extracted in step S415 into the new writing area, as search keys (S445), and writes the number of search keys into the new writing area (S450).

FIG. 10 shows an example of a data structure of the search information management table. As shown in FIG. 10, the search information management table includes one or more pieces of separate search information, each of which includes the source creation time information, a value of the interest vector, information about search keys, and the number of search keys.

By processing steps S430 to S450, the control unit 71 registers separate search information corresponding to the source information of which keywords are extracted in step S415. When step S450 is finished, control proceeds to step S455 where the control unit 71 judges whether an end command is inputted. If the end command is not inputted (S455: NO), control returns to step S410 where the control unit 71 waits until next unprocessed source information is generated. If the end command is inputted (S450: YES), the keyword extraction process terminates.

Figure 11:
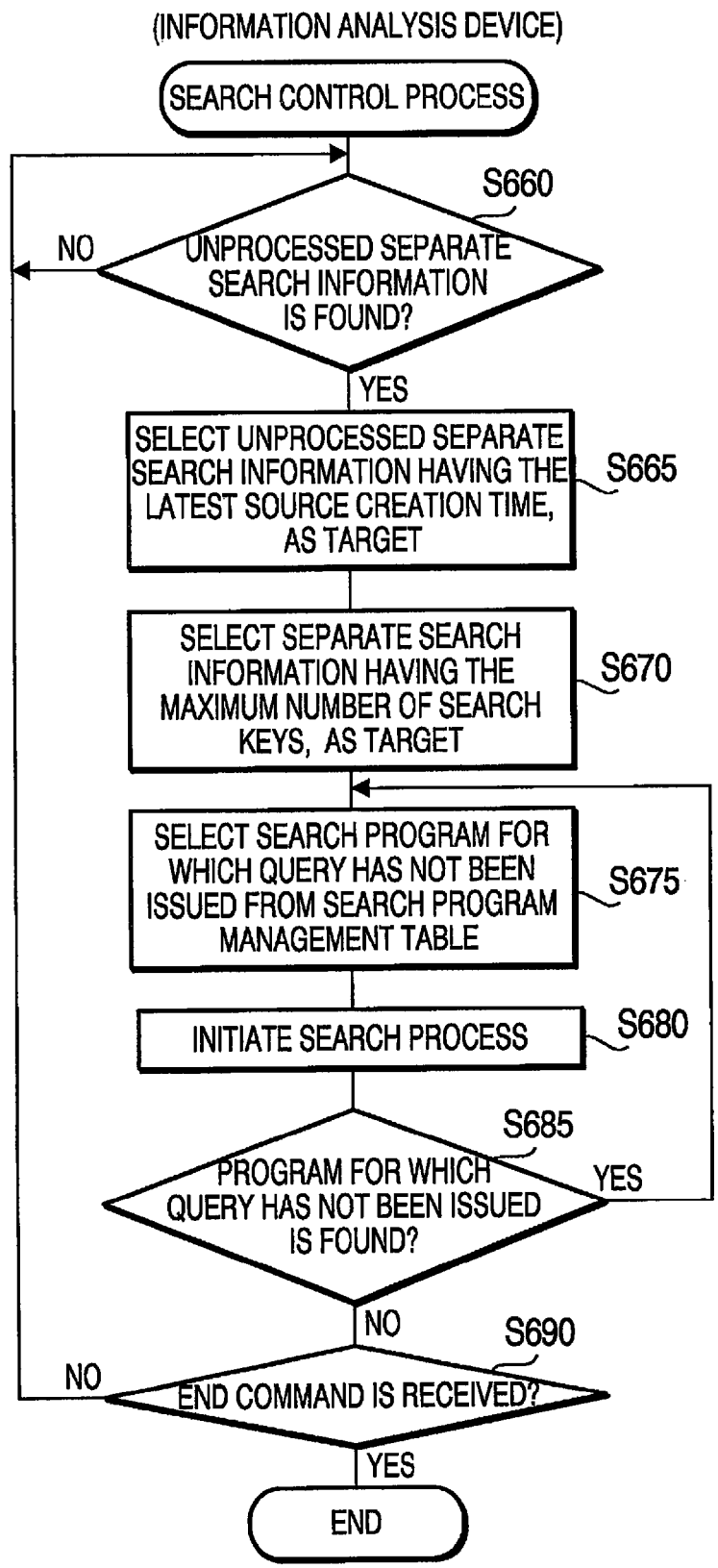
FIG. 11 is a flowchart illustrating a search control process executed by the information analysis device according to the first embodiment.

Hereafter, a search control process executed under control of the control unit 71 of the information analysis device 70 will be explained with reference to FIG. 11. First, the control unit 71 judges whether unprocessed separate search information is found in the search information management table (S660). That is, the control unit 71 waits until unprocessed separate search information is found (S660). If unprocessed separate search information is found (S660: YES), control proceeds to step S665.

In step S665, the control unit 71 selects unprocessed separate search information having the latest source creation time, as a target. Then, if more than one pieces of target separate search information are found, the control unit 71 selects a piece of separate search information having the number of search keys largest of all of pieces of separate search information (S670).

After step S670 is processed, the control unit 71 selects a piece of search program information, for which a query has not issued, from a search program management table (S675). Then, the control unit 71 defines the separate search information selected in step S670 as a target, and initiates a search process for the selected search program information (S680).

FIG. 12 shows an example of a data structure of the search program management table stored in the storage unit 73. As shown in FIG. 12, the search program management table includes one or more pieces of search program information, each of which includes address information (URL) of the information searching server 20 having a search program, query creation information representing a manner of creation of a query (a manner of creation of a search condition), and category information representing the type of contents to be searched by the corresponding search program.

Specifically, in step S675, the control unit 71 selects a piece of search program information for which a query is not sent to the information searching server 20 having a URL indicated by the address information, from among the pieces of search program information registered in the search program management table. Then, the control unit 71 initiates a search process (S680).

The search process initiated in step S680 is managed by a scheduler and is executed concurrently with other processes.

The search process generates a query based on the query creation information of the selected search program information, and sends it to the information searching server 20 having the URL indicated by the address information of the selected search program information.

After step S680 is processed, the control unit 71 judges whether search program information for which a query has not issued is found in the search program management table (S685). If such search program information is found (S685: YES), control returns to step S675 where the control unit 71 selects a piece of search program information from among pieces of pieces of search program information for which queries have not issued.

If search program information for which a query has not been issued is not found (S685: NO), control proceeds to step S690 where the control unit 71 judges whether an end command is received. If the end command is not received (S690: NO), control returns to step S660. If the end command is received (S690: YES), the search control process terminates.

Figure 13:
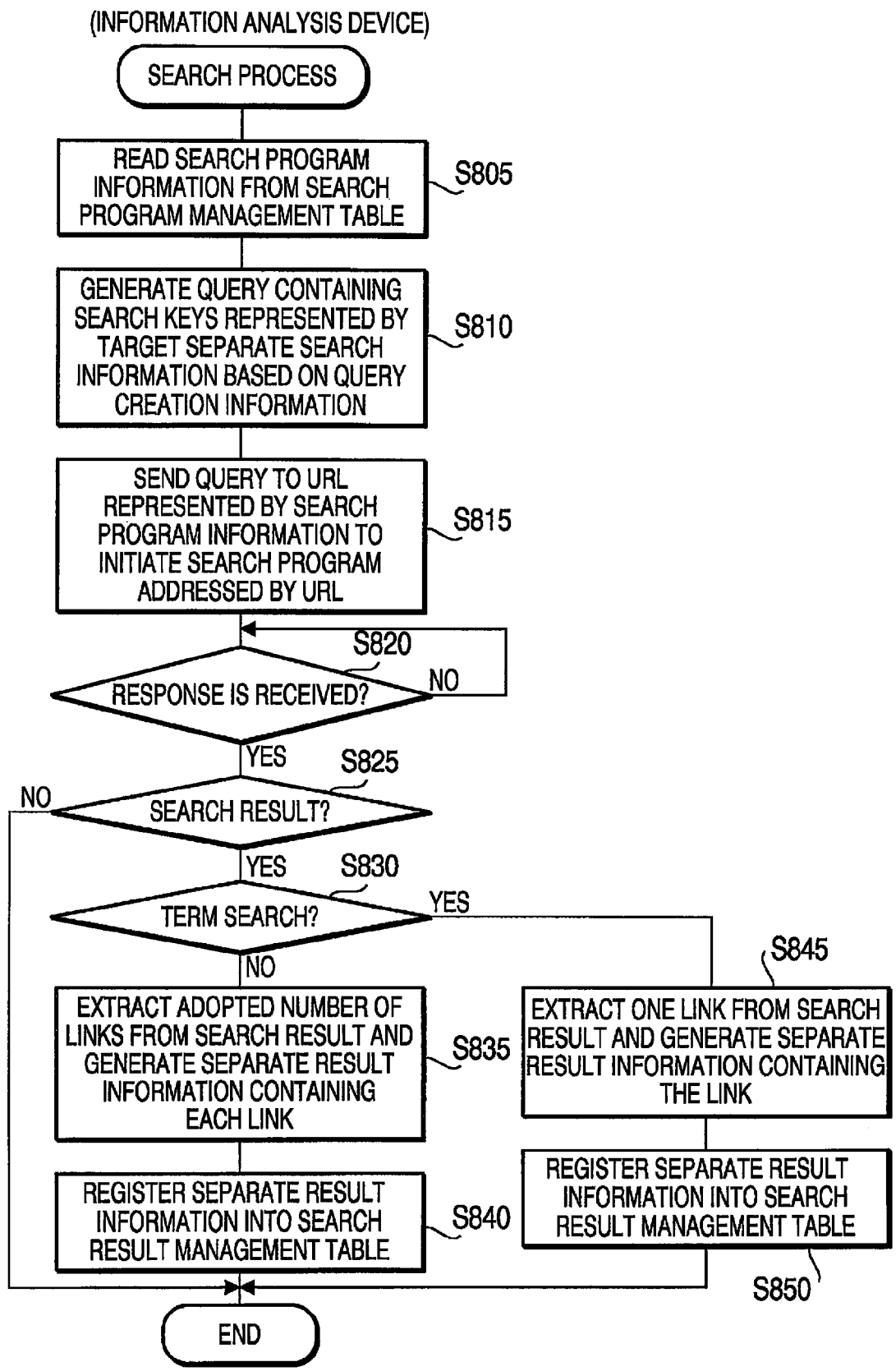
FIG. 13 is a flowchart illustrating a search process executed by the information analysis device according to the first embodiment.

Hereafter, a search process which corresponds to one of search processes executed concurrently by the control unit 71 will be explained with reference to FIG. 13.

First, the control unit 71 reads the selected search program information from the search program management table (S805). Then, the control unit 71 generates a search condition having search keys contained in the currently designated separate search information, based on the query creation information contained in the selected search program information and the search keys of the designated separate search information, and then generates a query containing the search condition to send it to the information searching server 20 (S810).

Next, the control unit 71 sends the query to a URL indicated by the search program information so as to cause the information searching server 20 to execute the search program corresponding to the URL of the information searching server 20 (S815). After receiving the query, the information searching server 20 searches for contents corresponding to the search keys contained in the separate search information in accordance with the search condition contained in the query, and then sends a reply signal containing link information to the searched contents, back to the information analysis device 70, as a search result.

After sending the query, the control unit 71 judges whether the reply signal is received (S820). The control unit 71 waits until the reply signal is received (S820: NO). If the reply signal is received (S820: YES), the control unit 71 judges whether the reply signal is formed as a search result or the reply signal indicates that the search program is aborted (S825). If the reply signal is not the search result (S825: NO), the search process terminates.

If the reply signal is a search result (S825: YES), the control unit 71 judges whether the category information of the selected search program information is "term search" (S830). If the category information is not "term search" (i.e., the category information is "general search") (S830: NO), the control unit 71 extracts a predetermined number of pieces (e.g., five pieces) of link information (determined based on the fact that the category information is "general search") from among more than one pieces of link information contained in the search result received as the reply signal. Then, the control unit 71 generates separate result information having the corresponding link information, for each of the piece of link information (S835).

Next, in step S840, the control unit 71 registers the separate result information in a search result management table stored in the storage unit 73 (S840). FIG. 14 shows an example of the search result management table. As shown in FIG. 14, the search result management table includes one or more pieces of separate result information, each of which includes source creation time information, category information representing the type of the search program which has outputted the search result, content storage address information storing the link information, acquisition information, an acquisition completion time, output information, and an evaluation value.

In step S835, the control unit 71 generates separate result information having the acquisition information of "NO", the acquisition completion time of "NULL", the output information of "NO", and the evaluation value of "NULL", for each of the extracted pieces of link information. In step S840, the generated pieces of separate result information are registered in the search result management table. After step S840 is processed, the search process terminates.

If the category information is "term search" (S830: YES), the control unit 71 extracts a predetermined number of pieces (e.g., a piece of) of link information (determined based on the fact that the category information is "term search") from among more than one pieces of link information contained in the search result received as the reply signal. Then, the control unit 71 generates separate result information having the corresponding link information (S845).

Then, the control unit 71 registers the generated separate result information in the search result management table stored in the storage unit 73 (S850). After step S850 is processed, the search process terminates.

Figure 15:
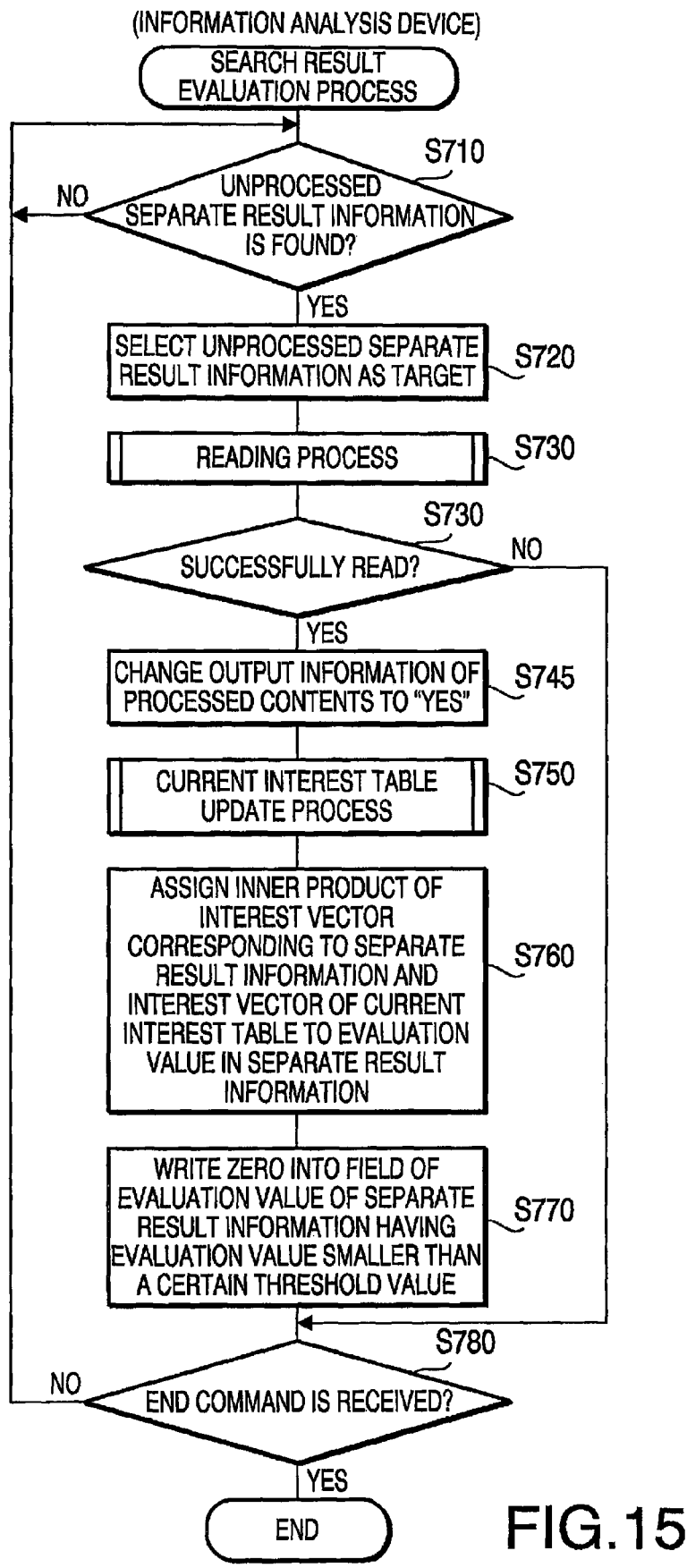
FIG. 15 is a flowchart illustrating a search result evaluation process executed by the information analysis device according to the first embodiment.

Hereafter, a search result evaluation process executed under control of the control unit 71 will be explained with reference to FIG. 15. The search result evaluation process is executed concurrently with the search control process.

First, the control unit 71 judges whether unprocessed separate result information is found in the search result management table (S710). The control unit 71 waits until unprocessed separate result information is found (S710: NO) If unprocessed separate result information is found (S710: YES), control proceeds to step S720. In step S720, the control unit 71 selects the unprocessed separate result information as a target. Then, a reading process is executed in step S730.

Figure 16:
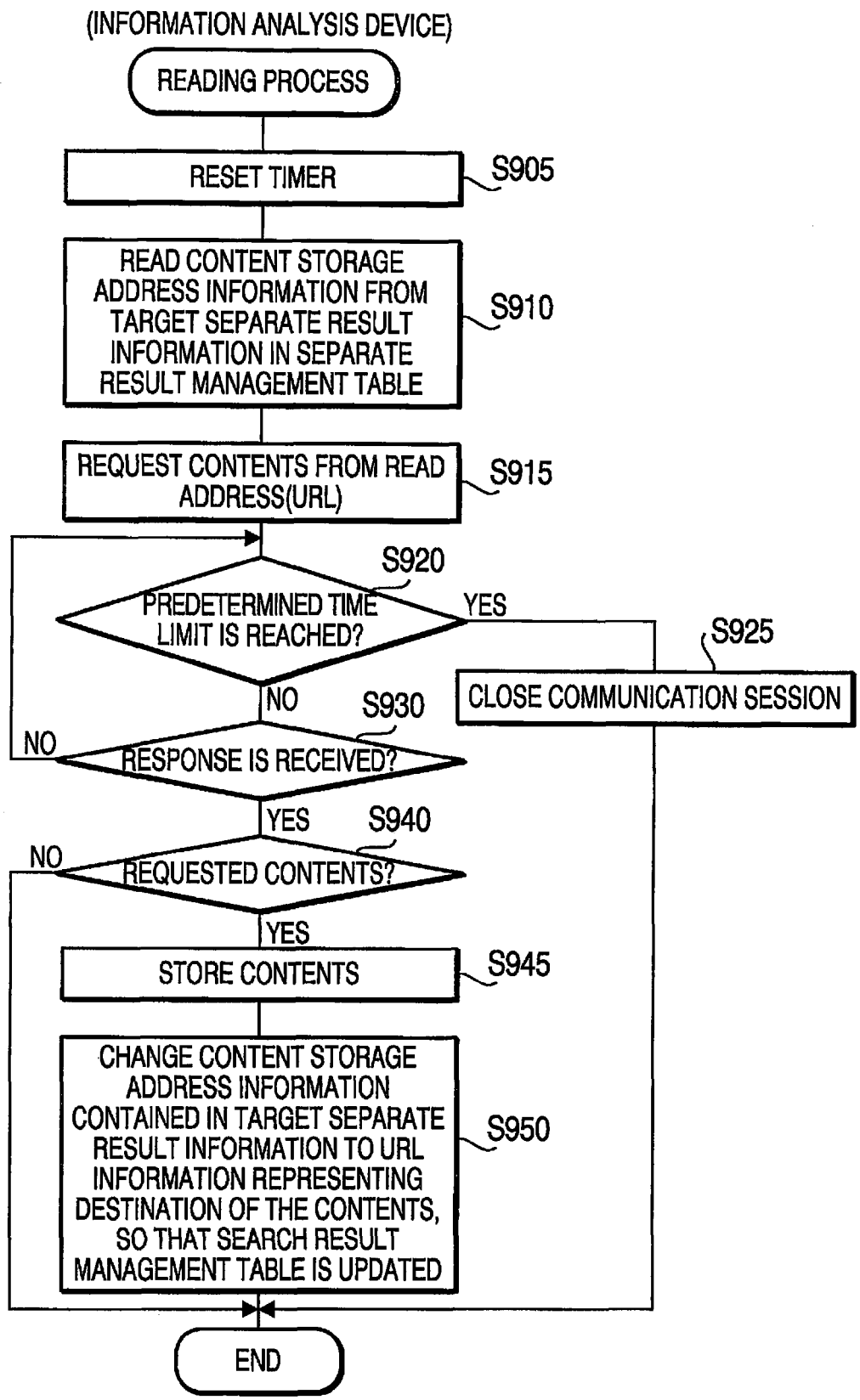
FIG. 16 is a flowchart illustrating a reading process executed by the information analysis device according to the first embodiment.

FIG. 16 is a flowchart illustrating the reading process executed under control of the control unit 71. When the reading process is initiated, the control unit 71 resets a timer (S905). Then, the control unit 71 reads the content storage address information from the target separate result information (S910), and sends a request signal for contents to a URL indicated by the content storage address information (S915).

Next, the control unit 71 judges whether a predetermined time limit is reached (S920). If the predetermined time limit is not reached (S920: NO), control proceeds to step S930. If the predetermined time limit is reached (S920: YES), the control unit 71 closes the session (i.e., ends the communication). Then, the reading process terminates.

In step S930, the control unit 71 judges whether a response signal to the request signal transmitted in step S915 is received. If the response signal is not received (S930: NO), control returns to step S920. If the response signal is received (S930: YES), the control unit 71 judges whether the received response signal is the requested contents or error information (S940). If the response signal is not the requested contents (i.e., the error information) (S940: NO), the reading process terminates.

If the response signal is the requested contents (S940: YES), the control unit 71 stores the contents in the storage unit 73 (S945). Then, the control unit 71 changes the content storage address information contained in the target separate result information to the URL information representing the destination of the contents, so that the search result management table is updated (S950). Then, the reading process terminates.

Referring back to FIG. 15, after the reading process is finished, control proceeds to step S740. In step S740, the control unit 71 judges whether the contents are successfully received in the reading process. Specifically, the control unit 71 judges that the contents are read successfully if the reading process is finished through step S950, while the control unit 71 judges that the contents are not received successfully if the reading process is finished without processing step S950.

If the contents are successfully received (S740: YES), control proceeds to step S745. If the contents are not successfully received (S740: NO), the control unit 71 judges whether an end command is received (S780). If the end command is not received (S780: NO), control returns to step S780. If the end command is received (S780: YES), the search result evaluation process terminates.

In step S745, the control unit 71 changes the acquisition information of the separate result information corresponding to the obtained contents to "YES", and writes a current time into a field of the acquisition completion time of the separate result information. Next, in step S750, the control unit 71 executes a current interest table update process.

Figures 17, 18:
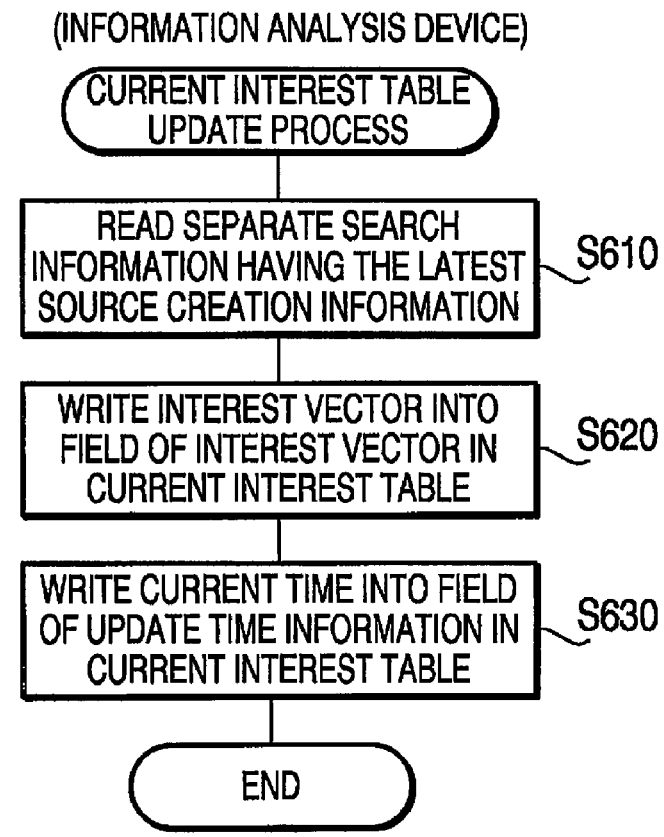
FIG. 17 is a flowchart illustrating a current interest table update process executed by the information analysis device according to the first embodiment.
FIG. 18 shows an example of a data structure of a current interest table according to the first embodiment.

FIG. 17 is a flowchart illustrating the current interest table update process. First, the control unit 71 searches the search information management table for separate search information having the latest source creation time, and reads the interest vector of the searched separate search information (S610). Then, the control unit 71 writes the interest vector into a field of the interest vector in a current interest table.

After step S620 is processed, the control unit 71 writes the current time into a field of the update time information in the current interest table (S630). Then, the current interest table update process terminates. FIG. 18 shows an example of a data structure of the current interest table. As shown in FIG. 18, the current interest management table includes a record containing the update time information representing a time when the record is updated, and the interest vector representing the current interest of the user.

Referring back to FIG. 15, after step S750 is processed, control unit 71 calculates an inner product of the interest vector Vc of the current interest table and the interest vector V of the separate search information corresponding to the separate result information selected in step S720. Then, the control unit 71 writes the inner product into a field of the evaluation value in the separate result information selected in step S720.

More specifically, the calculation is conducted as follows. The control unit 71 divides the interest vector V by its norm $\|V\|$ to obtain a normal vector E of the interest vector V.

$$E=V/\|V\|$$

Furthermore, the control unit 71 divides the current interest vector Vc by its norm $\|Vc\|$ to obtain a normal vector Ec of the current interest vector Vc.

$$Ec=Vc/\|Vc\|$$

Next, the control unit 71 obtains an inner product R of the normal vector E of the interest vector V and the normal vector Ec of the current interest vector Vc.

$$R=E \cdot Ec$$

The control unit 71 thus updates the separate result information of the search result management table.

After step S760 is processed, the control unit 71 writes zero into the field of the evaluation value for each the evaluation values of the pieces of separate result information having the evaluation value smaller than a certain threshold value (S770). The threshold value may be determined based on empirical data, or may be determined by a use according to the user's preference so that the decisions regarding the output of contents can be controlled.

After step S770 is processed, the control unit 71 judges whether an end command is received (S780). If the end command is not received (S780: NO), control returns to step S710. If the end command is received (S780: YES), the search result evaluation process terminates.

Figure 19:
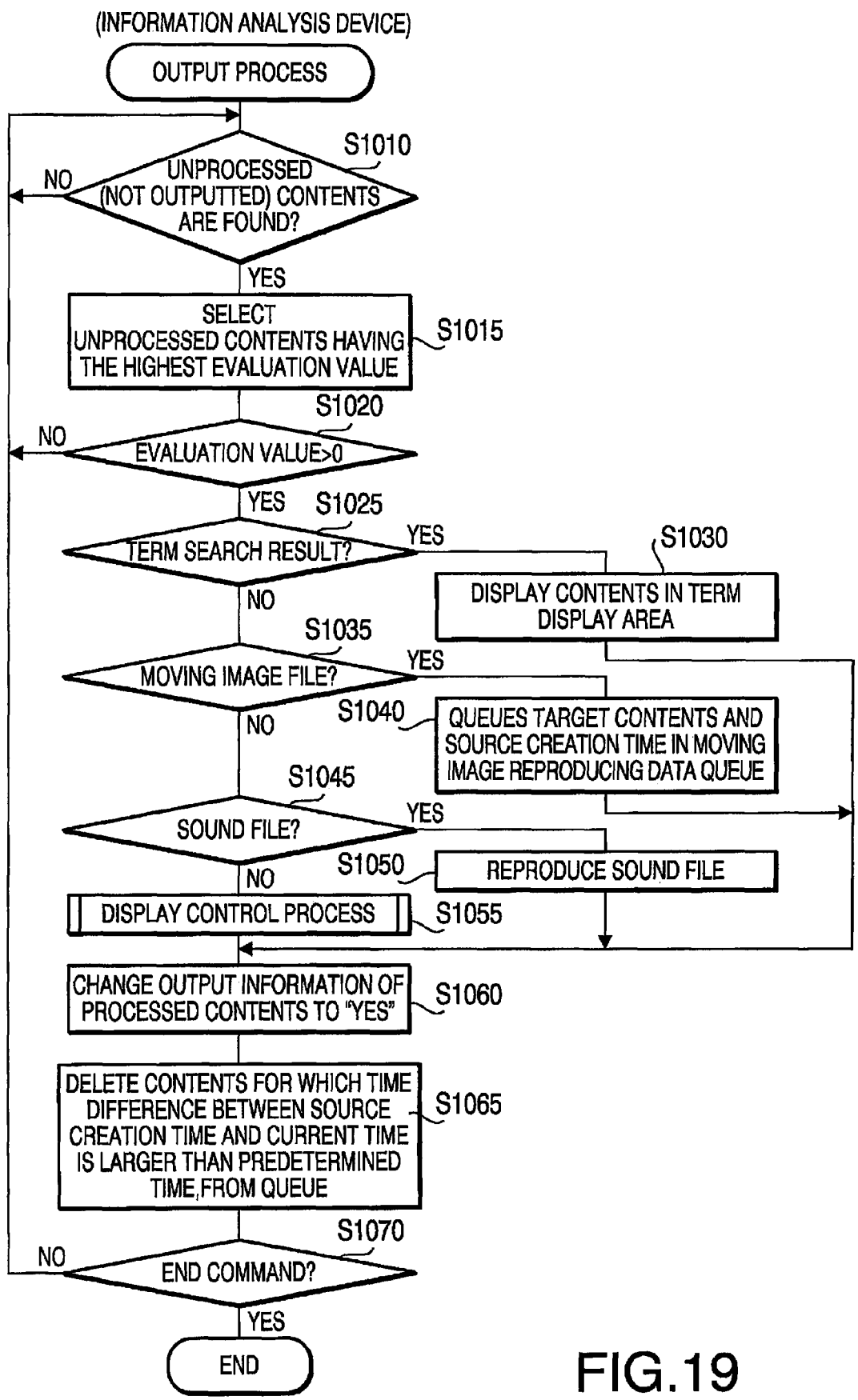
FIG. 19 is a flowchart illustrating a output process executed by the information analysis device according to the first embodiment.

Hereafter, an output process executed under control of the control unit 71 of the information analysis device 70 will be explained with reference to FIG. 19. The output process is executed concurrently with the search result evaluation process. First, the control unit 71 judges whether contents not outputted exist in the storage unit 73 based on the acquisition information and the output information in the search result management table (S1010). Specifically, if the separate result information having the acquisition information "YES" and the output information "NO" exists in the storage unit 73, the control unit 71 judges that the contents corresponding to the separate result information having the acquisition information "YES" and the output information "NO" is not outputted.

The control unit 71 waits until contents not outputted are found in the storage unit 73 (S1010: NO). If contents not outputted are found in the storage unit 73 (S1010: YES), the control unit 71 selects a content item having the highest evaluation value of all of evaluation values of content items which are not outputted, as a target (S1015). If the evaluation value of the target contents (selected content item) is not higher than zero (S1020: NO), the control unit 71 changes the output information of the separate result information corresponding to the target contents to "YES", and thereafter control returns to step S1010.

If the evaluation value of the target contents is higher than zero (S1020: YES), control proceeds to step S1025 where the control unit 71 judges whether the target contents correspond to a result of the term search in accordance with the category information of the separate result information corresponding to the target contents. Alternatively, the control unit 71 may judge whether the target contents correspond to the result of term search by analyzing the contents.

If the target contents correspond to the result of the term search (S1025: YES), the control unit 31 displays the target contents on the term display area IM43 on the display unit 77 (S1030). Then, control proceeds to step S1060.

If the target contents do not correspond to the result of the term search (S1025: NO), the control unit 71 judges whether the target contents correspond to a moving image file (S1035). If the target contents correspond to a moving image file (S1035: YES), the control unit 71 queues the target contents and source creation time of source information corresponding to the target contents in a moving image reproducing data queue, while associating the target contents with the source creation time (S1040). Then, control proceeds to step S1060.

In this embodiment, the control unit 71 of the information analysis device 70 is capable of functioning as a moving image reproducing data queue and reproducing contents (moving image files) registered in the moving image reproducing data queue. FIG. 21A schematically illustrates a relationship of the moving image reproducing data queue and a moving image reproducing area control process. In the moving image reproducing area control process, content items (moving image files) registered in the moving image reproducing data queue are reproduced sequentially in order in which the contents are registered so that the moving image are reproduced in the moving image area IM 42 on the content providing screen and sound is reproduced through the sound output unit 79.

Referring back to FIG. 19, if the target contents do not correspond to a moving image file (S1035: NO), control proceeds to step S1045 where control unit 71 judges whether the target contents correspond to a sound file. If the target contents correspond to a sound file (S1045: YES), the control unit 71 processes the sound file so that the sound is reproduced through the sound output unit 79 (S1050). Then, control proceeds to step S1060.

If the reproducing process, which is initiated for another sound file previously, is running, the control unit 71 stops the reproducing process for the previously targeted sound file, and then initiates a reproducing process for a currently targeted sound file. If a moving image with sound is being produced for previously targeted contents, the control unit 71 reproduces the currently targeted sound file in place of reproducing the sound of the previously targeted contents, through the sound output unit 79.

If the target contents do not correspond to a sound file (S1045: NO), control proceeds to step S1055 where the control unit 71 executes a display control process executed under control of the control unit 71 of the information analysis device 70.

Figure 20:
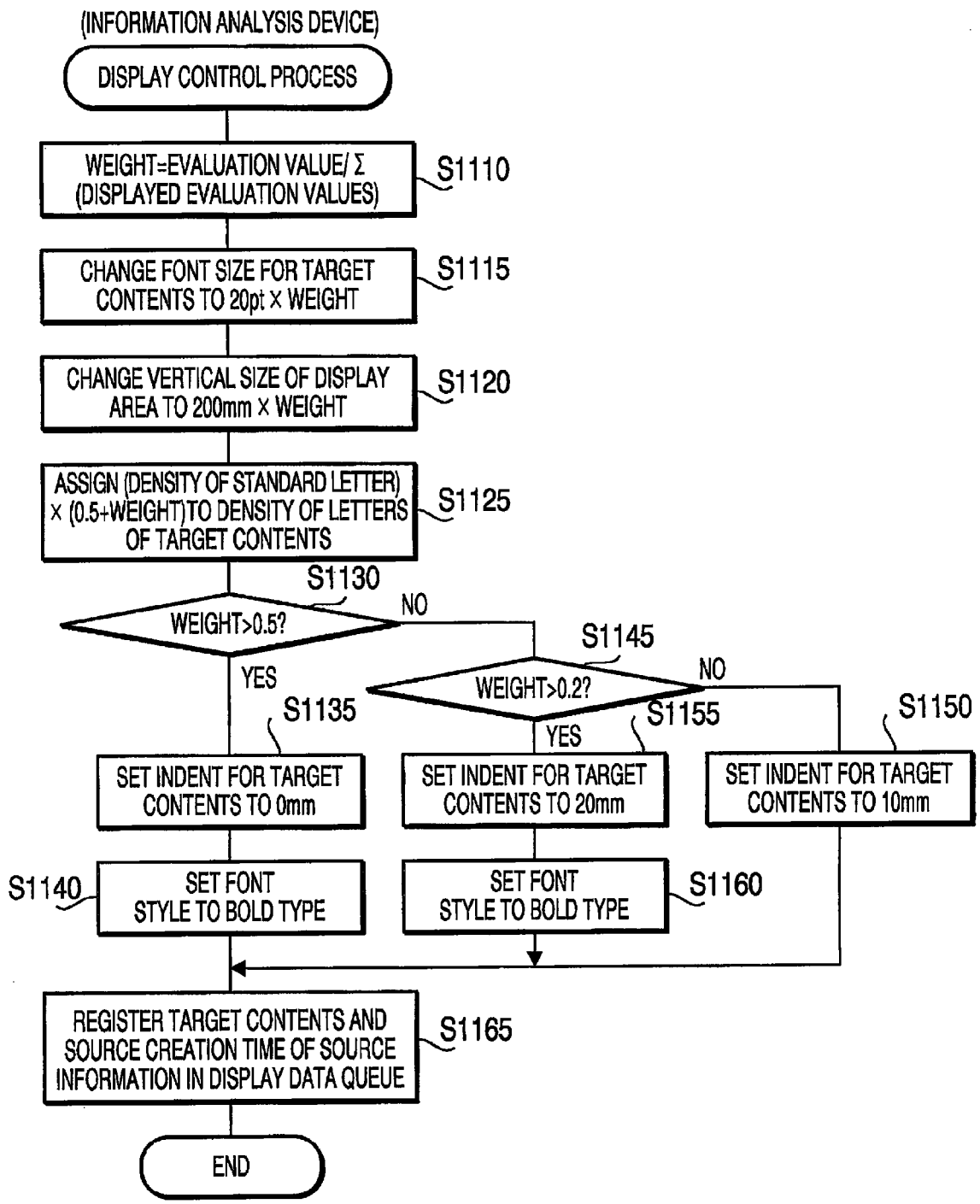
FIG. 20 is a flowchart illustrating a display control process executed by the information analysis device according to the first embodiment.

FIG. 20 is a flowchart illustrating the display control process. When the display control process is started, the control unit 71 calculates a ratio of the evaluation value of the target contents (the content item selected in step S1015) to a sum of evaluation values of contents in a display data queue for the text and image area IM 41, as a weight (S1110). Next, the control unit 71 changes a font size for the target contents to 20 pt×weight (S1115), and changes a vertical size of a display area for the target contents in the text and image area IM 41 to 200 mm×weight (S1120). Further, the control unit 71 decides to assign (the density of a standard letter)×(0.5+weight) to the density of letters of the target contents (S1125).

After step S1130 is processed, the control unit 71 judges whether the weight is larger than 0.5 (S1130). If the weight is larger than 0.5 (S1130: YES), the control unit 71 sets the indent of the target contents to 0 mm from the left edge of the display area (S1135), and sets the font style to the bold type (S1140). Then, control proceeds to step S1165.

If the weight is not larger than 0.5 (S1130: NO), control proceeds to step S1145 where the control unit 71 judges whether the weight is smaller than 0.2. If the weight is smaller than 0.2 (S1145: YES), control proceeds to step S1155 where the control unit 71 sets the indent for the target contents to 200 mm from the left edge of the display area. Next, the control unit 71 sets the font style to the bold type (S1140). Then, control proceeds to step S1165.

If the weight is not smaller than 0.2 (S1145: NO), control proceeds to step S1150 where the control unit 71 sets the indent for the target contents to 10 mm from the left edge of the display area. Then, control proceeds to step S1165. In step S1165, the control unit 71 registers the target contents, and the source creation time of the source information corresponding to the target contents in a display data queue, while associating the target contents with the source information corresponding to the target contents. Then, the display control process terminates.

In this embodiment, the control unit 71 of the information analysis device 70 is capable of functioning as a display data queue and displaying the contents (e.g., information containing letters and images, such as a web page) registered in the display data queue.

FIG. 21B schematically illustrates a relationship of the display data queue controlled by the control unit 71 and a text and image area display control process to be executed by the control unit 71. In the text and image area display control process, contents registered in the display data queue are processed sequentially so that the contents are displayed within the text and image area IM41.

Referring back to FIG. 19, after the display control process (S1055) is finished, the control unit 71 changes the output information of the separate result information corresponding to the target contents to "YES" (S1060). Then, the control unit 71 removes the contents having a difference between the source creation time and the current time larger than a predetermined value, from the moving image reproducing data queue or the display data queue.

Next, the control unit 71 judges whether an end command is received (S1070). If the end command is not received (S1070: NO), control returns to step S1010. If the end command is received (S1070: YES), the output process terminates.

As described above, according to the embodiment, the degree of interest in contents is evaluated after the contents are obtained (by the search result evaluation process), and thereafter the contents are outputted (by the output process). Therefore, contents not desired by a user are prevented from being provided to the user. Furthermore, it becomes possible to provided contents desired by a user to the user timely.

In the above mentioned embodiment, contents are outputted in order of superiority of evaluation result (steps S1010 to S1055 in the output process). Therefore, according to the embodiment, it is possible to quickly provide contents having a high possibility of coinciding with user demands, to the user.

In the above mentioned embodiment, contents having the evaluation value smaller than or equal to zero are not outputted (S1020: NO of the output process). Therefore, only the contents comparatively equal to the user's interest are outputted. That is, contents of inferior value are prevented from being outputted.

In the above mentioned embodiment, the user's interest is estimated based on the source information most recently stored in the source management table (by the current interest table update process). In general, the source information most recently stored in the source management table can be regarded as information closely relating to a current user's interest. Therefore, according to the embodiment, the estimated interest closely relates to the current user's interest. It is understood that such a configuration makes it possible to provide contents matching the user's current interest, to the user.

Hereafter, a variation of the current interest table update process (a current interest table update process 2) to be executed under control of the control unit 71 will be explained with reference to FIG. 22. First, the control unit 71 compares an end time stored in a current interest table 2 (see FIG. 23) with the current time so as to judge whether the end time reaches the current time (S1210). FIG. 23 shows an example of a data structure of the current interest table 2. As shown in FIG. 23, the current interest table 2 includes a record containing an update time representing a time when the record is updated, an end time representing an effective end time of an interest vector, and an interest vector representing the user's current interest.

If it is judged in step S1210 that the end time stored in the current interest table 2 does not reach the current time (S1210: YES), the current interest table update process 2 terminates.

If it is judged in step S1210 that the end time stored in the current interest table 2 reaches the current time (S1210: NO), the control unit 71 reads the separate search information having the latest source creation time in the search information management table (S1220). Then, the control unit 71 writes the interest vector contained in the separate search information into a field of the interest vector of the current interest table 2 (S1230).

Next, the control unit 71 calculates an interest continuation time corresponding to the interest vector contained in the separate search information, obtaining a sum of the calculated interest continuation time and the end time currently set in the current interest table 2, and writes the obtained sum into an area of the end time (S1240). FIG. 24 is an example of a data structure of the interest continuation time table. As shown in FIG. 24, the interest continuation time table includes records. In each record, the type of interest is associated with an estimated time during which the interest continues.

In step S1240, an interest continuation time corresponding to an element (the type of interest) having the maximum value from the interest continuation time table may be selected as the interest continuation time for the targeted separate search information.

The interest continuation time for the targeted separate search information may be calculated by coupling values in the interest continuation time table corresponding to the elements forming the normalized interest vector, and may define the calculated value as the interest continuation value for the targeted interest continuation time. For example, if the normalized interest vector $V(v1, v2, v3)$ is represented by $V(v1, v2, v3)=(0.7, 0.2, 0.1)$, and interest continuation times for the respective elements are (10 seconds, 20 seconds, 5 seconds), the interest continuation time for the targeted separate search information may be calculated as follows.

(the interest continuation time)=(10 seconds×0.7)+(20 seconds×0.2)+(5 seconds×0.1)=11.5 seconds After step S1240 is processed, the control unit 71 assigns the current time to an area of the update time in the current interest table 2 (S1250). Then, the current interest table update process 2 terminates.

There may be a case where an interest of a user continues for a predetermined time period depending on a situation regarding the user's thinking. In such a situation, it is preferable not to evaluate a user's interest a number of times within the predetermined time period. Rather, undesired information (contents) may be provided to the user if the evaluation of the user's interest is conducted a number of times within the predetermined time period. It is understood that the use of the current interest table update process 2 prevents the occurrence of such an undesired situation (i.e., a situation where undesired contents (noises) are provided to the user), because the current interest table update process 2 is based on the fact that if an interest vector is once set, the interest vector can be kept in a predetermined time period before the end time is reached (step S1210). That is, the use of the current interest table update process 2 makes it possible to provide desirable contents to the user without causing processes for providing undesired contents to the user.

Hereafter, a variation of the search result evaluation process shown in FIG. 15 (a search result evaluation process 2) to be executed by the control unit 71 will be explained with reference to FIG. 25. First, the control unit 71 judges whether unprocessed separate result information is found in the search result management table (S1310). The control unit 71 waits until unprocessed separate result information is found (S1310: NO) If unprocessed separate result information is found (S1310: YES), control proceeds to step S1320. In step S1320, the control unit 71 selects the unprocessed separate result information as a target. Then, the above mentioned reading process (see FIG. 16) is executed in step S1330.

After the reading process is finished, control proceeds to step S1340. In step S1340, the control unit 71 judges whether the contents are successfully received in the reading process. Specifically, the control unit 71 judges that the contents are read successfully if the reading process is finished through step S950, while the control unit 71 judges that the contents are not received successfully if the reading process is finished without processing step S950.

If the contents are successfully received (SI 340: YES), control proceeds to step S1350. If the contents are not successfully received (S1340: NO), the control unit 71 judges whether an end command is received (S1390). If the end command is not received (S1390: NO), control returns to step S1310. If the end command is received (S1310: YES), the search result evaluation process 2 terminates.

In step S1350, the control unit 71 changes the acquisition information of the separate result information corresponding to the obtained contents to "YES", and writes a current time into a field of the acquisition completion time of the separate result information. Next, in step S1360, the control unit 71 reads the separate search information corresponding to the targeted separate result information, and calculates an interest continuation time corresponding to the interest vector contained in the separate search information by referring to the interest continuation time table.

In step S11350, an interest continuation time corresponding to an element (the type of interest) having the maximum value from the interest continuation time table may be selected as the interest continuation time for the targeted separate search information.

The interest continuation time for the targeted separate search information may be calculated by coupling values in the interest continuation time table corresponding to the elements forming the normalized interest vector, and may define the calculated value as the interest continuation value for the targeted interest continuation time. For example, if the normalized interest vector V(v1, v2, v3) is represented by V(v1, v2, v3)=(0.7, 0.2, 0.1), and interest continuation times for the respective elements are (10 seconds, 20 seconds, 5 seconds), the interest continuation time for the targeted separate search information may be calculated as follows.

(the interest continuation time)=(10 seconds×0.7)+(20 seconds×0.2)+(5 seconds×0.1)=11.5 seconds After step S1360 is processed, the control unit 71 calculates a time difference between the source creation time and the acquisition completion time in the separate result information. Then, the control unit 71 subtracts the time difference from the interest continuation time, and writes the result into an area of the evaluation value in the separate result information (S1380).

Next, the control unit 71 judges whether an end command is received (S1390). If the end command is not received (S1390: NO), control returns to step S1310. If the end command is received (S1310: YES), the search result evaluation process 2 terminates.

It is understood that the use of the search result evaluation process 2 makes it possible to prevent contents, which do not meet the transition of the user's interest, from being provided to the user.

In the content providing system 1, the information analysis device 70 is formed as a standalone computer. However, a computer having the functions of the information analysis device 70 and the functions of the PC 30 may be implemented in a single computer.

Second Embodiment

Hereafter, a content providing system according to a second embodiment of the invention will be described. Since a configuration of the content providing system according to the second embodiment is substantially the same as that shown in FIG. 1, the content providing system according to the second embodiment is explained with reference to FIG. 1. In this embodiment, a source management table, an interest estimation table, a search information management table, a search process management table, a search program management table, a reading process management table, and a search result management table are stored in the storage unit 73 and are managed by the information analysis device 70.

In this embodiment, the PC 30 executes the same PC monitoring process as that shown in FIG. 2, the digital telephone 50 executes the same telephone monitoring process as that shown in FIG. 3, and the information analysis device 70 executes the same source information registration process as that shown in FIG. 5. Therefore, the content providing system 1 according to the second embodiment is explained with reference to FIGS. 1 to 6, and explanations of FIGS. 1 to 6 will not be repeated.

Hereafter, a keyword extraction process executed under control of the control unit 71 of the information analysis device 70 will be explained with reference to FIG. 26.

First, the control unit 71 sets an update flag stored in the storage unit 73 to OFF (S2410). Then, the control unit 71 judges whether unprocessed source information is found in the source management table (S2420). The control unit 71 waits until unprocessed source information is found (S2420: NO).

If unprocessed source information is found (S2420: YES), the control unit 71 analysis text data of a file associated with the unprocessed source information (targeted source information) to obtain nouns from the file, and extracts nouns other than particular nouns, from the obtained nouns, and sets the extracted nouns as keywords (S2430). In this embodiment, generally used nouns which do not serve as keywords for search for contents are defined as the particular keywords. The particular keywords are stored in advance in the storage unit 73.

Next, the control unit 71 judges whether the digital telephone 50 is in telephone communication with another telephone (S2440). In step S2440, the control unit 71 judges that the digital telephone 50 is in telephone communication with another telephone until a predetermined time period (e.g., a time period obtained by adding a correction value α (determined considering a processing delay) to a certain time period T2) has elapsed from the time when the source information having the device usage information of "call" or "call in" is registered in the source management table. The control unit 71 judges that the digital telephone 50 is not in communication with another telephone in a time other than the above mentioned predetermined time period.

If the judgment result of step S2440 is YES, the control unit 71 assigns a telephone current interest vector Vp, which is a parameter representing a user's interest, to a current interest vector Vc to be used for a similarity evaluation (which is described in detail later) (S2451). Specifically, the control unit 71 assigns an address of the telephone current interest vector to an address pointer of the current interest vector Vc.

In this embodiment, a user's interest is represented by a vector, and the priority of content searching and reading is decided in accordance with the vector. That is, an interest vector is used to express numerically a user's interest. Specifically, the interest vector is represented by a one row and n column vector.

$$V=(v1, vv2, \ldots, vn)$$

After step S2451 is processed, the control unit 71 executes a telephone analysis process (S2453). FIG. 27 is a flowchart illustrating the telephone analysis process executed under control of the control unit 71. When the telephone analysis process is started, the control unit 71 judges whether an interest end time representing an expiration date of the telephone current interest vector is reached (S2510). If the interest end time is reached (S2510: YES), control proceeds to step S2520). The interest end time is reset when power of the information analysis device 70 is turned to ON, and is kept in the reset state until step S2550 is initially processed. If step S2510 is processed while the interest end time is in the reset state, the control unit 71 judges that the interest end time is reached as an exception.

In step S2520, the control unit 71 executes an interest vector calculation process. FIG. 28 is a flowchart illustrating the interest vector calculation process.

When the interest vector calculation process is started, the control unit 71 resets an interest vector V to zero (S2610). Then, the control unit 71 selects an unprocessed keyword from among keywords extracted in step S2430 (FIG. 26) as a target keyword (S2620). Further, the control unit 71 searches an interest estimation table stored in the storage unit 73 for the target keyword (S2630). FIG. 29 shows an example of a data structure of the interest estimation table. As shown in FIG. 29, the interest estimation table includes keywords, a continuation time (continuation time estimation information) representing an estimated time during which a user's interest continues, and parameters for weight (weighting definitions), for each of the types of interest.

After step S2630 is processed, the control unit 71 judges whether the target keyword is found (S2640). If the target keyword is found among the keywords registered in the interest estimation table (S2640: YES), the control unit 71 determines the type of interest to which the target keyword belongs, using the interest estimation table (S2650). Then, the control unit 71 adds 1 to the element vi (where i (i=1, 2, . . . , n) corresponds to the type of interest) of the interest vector V. Then, control proceeds to step S2670.

If the target keyword is not found in the keywords registered in the interest estimation table (S2640: NO), control proceeds to step S2670. In step S2670, the control unit 71 judges whether an unprocessed keyword exists in the extracted keywords. If an unprocessed keyword is found (S2670: YES), control returns to step S2620 to select one of the unprocessed keywords as a target keyword. In this embodiment, if one or more same keywords are found among the keywords obtained in step S2430, all of the same keywords undergo the steps S2640 to S2660.

If an unprocessed keyword is not found (S2670: NO), the interest vector V is calculated in accordance with weighing definitions in the interest estimation table. That is, each element vi is weighted in accordance with the corresponding weighting definition.

The weighting definitions are categorized in two groups. A first weighting definition is represented by a combination of the device usage information and a weighting factor W. A second weighting definition is represented by the time information and a weighting factor W. The control unit 71 weights each element vi corresponding to the first weighting definition if the device usage information of the source information corresponding to the file (of which keywords are extracted in step S2430) is equal to the device usage information represented by the weighting definition.

More specifically, in step S2680, the control unit 71 selects the element vi corresponding to the type of interest having the first weighting definition of which device usage information is equal to the device usage information of the source information corresponding to the file (of which keywords are extracted in step S2430), as a weighting target. The control unit 71 further multiplies the weighting target vi by the weighting factor W as shown below.

$$vi \leftarrow vi \times W$$

Then, the control unit 71 weights the element vi corresponding to the type of weighting to which the second weighting definition is assigned if the current time is within the time period represented by the time information of the weighting definition of the element vi.

In step S2680, the control unit 71 multiplies the element vi, which corresponds to the type of interest to which the second weighting definition belongs and has the time information within which the current time lies, by the weighting factor W.

After S2680 is processed, the control unit 71 outputs the calculation result as a return value. Then, the interest vector calculation process terminates.

Referring back to FIG. 27, after step S2520 is finished, the control unit 71 assigns the value of the interest vector calculated by the interest vector calculation process to the telephone current interest vector Vp. Next, the control unit 71 determines an element having the maximum value of all of the elements of the telephone current interest vector (S2540).

Next, the control unit 71 adds the continuation time corresponding to the type of interest determined in step S540 to the current time, and assigns the calculation result to the interest end time (S550). If more than one elements have the same maximum value in the telephone current interest vector Vp, the control unit 71 may add the value of the element having the maximum continuation time of all of the continuation times having the same maximum value, to the current time, and may assign the calculation result to the interest end time. Then, control proceeds to step S2560.

If it is judged that the interest end time is not reached (S2510: NO), control proceeds to step S2525 where the control unit 71 reads the value of the telephone current interest vector Vp as the interest vector V to be used in step S2580. Then, control proceeds to step S2560.

In step S2560, the control unit 71 secures a new writing area for separate search information in the search information management table stored in the storage unit 73. Then, the control unit 71 writes the source creation time of the source information for which the keywords are extracted in step S2430, into the secured area (S2570). Further, the control unit 71 writes the interest vector calculated in step S2520 or the interest vector read in step S2525 into the secured area (S2580), writes the keywords extracted in step S2430 into the secured area as search keys (S2590), and writes the number of search keys into the secured area (S2595).

FIG. 30 shows an example of a data structure of the search information management table. As shown in FIG. 30, the search information management able includes one or more pieces of separate search information, each of which includes source creation time, a value of an interest vector, information about search keys, the number of search keys, and an evaluation value which is obtained by a similarity evaluation process (see FIG. 34).

Through steps S2560 to S2595, the control unit 71 registers the separate search information corresponding to the source information, for which the keywords are extracted in step S2430, into the search information management table. In this case, the evaluation value in the separate search information is null data. After step S2595 is processed, the telephone analysis process terminates.

Referring back to FIG. 26, if it is judged in step S2440 that the digital telephone 50 is not in communication with another telephone (S2440: NO), control proceeds to step S2461 where the control unit 71 sets a call-in flag to OFF. Next, the control unit 71 decides to use a non-telephone current interest vector Vw as the current interest vector Vc (S2463). Specifically, the control unit 71 assigns an address of the non-telephone current interest vector to an address pointer of the current interest vector Vc.

Next, the control unit 71 executes a non-telephone analysis process (S2465). FIG. 31 is a flowchart illustrating the non-telephone analysis process executed by the control unit 71. When the non-telephone analysis process is started, the control unit 71 executes the interest vector calculation process shown in FIG. 28 (S2710). After the interest vector calculation process is finished, the control unit 71 assigns the calculation result of the interest vector obtained in step S2710 to the non-telephone current interest vector Vw (S2730).

Next, in step S2740, the control unit 71 secures a new writing area for separate search information in the search information management table stored in the storage unit 73. Then, the control unit 71 writes the source creation time of the source information for which the keywords are extracted in step S2430, into the secured area (S2750). Further, the control unit 71 writes the interest vector calculated in step S2710 into the secured area (S2760), writes the keywords extracted in step S2430 into the secured area as search keys (S2770), and writes the number of search keys into the secured area (S2780).

Through steps S2740 to S2780, the control unit 71 registers the separate search information corresponding to the source information, for which the keywords are extracted in step S2430, into the search information management table. In this case, the evaluation value in the separate search information is null data. After step S2780 is processed, the non-telephone analysis process terminates.

Referring back to FIG. 26, after the non-telephone analysis process is finished, control proceeds to step S2467 where the control unit 71 resets the current end time.

In step S2470, the control unit 71 judges whether the current interest vector Vc changes by a predetermined amount. Specifically, the control unit 71 judges that the current interest vector Vc changes by the predetermined amount if the value currently assigned to the current interest vector Vc is different from the value which is previously assigned to the current interest vector Vc in step S470, while the control unit 71 judges that the current interest vector Vc does not change by the predetermined amount if the value currently assigned to the current interest vector Vc is equal to the value which is previously assigned to the current interest vector Vc in step S470. When step S2470 is executed for the first time after the power of the information analysis device 70 is turned to ON, the control unit 71 judges that the current interest vector Vc changes by the predetermined amount.

If the judgment result of step S2470 is NO, control returns to step S2420 to wait until unprocessed source information is found. If the judgment result of step S2470 is YES, the control unit 71 sets the update flag to ON (S2475), and thereafter judges whether an operation mode of the digital telephone 50 is a "call-in telephone communication mode" (S2480).

Specifically, the control unit 71 judges that the digital telephone 50 is in the call-in telephone communication mode until a predetermined time period (e.g., a time period obtained by adding a correction value a (determined considering a processing delay) to a certain time period T2) elapses from a time when the source information having the device usage information of "call-in" is registered in the source management table, while the control unit 71 judges that the digital telephone 50 is not in the call-in telephone communication mode in a time other than the above mentioned time period.

The call-in telephone communication mode means an operation mode in which the digital telephone 50 is in the telephone communications with a telephone after receiving a call from the telephone. Operation modes of the digital telephone 50 include a "non telephone communication mode" in which the digital telephone 50 is running without communicating with another telephone, and a "call telephone communication mode" in which the digital telephone 50 is in telephone communications with a telephone after calling the telephone.

If the judgment result of step S2480 is YES, the control unit 71 sets the call-in flag to ON (S2481). If the judgment result of step S2480 is NO, the control unit 71 sets the call-in flag to OFF (S2485). Then, control proceeds to step S2490.

In step S2490, the control unit 71 judges whether an end command is received. If the end command is not received (S2490: NO), control returns to step S2420 to wait until unprocessed source information is found. If the end command is received (S2490: YES), the keyword extraction process terminates.

Hereafter, a search control process executed under control unit 71 of the information analysis device 70 will be explained with reference to FIGS. 32 and 33. The search control process is executed concurrently with the keyword extraction process.

First, the control unit 71 resets the count representing the number of search processes to zero (S2810). Then, the control unit 71 judges whether the update flag stored in the RAM is ON (S2820). If the update flag is ON (S2820: YES), the control unit 71 resets the evaluation values of all of the pieces of separate search information registered in the search information management table, so that the search information management table is brought to a state where evaluation values thereof have not been set (S2821).

Next, in step S2825, a similarity evaluation process is executed. FIG. 34 is a flowchart illustrating the similarity evaluation process executed under control of the control unit 71. When the similarity evaluation process is started, the control unit 71 judges whether unprocessed separate search information (i.e., separate search information for which an evaluation value has not been set) is found in the search information management table stored in the storage unit 73 (S3010).

If unprocessed separate search information is found (S3010: YES), control proceeds to step S3020 where one of pieces of unprocessed separate search information is selected as a target (S3020). Next, the control unit 71 divides the interest vector V by its norm $\|V\|$ to obtain a normal vector E of the interest vector V (S3030).

$$E = V/\|V\|$$

Furthermore, the control unit 71 divides the current interest vector Vc by its norm $\|Vc\|$ to obtain a normal vector Ec of the current interest vector Vc (S3040).

$$Ec = Vc/\|Vc\|$$

Next, the control unit 71 obtains an inner product R of the normal vector E of the interest vector V and the normal vector Ec of the current interest vector Vc (S3050).

$$R = E \cdot Ec$$

The control unit 71 writes the inner product R (i.e., a value representing a similarity between the current interest vector Vc and the interest vector V of the target separate search information) into the area for the evaluation value of the target separate search information in the search information management table (S3060). The control unit 71 thus updates the target separate search information in the search information management table.

After step S3060 is processed, control returns to step S3010 to judge whether unprocessed separate search information is found. If unprocessed separate search information is not found (S3010: NO), the similarity evaluation process terminates.

Referring back to FIG. 32, after step S825 is finished, the control unit 71 sets the update flag to "OFF" (S2827). Then, control proceeds to step S2840. If in is judged in step S2820 that the update flag is not ON (S2820: NO), control proceeds to step S2830 where the similarity evaluation process is executed. Then, control proceeds to step S2840.

In step S2840, the control unit 71 judges whether unprocessed separate search information (i.e., which has not undergone steps from S2845) is found. If unprocessed separate search information is found (S2840: YES), control proceeds to step S2845. If unprocessed separate search information is not found (S2840: NO), control returns to step S2820.

In step S2845, the control unit 71 selects one of pieces of unprocessed separate search information having the maximum evaluation value, as a target. If more than one pieces of unprocessed separate search information having the same maximum evaluation value are found, one of the pieces of separate search information having the latest source creation time is selected as a target.

After step S2845 is processed, the control unit 71 judges whether the evaluation value of the target separate search information is smaller than a predetermined lower limit (S2850). If the evaluation value is lower than the predetermined lower limit (S2850: YES), control returns to step S2810. If the evaluation value of the target separate search information is not smaller than a predetermined lower limit (S2850: NO), the control unit 71 judges whether the number of search processes is smaller than a predetermined upper limit (S2860).

If the number of search processes is smaller than the predetermined upper limit (S2860: YES), control proceeds to step S2900. If the number of search processes is not smaller than the predetermined upper limit (i.e., the number of search processes is equal to the predetermined upper limit) (S2860: NO), the control unit 71 judges whether a search process (see FIG. 37) corresponding to separate search information having the evaluation value lower than that of the target separate search information is running (S2870). The judgment is made in step S2870 in accordance with a search process management table stored in the storage unit 73.

FIG. 35 shows an example of a data structure of the search process management table. As shown in FIG. 35, the search process management table includes one or more pieces of process management information respectively corresponding to running search processes. Each of the pieces of process management information includes a process ID, a value representing the priority of the process, an upper limit of a memory allocated to the process, information representing the number of counts of search results to be adopted, an address of a memory for the separate search information corresponding to the process.

That is, in step S2870, the control unit 71 judges whether a process having an evaluation value (associated with the process through the separate search information address in the process management information of the process) lower than the evaluation value of the target separate search information is found in the search process management table. If such a process is not found (S2870: NO), control returns to step S2820. If such a process is found (S2870: YES), the control unit 71 judges whether the call-in flag is ON (S2875).

If the call-in flag is ON (S2875: YES), control proceeds to step S2880. If the call-in flag is OFF (S2875: NO), the control unit 71 selects a process having the lowest evaluation value (associated with the process through the separate search information address in the process management information of the process) of all of the processes registered in the search process management table, as a target (S2880). Then, the control unit 71 sends an end command to the target process, so that the process is stopped (S2890).

After step S2890 is finished, the control unit 71 calculates the priority value of the search process corresponding to the target separate search information selected in step S2845 (S2900). In this embodiment, a multitask OS (operating system) having the function of executing more than one processes concurrently by timesharing is implemented on the information analysis device 70, and a scheduler of the multitask OS is configured to give high propriety of execution to a process having a high priority value. The priority value calculated herein is used by the scheduler when the scheduler conducts scheduling.

More specifically, the priority value is calculated by an expression described below in accordance with the evaluation value contained in the target separate search information.

(priority value)=(evaluation value)×(maximum value of priority value)

In this embodiment, since the evaluation value is obtained as an inner product of normal vectors, an evaluation value ranges from 0 to 1. Therefore, according to the above described expression, the priority values takes the maximum priority value when the evaluation value is 1, while the priority values takes the minimum priority value when the evaluation value is 0.

After step S900 is processed, the control unit 71 calculates the upper limit of a memory (RAM) to be allocated to the search process (S2910), and calculates the number of counts of search results to be adopted (S2920), according to the following expressions.

(upper limit)=β×(evaluation value)

(number of search results to be adopted)=γ×(evaluation value)

In the above mentioned expressions, the upper limit and the number search results to be adopted are integers more than or equal to 1. A constant γ is, for example, 5. The value obtained by rounding up the fractional portion of γ×(evaluation value) is defined as the upper limit of a memory, and a value by dropping the fractional portion of γ×(evaluation value) is defined as the number of search result to be adopted.

Next, the control unit 71 judges whether the interest end time is set (S2930). If the interest end time is not set (S2930: NO), the control unit 71 sets a processing time limit representing the maximum value of the processing time to be given to the search process, to "unlimited" (S2931). Then, control proceeds to step S2940.

If the interest end time is set (S2930: YES), the control unit 71 assigns a difference between the current time and the interest end time to the processing time limit (S2935). Then, control proceeds to step S2940.

In step S2940, the control unit 71 selects a piece of search program information, for which a query has not been issued, from a search program management table. Further, the control unit 71 initiates a search process corresponding to the selected search program information, while designating the priority value calculated in step S2900, the memory upper limit calculated in step S2910, the number of search results calculated in step S2920, and the processing time limit calculated in step S2931 or S2935 (S2950).

FIG. 36 shows an example of a data structure of the search program management table. As shown in FIG. 17, the search program management table includes one or more pieces of search program information respectively corresponding to search programs to be executed. Each of the pieces of search program information includes address information (URL) of the information searching server 20 having the search program, a manner of crating a query (including a manner of creating a search condition), category information representing the type of contents to be searched by the search program.

In step S2940, the control unit 71 selects a piece of search program information, for which a query has not been sent to a URL represented by the address information, from among search programs registered in the search program management table, as a target. In step S2950, the control unit 71 initiates a search process while designating the target search program information. It should be noted that the initiated search process is managed by the scheduler, and is executed concurrently with other processes. Further, the search process creates a query in accordance with the query creation information represented by the designated search program information. The created query is sent to the information searching server 20 having the URL represented by the address information of the search program information.

After step S2950 is processed, the control unit 71 creates process management information for the initiate search process, and registers the process management information into the search process management table stored in the storage unit 73 (S2960). That is, the process management information, including the process ID of the initiated search process, the priority value calculated in step S2900, the memory tipper limit calculated in step S2910, the number of search results to be adopted calculated in step S2920, and the address information representing a memory location of the separate search information selected as the target in step S2845, is created, and the created process management information is registered in the search process management table.

Next, the control unit 71 adds 1 to the number of search processes (S2970). Then, the control unit 71 judge whether search program information for which a query has not been issued is found in the search program management table (S2980). If such search program information is found (S2980: YES), control returns to step S2940 to select a piece of search program information from among pieces of search program information for which queries have not been issued, as a target.

If search program information for which a query has not been issued is not found (S2980: NO), control proceeds to step S2990. In step S2990, the control unit 71 judges whether an end command is received. If the end command is not received (S2990: NO), control returns to step S2840. If the end command is received (S2990: YES), the search control process terminates.

Hereafter, a search process executed under control of the control unit 71 of the information analysis device 70 will be explained with reference to FIG. 37. The search process is executed concurrently with another search process.

When the search process is started, the control unit 71 resets a timer (S3110). Then, the control unit 71 reads the designated search program information from the search program management table (S3120). Then, the control unit 71 creates a search condition, in which search keys contained in the separate search information are set, based on the query creation information contained in the read search program information and a group of search keys contained in the designated separate search information. Further, the control unit 71 creates a query containing the search condition to be transmitted to the information searching server 20 (S3130).

Next, the control unit 71 sends the created query to the URL represented by the search program information, so that the search program having the URL is executed by the information searching server 20 (S3140).

In this case, the information searching server 20 searches for contents (corresponding to the search keys contained in the separate search information) in accordance with the search condition contained in the received query, and sends a reply signal containing link information to the contents, back to the information analysis device 70. If an end command for a running search program is inputted from the information analysis device 70, the information searching server 20 ends the search program, and sends a reply signal indicating that the search is stopped, back to the information analysis device 70 in place of sending a search result.

After sending the query in step S3140, the control unit 71 judges whether the processing time limit is reached (S3150). If the processing time limit is not reached (S3150: NO), control proceeds to step S3160. If the processing time limit is reached (S3150: YES), the control unit 71 sends an end command to the URL corresponding to the search program which is being executed by the information searching 20 according to an instruction from the control unit 71(S3115). Then, control proceeds to step S3160.

In step S3160, the control unit 71 judges whether the reply signal is received. If the reply signal is not received (S3160: NO), control proceeds to step S3161 where the control unit 71 judges whether an end command is inputted to this search process by the process of step S2890. If the end command is inputted (S3161: YES), the control unit 71 sends an end command for the search program (which the control unit 71 causes the information searching server to execute), to the URL corresponding to the search program (S3165). Then, control returns to step S3150.

If the end command is not inputted for the search process (S3161: NO), control returns to step S3150 without processing step S3165.

If it is judged in step S3160 that the reply signal is received (S3160: YES), control proceeds to step S3170 where the control unit 71 judges whether the received replay signal indicates the search result or indicates that the search is stopped. If the reply signal does not indicate the search result (S3170: NO), control proceeds to step S3190 where the control unit 71 decrements the number of search processes by 1. Then, the search process terminates.

If the reply signal indicates the search result (S3170: YES), control proceeds to step S3180 where the control unit 71 judges whether the category information of the designated search program information corresponds to "term search". If the category information does not correspond to "term search" (but corresponds to "general search") (S3180: NO), the control unit 71 extracts pieces of link information (the counts of which correspond to the designated number of counts to be adopted) from the search result including a group of pieces of link information. Then, the control unit 71 generates separate result information storing the corresponding link information, for each of the extracted pieces of link information (S3181). Further, the control unit 71 registers the generated separate result information into a search result management table stored in the storage unit 73 (S3183).

FIG. 38 shows an example of a data structure of the search result management table stored in the storage unit 73. The search result management table includes one or mores pieces of separate result information.

The control unit 71 generates the separate result information for each of the pieces of extracted link information. The separate result information includes content storage location information corresponding to the link information (URL), category information representing the type of the search program which outputted the search result, address information representing a storage location of separate search information to be treated by the search process, a search completion time information to which the current time is written, and output information having a value of "FALSE". The control unit 71 registers the separate result information into the search result management table (S3183).

Next, the control unit 71 adds 1 to the number of search processes (S3190). Then, the search process terminates.

If the category information corresponds to "term search" (S3180: YES), the control unit 71 extracts a piece of link information (regardless of the designated number of counts to be adopted) from the search result containing a group of pieces of link information received as the reply signal, and generates separate result information storing the extracted link information (S3185). Then, the control unit 71 registers the generated separate result information into the search result management table stored in the storage unit 73 (S3187). After step S3187 is processed, the control unit 71 adds 1 to the number of search processes (S3190). Then, the search process terminates.

Hereafter, a search result reading control process to be executed under control of the control unit 71 of the information analysis device 70 will be explained with reference to FIGS. 39 and 40. The search result reading control process is executed concurrently with the search control process.

When the search result reading control process is started, the control unit 71 resets the number reading processes to zero (S3210). Then, the control unit 71 judges whether unprocessed separate result information (not underwent steps from S3230) is found in the search result management table (S3220). The control unit 71 waits until unprocessed separate result information is registered (S3220: NO). If unprocessed separate result information is found (S3220: YES), control proceeds to step S3230.

In step S3230, the control unit 71 selects separate search result information having the latest search completion time, as a target. Then, the control unit 71 judges whether the evaluation value of the separate search information corresponding to the target separate result information is lower than a predetermined lower limit (S3240). If the evaluation value is lower then the predetermined lower limit (S3240: YES), control returns to step S3220.

If the evaluation value is not lower then the predetermined lower limit (S3240: NO), the control unit 71 judges whether the number of reading processes is smaller than a predetermined upper limit (S3250). If the number of reading processes is smaller than the predetermined upper limit (S3250: YES), control proceeds to step S3300.

If the number of reading processes is not smaller than the predetermined upper limit (S3250: NO), control proceeds to step S3260 where the control nit 71 judges whether a reading process (see FIG. 42) corresponding to separate result information of which evaluation value is lower than the evaluation value corresponding to the target separate result information is running. The judgment in step S3260 is conducted in accordance with a reading process management table stored in the storage unit 73.

FIG. 41 shows an example of a data structure of the reading process management table stored in the storage unit 73. As shown in FIG. 41, the reading process management table includes one or more pieces of process management information respectively corresponding to running processes. Each of the pieces of process management information includes a process ID, the priority of execution of the process, the memory upper limit allocated to the process, and address information representing a registration location of the separate search information corresponding to the process.

That is, in step S3260, the control unit 71 judges whether a process having an evaluation value represented by the separate search information (associated with the process through the process manage information of the process) lower than the evaluation value of the target separate result information is found in the reading process management table. If such a process is not found (S3260: NO), control returns to step S3220. If such a process is found (S3220: YES), control proceeds to step S3270 where the control unit 71 judges whether the call-in flag stored in the RAM is ON.

If the call-in flag is ON (S3270: YES), control returns to step S3220. If the call-in flag is not ON (S3270: NO), control proceeds to step S3280 where the control unit 71 selects a process having the lowest evaluation value represented by the separate search information corresponding to the process management information, as a target of termination. Then, the control unit 71 sends an end command to the target process (S3290), by which the target process terminates.

After step S3290 is finished, the control unit 71 calculates the priority value of the reading process corresponding to the separate result information targeted in step S3230, in accordance with the evaluation value corresponding to the separate result information, as in the case of step S2900 (S3300). Then, in step S3310, the control unit 71 calculates the memory upper limit to be allocated to the reading process, as in the case of step S2910.

Next, the control unit 71 judges whether the interest end time is set. If the interest end time is not set (S3320: NO), the control unit 71 sets the processing time limit representing the maximum value of a processing time to be allocated to the reading process, to "unlimited" (S3321). Then, control proceeds to step S3330.

If the interest end time is set (S3320: YES), the control unit 71 assigns a difference between the current time and the interest end time (S3325). Then, control proceeds to step S3330.

In step S3330, the control unit 71 initiates a reading process, while designating the priority value calculated in step S3300, the memory upper limit calculated in step S3310, and the processing time limit set in step S3321 or S3325, and further designating the separate result information selected in step S3230 as a processing target. The reading process thus initiated is managed by the scheduler of the multitask OS, and is executed concurrently with other processes. The reading process sends a request for contents (data files) to the URL represented by the target separate result information to obtain the contents.

Next, the control unit 71 generates process management information for the initiated reading process, and registers the process management information into the reading process management table (S3340). Specifically, the control unit 71 generates the process management information, including a process ID of the initiated reading process, the priority value calculated in step S3300, the memory upper limit calculated in step S3310, the address information representing the storage location of the separate search information represented by the target separate result information selected in step S3230, into the reading process management table.

Next, the control unit 71 increments the number of reading processes by 1 (S3350). Then, the control unit 71 judges whether an end command is received (S3360). If the end command is not received (S3360: NO), control returns to step S3220. If the end command is received (S3360: YES), the search result reading control process terminates.

Since the search result reading control process is executed concurrently with the search control process, steps S3240 to S3280 may be processed concurrently with steps S821 and S825. If the update flag is turned to ON during the process of steps S3240 to S3280, the control unit 71 returns the control to step S3230, and waits until the update flag is tuned to OFF in the search result reading control process. If the update flag is turned to OFF, the control unit 71 treats separate result information, for which the process is stopped, as unprocessed search result information, and restarts steps from S3230.

If the update flag is turned to ON during the process of steps S3290 to S3310, the control unit 71 executes the following steps using the evaluation value obtained in steps S3230 to S3280.

Hereafter, a reading process executed under control of the control unit 71 of the information analysis device 70 will be explained with reference to FIG. 42. The reading process is executed concurrently with other processes.

When the reading process is started, the control unit 71 resets the timer (S3410). Then, the control unit 71 reads the content storage location information of the designated (target) separate result information (S3420), and sends a request signal to a URL represented by the obtained content storage location information (S3430).

After sending the request signal, the control unit 71 judge whether a certain processing time limit is reached based on the value of the timer (S3440). If the certain processing time limit is not reached (S3440: NO), control proceeds to step S3450. If the certain processing time limit is reached (S3440: YES), control proceeds to step S3445 where the control unit 71 closes the session (i.e., ends the communication). Next, the control unit 71 subtracts one from the number of reading processes (S3490). Then, the reading process terminates.

In step S3450, the control unit 71 judges whether a reply signal, which is a response to the request signal sent in step S3430, is received. If the reply signal is not received (S3450: NO), control proceeds to step S3451 where the control unit 71 judges whether an end command is inputted to the reading process (one of processes executing the reading process) by step S3290 (S3451). If the end command is inputted (S3451: YES), the control unit 71 closes the session (S3453). Next, the control unit 71 subtracts one from the number of reading processes (S3490). Then, the reading process terminates.

If the end command is not inputted (S3451: NO), control returns to step S3440.

If the reply signal is received (S3450: YES), the control unit 71 judges whether the replay signal corresponds to the requested contents or error information (S3460). If the reply signal does not correspond to the requested contents (S3460: NO), the control unit 71 subtracts one from the number of reading processes (S3490). Then, the reading process terminates.

If the reply signal corresponds to the requested contents (S3460: YES), the control unit 71 stores the contents in the storage unit 73 (S3470). Then, the control unit 71 updates the search result management table by changing the content storage location information of the target separate result information, to URL information representing a storage location of the contents (S3480). Next, the control unit 71 subtracts one from the number of reading processes (S3490). Then, the reading process terminates.

Hereafter, an output process executed under control of the control unit 71 of the information analysis device 70 will be explained with reference to FIG. 43. The output process is executed concurrently with the search result reading control process.

When the output process is started, the control unit 71 judges whether unprocessed contents (contents not outputted) are found in contents stored in the storage unit 73 by the reading process (S3510). The judgment of step S3510 is made in accordance with the content storage location information and the output information in the search result management table. The content storage location information represents the existence of the contents. If separate result information having the output information of "FALSE" is registered in the search result management table, the control unit 71 judges the contents corresponding to the separate result information to be unprocessed contents, and judges that unprocessed contents are found.

The control unit 71 waits until unprocessed contents are generates (S3510: NO). If unprocessed contents are found (S3510: YES), the control unit 71 selects one of pieces of unprocessed contents, as a target (S3520). Then, the control unit 71 judges whether the target contents correspond to the result of term search, based on the separate result information corresponding to the target contents (S3530).

More specifically, the control unit 71 judges whether the target contents correspond to the result of term search, by judging whether the category information of the separate result information corresponding to the target contents represents "term search". Alternatively, the control may judge whether the target contents correspond to the result of term search, by analyzing the contents.

If the target contents correspond to the result of the term search (S3530: YES), the control unit 71 displays the contents in the term display area IM 43 on the content providing screen of the display unit 77. Then, control proceeds to step S3570. If the target contents do not correspond to the result of the term search (S3530: NO), control proceeds to step S3540 where the control unit judges whether the target contents correspond to a moving image file. If the target contents correspond to a moving image file (S3540: YES), the control unit queues the target contents and the source creation time represented by the source information for which the contents are obtained, into a moving image reproduction data queue, while associating the contents with the source creation time (S3545). Then, control proceeds to step S3570.

In this embodiment, the control unit 71 of the information analysis device 70 has the function of serving as the moving image reproduction data queue, and reproducing the contents (moving image file) registered in the moving image reproduction data queue. As described above, a relationship between a moving image reproduction area control process and the moving image reproduction data queue is schematically illustrated in FIG. 21A. In the moving image reproducing area control process, content items (moving image files)

registered in the moving image reproducing data queue are reproduced sequentially in order in which the contents are registered so that the moving image are reproduced in the moving image area IM 42 on the content providing screen and sound is reproduced through the sound output unit 79.

If the target contents do not correspond to a moving image file (S3540: NO), control proceeds to step S3550 where the control unit 71 judges whether the target contents correspond to a sound file. If the target content correspond to a sound file (S3550: YES), the control unit 71 reproduces the sound file through the sound output unit 79 (S3555). Then, control proceeds to step S3570.

If the reproducing process, which is initiated for another sound file previously, is running, the control unit 71 stops the reproducing process for the previously targeted sound file, and then initiates a reproducing process for a currently targeted sound file. If a moving image with sound is being produced for previously targeted contents, the control unit 71 reproduces the currently targeted sound file in place of reproducing the sound of the previously targeted contents, through the sound output unit 79.

If the target contents do not correspond to a sound file (S3550: NO), the control unit 71 registers the target contents and the source creation time represented by the source information for which the contents were obtained, while associating the target contents with the source creation time (S3560). Then, control proceeds to step S3570.

In this embodiment, the control unit 71 of the information analysis device 70 is capable of functioning as a display data queue and displaying the contents (e.g., information containing letters and images, such as a web page) registered in the display data queue. As described above, a relationship of the display data queue controlled by the control unit 71 and a text and image area display control process to be executed by the control unit 71 is schematically illustrated in FIG. 21B. In the text and image area display control process, contents registered in the display data queue are processed sequentially so that the contents are displayed within the text and image area IM41.

In step S3570, the control unit 71 changes the output information of the separate result information corresponding to the target contents, to "TRUE", and thereafter removes contents having the source creation time earlier than the current time by a certain time from the moving image reproduction data queue and the display data queue (S3580).

Next, the control unit 71 judges whether an end command is received (S3590). If the end command is not received (S3590: NO), control returns to step S3510. If the end command is received (S3590: YES), the output process terminates.

In the content providing system according to the second embodiment, the PC 30 operates to obtain data (information concerning inputted letters) which the user inputted to the PC 30 through the input unit 41 from software, and to obtain data (targeted for display), which is to be displayed on the display unit 43 for displaying documents being edited or browsed by the user, from software. Further, the control unit 71 sends the obtained data to the information analysis device 70 (in the PC monitoring process). The digital telephone 50 operates to collects sound data inputted by the user though the sound input unit 61 during the telephone communication and sound data to be output to the user through the sound output unit 63, and to send the collected sound data to the information analysis device 70 (in the telephone monitoring process).

The information analysis device 70 receives data transmitted from the PC 30 (in the PC monitoring process) and data transmitted from the digital telephone 50 (in the telephone monitoring process), and stored the received data into the storage unit 73. The information analysis device 70 thus obtains data inputted to information processing devices (PC 30 and digital telephone 50) through the respective user interfaces 40 and 60, and data outputted to users through the user interfaces 40 and 60.

The information analysis device 70 estimates a user's interest based on the received data (S2710) each time the information analysis device 70 receives data from the PC 30 during the non-communication state of the digital telephone Specifically, the information analysis device 70 extracts keywords from the text data obtained from the PC 30, and determines the type of interest to which the obtained keywords belong in accordance with the interest estimation table defining the types of interest. Further, the information analysis device 70 increments the element corresponding to the determined type of interest in the interest vector by one, so that the interest vector representing the estimated value of the user's interest is calculated.

When the digital telephone 50 is in the telephone communication, the information analysis device 70 estimates a user's interest based on the latest received data each time the estimated time (during which the user's interest would continue) elapses (S2520).

The information analysis device 70 generates separate search information, in which the interest vector calculated based on received data and keywords extracted from the received data are associated with each other, each time the information analysis device 70 received data from an information processing device. Then, the information analysis device 70 registers the separate search information into the search information management table (steps S260 to S2595, steps S2740 to S2780).

The information analysis device 70 reserves the interest vector calculated in the interest vector calculation process as a current interest vector Vc each time the interest vector calculation process (S2520, S2710) is executed. In this case, the information analysis device 70 reserves the latest interest vector as the current interest vector Vc.

If the current interest vector changes by the predetermined amount, the information analysis device 70 evaluates the similarity between the current interest vector Vc and the interest vector V represented by the separate search information, by obtaining the inner product of the vectors (S2825). Then, the information analysis device 70 registers the evaluated value into the separate search information.

The information analysis device 70 selects one of pieces of separate search information in decreasing order of evaluation values (S2845), and searches for the contents relating to the keywords contained in the target separate search information. Further, the information analysis device 70 obtains the contents relating to the keywords from the web server 10, based on the search result, and provides the contents as displayed images or sound outputs.

In other words, if the user's interest changes and thereby the update flag is tuned to ON, the received data (keywords) causing the change of the update flag to ON receives the highest evaluation marks, and such data is given the higher priority of searching. Before the update flag is turned to ON, higher priority of processing is given to the received data associated with the interest vector having the higher similarity with the current interest vector Vc, so that the contents corresponding to the keywords are searched preferentially.

Therefore, the information analysis device 70 is able to preferentially process received data matching with the user's interest, and to provide contents corresponding to the received data quickly and at a appropriate time.

In this embodiment, the information analysis device 70 is controlled by the multitask OS, so that the information analysis device 70 is able to execute up to a predetermined number of search processes for obtaining contents concurrently. If the number of running search processes reaches the upper limit (S2860: NO), the information analysis device 70 judges whether separate search information having the evaluation value higher than that of the separate search information corresponding to each of the running search processes is found in pieces of unprocessed separate search information (not selected as targets) in the search information management table (S2870). If such separate search information is found (S2870: YES), the information analysis device 70 selects the search process having the lowest evaluation value, as a target to be stopped (S2880).

Then, the information analysis device 70 inputs the end command to the stop target process to stop the process, and selects separate search information having the highest evaluation value, from among pieces of unprocessed separate search information stored in the search information management table, as a target so that a new process is executed for the target separate search information (S2950).

As described above, according to the second embodiment, if the number of processes reaches the upper limit, a process corresponding to separate search information having a low evaluation value is stopped, and a process corresponding to separate search information having an evaluation value higher than the evaluation value of the stopped process is newly executed. Therefore, a problem that a process having an evaluation value higher than evaluation values of running process can not be executed is prevented from occurring.

In the above mentioned embodiment, an operation mode of the digital telephone 50 is judged (S2480). If the digital telephone 50 is not in the call telephone communication mode but in the call-in telephone communication mode, the call-in flag is turned to ON. If the number of running processes reaches the upper limit during the ON state of the call-in flag, the information analysis device 70 does not execute a process in which the process corresponding to the separate search information having a low evaluation value is stopped and a process corresponding to separate search information having higher evaluation value is newly executed. That is, the information analysis device 70 executes such a process (in which the process corresponding to the separate search information having a low evaluation value is stopped and a process corresponding to separate search information having higher evaluation value is newly executed) only when the call-in flag is in the OFF state.

Therefore, according to the second embodiment, an occurrence of a situation, where if an interrupt occurs by a call-in, and thereby voice of the party of the other end is outputted to a user through the sound output unit 63, separate search information associated with the interest vector having the high similarity with the current interest vector Vc obtained due to the voice of the party of the other end is treated preferentially, and thereby a process for obtaining contents matching with the user's interest continuing potentially is forced to stop by tentative transition of a user's interest by the call-in, is prevented.

In this embodiment, when a search process is initiated, separate search information having a high evaluation value is treated preferentially by adjusting a resource amount to be allocated to a process in proportion to the magnitude of an evaluation value. Therefore, it becomes possible to provide contents matching with a user's interest to a user accurately and at an appropriate time.

In this embodiment, with regard to pieces of unprocessed separate search information stored in the search information management table, only separate search information of which evaluation value is larger than or equal to a predetermined lower limit is selected as a target (S2845 and S2850). Then, contents corresponding to keywords contained in the target separate search information are obtained. Therefore, an occurrence of a situation, where contents not relating to a user's interest are obtained and provided to the user, is prevented. In addition, it becomes possible to selectively provide contents matching with a user's interest to the user.

In this embodiment, the interest vector calculation process is executed during the telephone communication state of the digital telephone 50, and the continuation period representing a time period in which a user's interest represented by the current interest vector Vc would continue is estimated each time the current interest vector Vc is updated. Before the continuation period elapses, the processing time limit (an upper limit of time) is set for each of pieces of target data so that the acquisition of contents targeted for reading completes successfully (S3325). Then, reading processes for obtaining contents corresponding to each of pieces of target data up to the upper limit are executed. The process for which the processing time limit is reached is forced to stop (S3440: YES). Therefore, it becomes possible to accurately prevent the occurrence of a situation where contents not matching with the user's interest are provided to the user.

In this embodiment, the interest estimation table included the continuation time representing the time period during which the user's interest is estimated to continue, and the information analysis device 70 judges which of the predetermined types of interest the user's interest represented by the current interest vector belongs, each time the current interest vector Vc is updated by executing the interest vector calculation process, during the telephone communication state of the digital telephone 50. The continuation time corresponding to the obtained type of interest is read from the interest estimation table, and is added to the current time to estimate the interest end time of the period of the continuation time. If the interest end time is reached (S2510: YES), the interest vector calculation process is executed again.

Therefore, it is possible to estimate and provide the user's interest at an appropriate time, in conformity with the transition of the user's interest.

It is understood that various variations of the system configuration and processes described in the second embodiment are possible.

For example, in step S3470, the difference $\Delta Vc$ between the current interest vector $Vc(t)$ and the previously used current interest vector $Vc(t-1)$ is calculated ($\Delta Vc=Vc(t)-Vc(t-1)$). If the minimum value of each element of $\Delta Vc$ is larger than or equal to a predetermined threshold, the information analysis device 70 may judge that the current interest vector Vc changes by the predetermined amount (S2470: YES). If the minimum value of each element of $\Delta Vc$ is smaller than the predetermined threshold, the information analysis device 70 may judge that the current interest vector Vc does not change by the predetermined amount (S2470: NO).

If the sum of values of the elements of the difference $\Delta Vc$ is larger than or equal to a threshold value, the information analysis device 70 may judge that the current interest vector Vc changes by the predetermined amount. If the sum of values of the elements of the difference $\Delta Vc$ is smaller than the threshold value, the information analysis device 70 may judge that the current interest vector Vc does not change by the predetermined amount.

In the above mentioned output process, the information analysis device 70 judges whether "not outputted contents" exist, based on the output information. However, the information analysis device 70 may delete the separate result information corresponding to the outputted contents, and may judge all of pieces of separate result information in the search result management table to be "not outputted contents".

Third Embodiment

Hereafter, a content providing system according to a third embodiment of the invention will be described. Since a configuration of the content providing system according to the third embodiment is substantially the same as that shown in FIG. 1, the content providing system according to the third embodiment is explained with reference to FIG. 1. In this embodiment, a source management table, an interest estimation table, a search information management table, a search process management table, a search program management table, a reading process management table, and a search result management table are stored and managed by the information analysis device 70.

In this embodiment, the PC 30 executes the same PC monitoring process as that shown in FIG. 2, the digital telephone 50 executes the same telephone monitoring process as that shown in FIG. 3, and the information analysis device 70 executes the same source information registration process as that shown in FIG. 5. Therefore, the content providing system 1 according to the third embodiment is explained with reference to FIGS. 1 to 6, and explanations of FIG. 1 to 6 will not be repeated.

Hereafter, a keyword extraction process executed under control of the control unit 71 of the information analysis device 70 will be explained with reference to FIG. 44.

First, the control unit 71 judges whether unprocessed source information is found in the source management table (S4410). The control unit 71 waits until unprocessed source information is found (S4410: NO).

If unprocessed source information is found (S4410: YES), the control unit 71 analysis text data of a file associated with the unprocessed source information (target source information) to obtain nouns from the file, and extracts nouns other than particular nouns from the obtained nouns, and sets the extracted nouns as keywords (S4420). In this embodiment, generally used nouns which do not serve as keywords for search for contents are defined as the particular keywords. The particular keywords are stored in advance in the storage unit 73.

Next, the control unit 71 judges whether the digital telephone 50 is in telephone communication with another telephone (S4430). In step S4430, the control unit 71 judges that the digital telephone 50 is in telephone communication with another telephone until a predetermined time period (e.g., a time period obtained by adding a correction value α (determined considering a processing delay) to a certain time period T2) has elapsed from the time when the source information having the device usage information of "call" or "call in" is registered in the source management table. The control unit 71 judges that the digital telephone 50 is not in communication with another telephone in a time other than the above mentioned predetermined time period.

If the digital telephone 50 in telephone communication with another telephone (S4430: YES), the control unit 71 executes a telephone analysis process. FIG. 45 is a flowchart illustrating the telephone analysis process executed by the control unit 71.

When the telephone analysis process is started, the control unit 71 judges whether an interest end time is reached (S4510). If the interest end time is reached (S4510: YES), control proceeds to step S4520. If the interest end time is not reached (S4510: NO), control proceeds to step S4560. The interest end time is reset when power of the information analysis device 70 is turned to ON, and is kept in the reset state until step S4550 is initially processed. If step S4510 is processed while the interest end time is in the reset state, the control unit 71 judges that the interest end time is reached as an exception.

In step S4520, the control unit 71 executes an interest vector calculation process. FIG. 46 is a flowchart illustrating the interest vector calculation process.

When the interest vector calculation process is started, the control unit 71 resets an interest vector V to zero (S4610). In this embodiment, a user's interest is represented by a vector. That is, an interest vector is used to express numerically a user's interest. Specifically, the interest vector is represented by a one row and n column vector.

$$V=(v1, vv2, \ldots, vn)$$

Then, the control unit 71 selects an unprocessed keyword from among keywords extracted in step S4420 (FIG. 44) as a target keyword (S4620). Further, the control unit 71 searches an interest estimation table stored in the storage unit 73 for the target keyword (S4630). FIG. 47 shows an example of a data structure of the interest estimation table. As shown in FIG. 47, the interest estimation table includes keywords, a continuation time (continuation time estimation information) representing an estimated time during which a user's interest continues, and parameters for weight (weighting definitions), for each of the types of interest.

After step S4630 is processed, the control unit 71 judges whether the target keyword is found (S4640). If the target keyword is found among the keywords registered in the interest estimation table (S4640: YES), the control unit 71 determines the type of interest to which the target keyword belongs, using the interest estimation table (S4650). Then, the control unit 71 adds 1 to the element vi (where i (i=1, 2, ..., n) corresponds to the type of interest) of the interest vector V. Then, control proceeds to step S4670.

If the target keyword is not found in the keywords registered in the interest estimation table (S4640: NO), control proceeds to step S4670. In step S4670, the control unit 71 judges whether an unprocessed keyword exists in the extracted keywords. If an unprocessed keyword is found (S4670: YES), control returns to step S4620 to select one of the unprocessed keywords as a target keyword. In this embodiment, if one or more same keywords are found among the keywords extracted in step S4420, all of the same keywords undergo the steps S4640 to S4660.

If an unprocessed keyword is not found (S4670: NO), the interest vector V is calculated in accordance with weighing definitions in the interest estimation table. That is, each element vi is weighted in accordance with the corresponding weighting definition.

The weighting definitions are categorized in two groups. A first weighting definition is represented by a combination of the device usage information and a weighting factor W. A second weighting definition is represented by the time information and a weighting factor W. The control unit 71 weights each element vi corresponding to the first weighting definition if the device usage information of the source information corresponding to the file (of which keywords are extracted in step S4420) is equal to the device usage information represented by the weighting definition.

More specifically, in step S4680, the control unit 71 selects the element vi corresponding to the type of interest having the first weighting definition of which device usage information is equal to the device usage information of the source information corresponding to the file (of which keywords are extracted in step S4420), as a weighting target. The control unit 71 further multiplies the weighting target vi by the weighting factor W as shown below.

$$vi \leftarrow vi \times W$$

Then, the control unit 71 weights the element vi corresponding to the type of weighting to which the second weighting definition is assigned if the current time is within the time period represented by the time information of the weighting definition of the element vi.

In step S4680, the control unit 71 multiplies the element vi, which corresponds to the type of interest, to which the second weighting definition belongs, and has the time information within which the current time lies, by the weighting factor W.

After S4680 is processed, the control unit 71 outputs the calculation result as a return value. Then, the interest vector calculation process terminates.

Referring back to FIG. 45, after step S4520 is finished, the control unit 71 divides the interest vector V by its norm $\|V\|$ to obtain a normal vector E of the interest vector V (S4521).

$$E = V/\|V\|$$

Furthermore, the control unit 71 divides a telephone current interest vector Vp by its norm $\|Vp\|$ to obtain a normal vector Ep of the current interest vector Vp (S4523).

$$Ep = Vp/\|Vp\|$$

The telephone current interest vector Vp is updated in step S4530. When power of the information analysis device 70 is turned to ON, zero is set to the telephone current interest vector Vp as an initial value. When step S4523 is processed first after power of the information analysis device 70 is turned to ON, the resultant of step S4523 (the normal vector Ep) is zero.

Next, the control unit 71 calculates an inner product Rp of the normal vector E of the interest vector V (obtained in step S4521) and the normal vector Ep of the current telephone interest vector Vp (obtained in step S4523) (S4525).

$$Rp = E \cdot Ep$$

Next, the control unit 71 judges whether the inner product Rp is smaller than a predetermined threshold THp (i.e., Rp<THp is satisfied) (S4527). If the inner product Rp is smaller than the predetermined threshold THp (S4527: YES), control proceeds to step S4529. If the inner product Rp is larger than or equal to the predetermined threshold THp (S4527: NO), control proceeds to step S4530.

In step S4529, the control unit 71 assigns the source creation time represented by the source information corresponding to the file for which the keywords are extracted in step S4420, to the interest start time.

Next, in step S4530, the control unit 71 assigns the value of the interest vector calculated in step S520 to the telephone current interest vector Vp. Then, the control unit 71 determines the type of interest corresponding to an element having the largest value of all elements in the telephone current interest vector Vp (S4540). Next, the control unit 71 adds the value of the continuation time (the value of the continuation time estimation information) corresponding to the determined type of interest to the current time, and assigns the resultant t an interest end tome (S4550).

If more than one elements having the same maximum value are found in the telephone current interest vector Vp, an element having the maximum continuation time of all of the elements having the same maximum value may be added to the current time, and the resultant may be used as the interest end vector.

Next, the control unit 71 secures a new area for separate search information in the search information management table in the storage unit 73 (S4560), and writes the source creation time of the source information for which the keywords are extracted in step S4420, into the new area (S4570). Then, the control unit 71 writes the keywords extracted in step S4420 into the new area as search keys (S4580), and writes the number of keywords into the new area (S4590).

FIG. 48 shows an example of a data structure of the search information management table. As shown in FIG. 48, the search information management table includes one or more separate search information, each of which includes a source creation time, information about the search keys, and information about the number of search keys.

By processing steps S4560 to S4590, the control unit 71 registers the separate search information corresponding to the source information for which the keywords are extracted in step S4420, into the search information management able. After step S4590 is processed, the telephone analysis process terminates.

Referring back to FIG. 44, after the telephone analysis process is finished, control proceeds to step S4480. If it is judged in step S4430 that the digital telephone 50 is not in the telephone communication with another telephone (S4430: NO), the control unit 71 sets the call-in flag to OFF (S4450). Then, a non-telephone analysis process is executed (S4460).

FIG. 49 is a flowchart illustrating the non-telephone analysis process executed under control of the control unit 71. When the non-telephone analysis process is started, the control unit 71 executes the interest vector calculation process shown in FIG. 46 (S4710). Then, the control unit 71 divides the interest vector V (obtained in step S4710) by its norm $\|V\|$ to obtain a normal vector E of the interest vector V (S4721).

Furthermore, the control unit 71 divides a non-telephone current interest vector Vw by its norm $\|Vw\|$ to obtain a normal vector Ew of the non-telephone current interest vector Vw (S4723).

$$Ew = Vw/\|Vw\|$$

The non-telephone current interest vector Vw is updated in step S4730. When power of the information analysis device 70 is turned to ON, zero is set to the non-telephone current interest vector Vw as an initial value. When step S4723 is processed first after power of the information analysis device 70 is turned to ON, the resultant of step S4723 (the normal vector Ep) is zero.

Next, the control unit 71 calculates an inner product Rw of the normal vector E of the interest vector V (obtained in step S4721) and the normal vector Ew of the non-telephone current interest vector Vw (obtained in step S4723) (S4725).

$$Rw = E \cdot Ew$$

Next, the control unit 71 judges whether the inner product Rw is smaller than a predetermined threshold THw (i.e., Rw<THw is satisfied) (S4727). If the inner product Rw is smaller than the predetermined threshold THw (S4727: YES), control proceeds to step S4729. If the inner product Rw is larger than or equal to the predetermined threshold THw (S4727: NO), control proceeds to step S4730.

In step S4729, the control unit 71 assigns the source creation time represented by the source information corresponding to the file for which the keywords are extracted in step S4420, to the interest start time.

Next, in step S4730, the control unit 71 assigns the value of the interest vector calculated in step S7410 to the non-telephone current interest vector Vw. Then, the control unit 71 secures a new area for separate search information in the search information management table in the storage unit 73 (S4740), and writes the source creation time of the source information for which the keywords are extracted in step S4420, into the new area (S4750). Then, the control unit 71 writes the keywords extracted in step S4420 into the new area as search keys (S4760), and writes the number of keywords into the new area (S4770).

By processing steps S4740 to S4770, the control unit 71 registers the separate search information corresponding to the source information for which the keywords are extracted in step S4420, into the search information management able. After step S4770 is processed, the non-telephone analysis process terminates.

Referring back to FIG. 44, after the non-telephone analysis process is finished, the control unit 71 resets the interest end time (S4470). Then, the control unit 71 judges whether an operation mode of the digital telephone 50 is a "call-in telephone communication mode" (S4480).

Specifically, the control unit 71 judges that the digital telephone 50 is in the call-in telephone communication mode until a predetermined time period (e.g., a time period obtained by adding a correction value α (determined considering a processing delay) to a certain time period T2) elapses from a time when the source information having the device usage information of "call-in" is registered in the source management table, while the control unit 71 judges that the digital telephone 50 is not in the call-in telephone communication mode in a time other than the above mentioned time period.

The call-in telephone communication mode means an operation mode in which the digital telephone 50 is in the telephone communications with a telephone after receiving a call from the telephone.

If the judgment result of step S4480 is YES, the control unit 71 sets the call-in flag to ON (S4481). If the judgment result of step S4480 is NO, the control unit 71 sets the call-in flag to OFF (S4485). Then, control proceeds to step S4490.

In step S4490, the control unit 71 judges whether an end command is received. If the end command is not received (S4490: NO), control returns to step S4410 to wait until unprocessed source information is found. If the end command is received (S4490: YES), the keyword extraction process terminates.

Hereafter, a search control process executed under control unit 71 of the information analysis device 70 will be explained with reference to FIGS. 50 and 51. The search control process is executed concurrently with the keyword extraction process.

First, the control unit 71 resets the count representing the number of search processes to zero (S4810). Next, the control unit 71 judges whether unprocessed separate search information (which has not undergone steps from S4840) is found (S4830). If unprocessed separate search information is found (S4830: YES), control proceeds to step S4840. The control unit 71 waits until unprocessed separate search information is found (S2830: NO).

In step S2840, the control unit 71 selects one of pieces of unprocessed separate search information having the latest source creation time, as a target. Then, the control unit 71 judges whether the source creation time represented by the target separate search information is later than or equal to the current interest start time (i.e., a condition interest start time≦source creation time) (S4850). As described above, the interest start time is set in step S4529 or S4729.

If the judgment result of step S4850 is YES, control proceeds to step S4860. If the judgment result of step S4850 is NO, control returns to step S4830. In step S4860, the control unit 71 judges whether the number of search processes is smaller than a predetermined upper limit (S4860).

If the number of search processes is smaller than the predetermined upper limit (S4860: YES), control proceeds to step S4900. If the number of search processes is not smaller than the predetermined upper limit (i.e., the number of search processes is equal to the predetermined upper limit) (S4860: NO), control proceeds to step S4870 where the control unit 71 judges whether the call-in flag is ON.

If the call-in flag is ON (S4870: YES), control proceeds to step S4900. If the call-in flag is OFF (S4870: NO), the control unit 71 selects a process (process management information) corresponding to separate search information having the oldest source creation time, from among processes registered in a search process management table, as a target of stop (S4880). Then, the control unit 71 inputs an end command to the target process, so that the target process is stopped (S4890).

FIG. 52 shows an example of a data structure of the search process management table stored in the storage unit 73. As shown in FIG. 52, the search process management table includes one or more pieces of process management information respectively corresponding to running search processes.

After step S4890 is finished, the control unit 71 reads settings of the number of counts of search results to be adopted. Next, the control unit 71 judges whether the interest end time is set (S4910). If the interest end time is not set (S4910: NO), the control unit 71 sets a processing time limit representing the maximum value of the processing time to be given to the search process, to "unlimited" (S4920). Then, control proceeds to step S4940.

If the interest end time is set (S4910: YES), the control unit 71 assigns a difference between the current time and the interest end time to processing time limit (S4930). Then, control proceeds to step S4940.

In step S4940, the control unit 71 selects a piece of search program information, for which a query has not been issued, from a search program management table. Further, the control unit 71 initiates a search process corresponding to the selected search program information, while designating the number of counts of search results read in step S4900, the processing time limit set in step S4920 or S4930, and the separate search information selected in step S4840 as a target (S4950).

FIG. 53 shows an example of a data structure of the search program management table stored in the storage unit 73. As shown in FIG. 53, the search program management table includes one or more pieces of search program information respectively corresponding to search programs to be executed. Each of the pieces of search program information includes address information (URL) of the information searching server 20 having the search program, a manner of crating a query (including a manner of creating a search condition), category information representing the type of contents to be searched by the search program.

In step S4940, the control unit 71 selects a piece of search program information, for which a query has not been sent to a URL represented by the address information, from among search programs registered in the search program management table, as a target. In step S4950, the control unit 71 initiates a search process while designating the target search program information. It should be noted that the initiated search process is executed concurrently with other processes. Further, the search process creates a query in accordance with the query creation information represented by the designated search program information. The created query is sent to the information searching server 20 having the URL represented by the address information of the search program information.

After step S4950 is processed, the control unit 71 creates process management information for the initiate search process, and registers the process management information into the search process management table stored in the storage unit 73 (S4960). That is, the process management information, including the process ID of the initiated search process, and the address information representing a memory location of the separate search information selected as the target in step S4840, is created, and the created process management information is registered in the search process management table.

Next, the control unit 71 adds 1 to the number of search processes (S4970). Then, the control unit 71 judge whether search program information for which a query has not been issued is found in the search program management table (S4980). If such search program information is found (S4980: YES), control returns to step S4940 to select a piece of search program information from among pieces of search program information for which queries have not been issued, as a target.

If search program information for which a query has not been issued is not found (S4980: NO), control proceeds to step S4990. In step S4990, the control unit 71 judges whether an end command is received. If the end command is not received (S4990: NO), control returns to step S4830. If the end command is received (S4990: YES), the search control process terminates.

Hereafter, a search process executed under control of the control unit 71 of the information analysis device 70 will be explained with reference to FIG. 54. The search process is executed concurrently with another search process.

When the search process is started, the control unit 71 resets a timer (S5110). Then, the control unit 71 reads the designated search program information from the search program management table (S5120). Then, the control unit 71 creates a search condition, in which search keys contained in the designated separate search information are set, based on the query creation information contained in the read search program information and a group of search keys contained in the designated separate search information. Further, the control unit 71 creates a query containing the search condition to be transmitted to the information searching server 20 (S5130).

Next, the control unit 71 sends the created query to the URL represented by the search program information, so that the search program having the URL is executed by the information searching server 20 (S5140).

In this case, the information searching server 20 searches for contents (corresponding to the search keys contained in the separate search information) in accordance with the search condition contained in the received query, and sends a reply signal containing link information to the contents, back to the information analysis device 70. If an end command for a running search program is inputted from the information analysis device 70, the information searching server 20 ends the search program, and sends a reply signal indicating that the search is stopped, back to the information analysis device 70 in place of sending a search result.

After sending the query in step S5140, the control unit 71 judges whether the processing time limit is reached (S5150).

If the processing time limit is not reached (S5150: NO), control proceeds to step S5160. If the processing time limit is reached (S5150: YES), the control unit 71 sends an end command to the URL corresponding to the search program which is being executed by the information searching 20 according to an instruction from the control unit 71 (S5115). Then, control proceeds to step S5160.

In step S5160, the control unit 71 judges whether the reply signal is received. If the reply signal is not received (S5160: NO), control proceeds to step S5161 where the control unit 71 judges whether an end command is inputted to the search process by the process of step S4890. If the end command is inputted (S5161: YES), the control unit 71 sends an end command for the search program (which the control unit 71 causes the information searching server 20 to execute), to the URL corresponding to the search program (S5165). Then, control returns to step S5150.

If the end command is not inputted to the search process (S5161: NO), control returns to step S5150 without processing step S5165.

If it is judged in step S5160 that the reply signal is received (S5160: YES), control proceeds to step S5170 where the control unit 71 judges whether the received replay signal indicates the search result or indicates that the search is stopped. If the reply signal does not indicate the search result (S5170: NO), control proceeds to step S5190 where the control unit 71 decrements the number of search processes by 1. Then, the search process terminates.

If the reply signal indicates the search result (S5170: YES), control proceeds to step S5180 where the control unit 71 judges whether the category information of the designated search program information corresponds to "term search". If the category information does not correspond to "term search" (but corresponds to "general search") (S5180: NO), the control unit 71 extracts pieces of link information (the counts of which correspond to the designated number of counts to be adopted) from the search result including a group of pieces of link information. Then, the control unit 71 generates separate result information storing the corresponding link information, for each of the extracted pieces of link information (S5181). Further, the control unit 71 registers the generated separate result information into a search result management table stored in the storage unit 73 (S5183).

FIG. 55 shows an example of a data structure of the search result management table stored in the storage unit 73. The search result management table includes one or mores pieces of separate result information.

The control unit 71 generates the separate result information for each of the pieces of extracted link information. The separate result information includes content storage location information corresponding to the link information (URL), category information representing the type of the search program which outputted the search result, address information representing a storage location of separate search information to be treated by the search process, a search completion time information to which the current time is written, and output information having a value of "FALSE". The control unit 71 registers the separate result information into the search result management table (S5183).

Next, the control unit 71 adds 1 to the number of search processes (S5190). Then, the search process terminates.

If the category information corresponds to "term search" (S5180: YES), the control unit 71 extracts a piece of link information (regardless of the designated number of counts to be adopted) from the search result containing a group of pieces of link information received as the reply signal, and generates separate result information storing the extracted link information (S5185). Then, the control unit 71 registers the generated separate result information into the search result management table stored in the storage unit 73 (S5187). After step S5187 is processed, the control unit 71 adds 1 to the number of search processes (S5190). Then, the search process terminates.

Hereafter, a search result reading control process executed under control of the control unit 71 of the information analysis device 70 will be explained with reference to FIG. 56. The search result reading control process is executed concurrently with the search control process.

When the search result reading control process is started, the control unit 71 resets the number reading processes (shown in FIG. 58) to zero (S5210). Then, the control unit 71 judges whether unprocessed separate result information (not underwent steps from S5230) is found in the search result management table (S5220). The control unit 71 waits until unprocessed separate result information is registered (S5220: NO). If unprocessed separate result information is found (S5220: YES), control proceeds to step S5230.

In step S5230, the control unit 71 selects separate search result information having the latest source creation time, as a target. Then, the control unit 71 judges whether the source creation time represented by the separate search information corresponding to the target separate result information is later than or equal to the currently set interest start time (i.e., the control unit 71 judges whether a condition (interest start time)≦(source creation time) is satisfied) (S5240). If the source creation time is later than or equal to the interest start time (S5240: YES), control proceeds to step S5250. If the source creation time is older than the interest start time (S5240: NO), control returns to step S5220.

In step S5250, the control unit 71 judges whether the number of reading processes is smaller than a predetermined upper limit (S5250). If the number of reading processes is smaller than the predetermined upper limit (S5250: YES), control proceeds to step S5300.

If the number of reading processes is not smaller than the predetermined upper limit (S5250: NO), the control unit 71 judges whether the call-in flag stored in the RAM is ON (S3270). If the call-in flag is ON (S5270: YES), control proceeds to step S5300. If the call-in flag is not ON (S5270: NO), control proceeds to step S5280 where the control unit 71 selects a process having the oldest source creation time represented by the separate search information corresponding to the process management information of the process, from among processes registered in a reading process management table, as a target of termination. Then, the control unit 71 sends an end command to the target process (S5290), by which the target process terminates.

FIG. 57 shows an example of a data structure of the reading process management table stored in the storage unit 73. As shown in FIG. 57, the reading process management table includes one or more pieces of process management information respectively corresponding to running processes. Each of the pieces of process management information includes a process ID and address information representing a registration location of the separate search information corresponding to the process.

Next, the control unit 71 judges whether the interest end time is set (S5300). If the interest end time is not set (S5300: NO), the control unit 71 sets the processing time limit representing the maximum value of a processing time to be allocated to the reading process, to "unlimited" (S5310). Then, control proceeds to step S5330.

If the interest end time is set (S5320: YES), the control unit 71 assigns a difference between the current time and the interest end time, to the processing time limit (S5325). Then, control proceeds to step S5330.

In step S5330, the control unit 71 initiates a reading process, while designating the processing time limit set in step S5310 or S5320, and further designating the separate result information selected in step S5230 as a processing target. The reading process thus initiated is executed concurrently with other processes. The reading process sends a request for contents (data files) to the URL represented by the target separate result information to obtain the contents.

Next, the control unit 71 generates process management information for the initiated reading process, and registers the process management information into the reading process management table (S5340). Specifically, the control unit 71 generates the process management information, including a process ID of the initiated reading process and the address information representing the storage location of the separate search information indicated by the target separate result information selected in step S5230, into the reading process management table.

Next, the control unit 71 increments the number of reading processes by 1 (S5350). Then, the control unit 71 judges whether an end command is received (S5360). If the end command is not received (S5360: NO), control returns to step S5220. If the end command is received (S5360: YES), the search result reading control process terminates.

Hereafter, a reading process executed under control of the control unit 71 of the information analysis device 70 will be explained with reference to FIG. 58. The reading process is executed concurrently with other processes.

When the reading process is started, the control unit 71 resets the timer (S5410). Then, the control unit 71 reads the content storage location information of the designated (target) separate result information (S5420), and sends a request signal to a URL represented by the obtained content storage location information (S5430).

After sending the request signal, the control unit 71 judge whether a certain processing time limit is reached based on the value of the timer (S5440). If the certain processing time limit is not reached (S5440: NO), control proceeds to step S5450. If the certain processing time limit is reached (S5440: YES), control proceeds to step S5445 where the control unit 71 closes the session (i.e., ends the communication). Next, the control unit 71 subtracts one from the number of reading processes (S5490). Then, the reading process terminates.

In step S5450, the control unit 71 judges whether a reply signal, which is a response to the request signal sent in step S5430, is received. If the reply signal is not received (S5450: NO), control proceeds to step S5451 where the control unit 71 judges whether an end command is inputted to the reading process (one of processes executing the reading process) by step S5290 (S5451). If the end command is inputted (S5451: YES), the control unit 71 closes the session (S5453). Next, the control unit 71 subtracts one from the number of reading processes (S5490). Then, the reading process terminates.

If the end command is not inputted (S5451: NO), control returns to step S5440.

If the reply signal is received (S5450: YES), the control unit 71 judges whether the replay signal corresponds to the requested contents or error information (S5460). If the reply signal does not correspond to the requested contents (S5460: NO), the control unit 71 subtracts one from the number of reading processes (S5490). Then, the reading process terminates.

If the reply signal corresponds to the requested contents (S5460: YES), the control unit 71 stores the contents in the storage unit 73(S5470). Then, the control unit 71 updates the search result management table by changing the content storage location information of the target separate result information, to URL information representing a storage location of the contents (S5480). Next, the control unit 71 subtracts one from the number of reading processes (S5490). Then, the reading process terminates.

Hereafter, an output process executed under control of the control unit 71 of the information analysis device 70 will be explained with reference to FIG. 59. The output process is executed concurrently with the search result reading control process.

When the output process is started, the control unit 71 judges whether unprocessed contents (contents not outputted) are found in contents stored in the storage unit 73 by the reading process (S5510). The judgment of step S3510 is made in accordance with the content storage location information and the output information in the search result management table. The content storage location information represents the existence of the contents. If separate result information having the output information of "FALSE" is registered in the search result management table, the control unit 71 judges the contents corresponding to the separate result information to be unprocessed contents, and judges that unprocessed contents are found.

The control unit 71 waits until unprocessed contents are generates (S5510: NO). If unprocessed contents are found (S5510: YES), the control unit 71 selects one of pieces of unprocessed contents having the latest source creation time represented by the corresponding separate search information, as a target (S5520).

Next, the control unit 71 judges whether the source creation time of the target contents is later than or equal to the interest start time (i.e., the control unit 71 judges whether a condition (interest start time)≦(source creation time) is satisfied) (S5525). If the source creation time of the target contents is later than or equal to the interest start time (S5525: YES), control proceeds to step S5530. If the source creation time of the target contents is older than the interest start time (S5525: NO), control returns to step S5510.

In step S5530, the control unit 71 judges whether the target contents correspond to the result of term search, based on the separate result information corresponding to the target contents.

More specifically, the control unit 71 judges whether the target contents correspond to the result of term search, by judging whether the category information of the separate result information corresponding to the target contents represents "term search". Alternatively, the control may judge whether the target contents correspond to the result of term search, by analyzing the contents.

If the target contents correspond to the result of the term search (S5530: YES), the control unit 71 displays the contents in the term display area IM 43 on the content providing screen of the display unit 77. Then, control proceeds to step S5570. If the target contents do not correspond to the result of the term search (S5530: NO), control proceeds to step S5540 where the control unit judges whether the target contents correspond to a moving image file. If the target contents correspond to a moving image file (S5540: YES), the control unit queues the target contents and the corresponding source creation time, into a moving image reproduction data queue, while associating the contents with the source creation time (S5545). Then, control proceeds to step S5570.

In this embodiment, the control unit 71 of the information analysis device 70 has the function of serving as the moving image reproduction data queue, and reproducing the contents (moving image file) registered in the moving image reproduction data queue. As described above, a relationship between a moving image reproduction area control process and the moving image reproduction data queue is schematically illustrated in FIG. 21A. In the moving image reproducing area control process, content items (moving image files) registered in the moving image reproducing data queue are reproduced sequentially in order in which the contents are registered so that the moving image are reproduced in the moving image area IM 42 on the content providing screen and sound is reproduced through the sound output unit 79.

If the target contents do not correspond to a moving image file (S5540: NO), control proceeds to step S5550 where the control unit 71 judges whether the target contents correspond to a sound file. If the target content correspond to a sound file (S5550: YES), the control unit 71 reproduces the sound file through the sound output unit 79 (S5555). Then, control proceeds to step S5570.

If the reproducing process, which is initiated for another sound file previously, is running, the control unit 71 stops the reproducing process for the previously targeted sound file, and then initiates a reproducing process for a currently targeted sound file. If a moving image with sound is being produced for previously targeted contents, the control unit 71 reproduces the currently targeted sound file in place of reproducing the sound of the previously targeted contents, through the sound output unit 79.

If the target contents do not correspond to a sound file (S5550: NO), the control unit 71 registers the target contents and the corresponding source creation time into the display data queue, while associating the target contents with the source creation time (S5560). Then, control proceeds to step S5570.

In this embodiment, the control unit 71 of the information analysis device 70 is capable of functioning as a display data queue and displaying the contents (e.g., information containing letters and images, such as a web page) registered in the display data queue. As described above, a relationship of the display data queue controlled by the control unit 71 and a text and image area display control process to be executed by the control unit 71 is schematically illustrated in FIG. 21B. In the text and image area display control process, contents registered in the display data queue are processed sequentially so that the contents are displayed within the text and image area IM41.

In step S5570, the control unit 71 changes the output information of the separate result information corresponding to the target contents, to "TRUE", and thereafter removes contents having the source creation time earlier than the current time by a certain time from the moving image reproduction data queue and the display data queue (S5580).

Next, the control unit 71 judges whether an end command is received (S5590). If the end command is not received (S5590: NO), control returns to step S5510. If the end command is received (S5590: YES), the output process terminates.

In the content providing system according to the third embodiment, the PC 30 operates to obtain data (information concerning inputted letters) which the user inputted to the PC 30 through the input unit 41, from software, and to obtain data (targeted for display), which is to be displayed on the display unit 43 for displaying documents being edited or browsed by the user, from software. Further, the control unit 71 sends the obtained data to the information analysis device 70, together with the source creation time representing a time when the data is inputted to the PC 30 or is outputted (i.e., a time when transmission target data is created), each time the predetermined time period T1 elapses (as shown in the PC monitoring process).

The digital telephone 50 operates to collects sound data inputted by the user though the sound input unit 61 during the telephone communication, and sound data to be output to the user through the sound output unit 63. Further, the digital telephone 50 sends the collected sound data to the information analysis device 70, together with the source creation time representing a time when the sound is inputted or is outputted (i.e., a time when transmission target data is created), each time the predetermined time period T2 elapses (as show in the telephone monitoring process).

The digital telephone 50 receives a file containing the input data (data inputted to the PC 30 by a user) and the output data (data output to the user) from the PC 30, and receives a file containing the inputted sound data and outputted sound data from the digital telephone (as shown in S310 of the telephone monitoring process). Then, the digital telephone 50 stores the received file in the storage unit 73. Further, the digital telephone 50 stores the received file in the source management table, together with the source creation time accompanying the file, while associating the source creation time with the file (as show in step S330).

The information analysis device 70 estimates a user's interest based on text data in the received data (S4710) each time the information analysis device 70 receives data from the PC 30. Specifically, the information analysis device 70 extracts keywords from the text data obtained from the PC 30, and determines the type of interest to which the obtained keywords belong in accordance with the interest estimation table defining the types of interest. Further, the information analysis device 70 increments the element corresponding to the determined type of interest in the interest vector by one, so that the interest vector V representing the estimated value of the user's interest is calculated.

During the telephone communication state of the digital telephone 50, the information analysis device 70 estimates a user's interest based on the latest received data each time the estimated time (during which the user's interest would continue) elapses (S4520).

Each time the information analysis device 70 calculates the interest vector V (S4520, S4710), the information analysis device 70 retains the result of the calculation as an interest vector (telephone current interest vector Vp or non-telephone current interest vector Vw) (S4530, S4730).

Before processing step S4530 or S4730, the information analysis device 70 calculates the inner product (Rp, Rw) of the previously retained current interest vector (Vp, Vw) and the newly calculated interest vector V (S4525, S4725). If the inner product (Rp, Rw) is smaller than a predetermined threshold, the information analysis device 70 assigns the source creation time obtained (together with the text data used to calculate the newly calculated interest vector V) from the digital telephone 50 to the interest start time (S4529, S4729), assuming that the source creation time represents the time when the user's interest changes.

The information analysis device 70 selects a file having the source creation time later than or equal to the interest start time, from among received files stored in the storage unit 73, and executes the search process, to be executed based on the keywords extracted from the text data in the received file, only for the selected file (S4850: YES).

The information analysis device 70 selects a file having the source creation time later than or equal to the interest start time, from among received files stored in the storage unit 73, and executes the reading process (for searching for contents relating to the keywords) only for the selected file (S5240: YES).

The information analysis device 70 selects a file having the source creation time later than or equal to the interest start time, from among received files stored in the storage unit 73, and executes the output process only for the selected file (S5525: YES), so that the contents corresponding to a file having the source creation time later than or equal to the interest start time is selectively provided to the user as images or sound outputs.

As described above, the information analysis device 70 obtains contents corresponding to data inputted through the user interface at a time later than or equal to the interest start time, and data outputted through the user interface at a time later than or equal to the interest start time. Therefore, it is possible to provide contents matching with the user's interest to the user at an appropriate time.

In this embodiment, a time when the data is inputted through the user interface and a time when the data is outputted through the user interface are recorded based on time information transmitted along with text data from the PC 30 or the digital telephone 30. Therefore, it is possible to provide contents matching with the user's interest more accurately in a limited time period during which the user's interest continues, in comparison with the case where the receiving time of the text data is recorded and the recorded time is used to select contents to be provided for the user.

It should be noted that there is a possibility that the order in which data is received by the information analysis device 70 becomes unequal to the order in which the data is inputted (or outputted) to the PC 30 or digital telephone through the user interface. Therefore, if the information analysis device 70 records the receiving time of the data in place of recording the source creation time, the information analysis device 70 may become unable to accurately recognize the order in which the data is inputted (or outputted) to the PC 30 or digital telephone through the user interface. However, according to the embodiment, the information analysis device 70 is able to recognize the order in which the data is inputted (or outputted) to the PC 30 or digital telephone through the user interface. Therefore, it is possible to accurately provide proper contents to the user.

It is understood that various variations of the system configuration and processes described in the third embodiment are possible.

In the above mentioned embodiment, the interest vector V calculated in step S4520 is assigned to the telephone current interest vector Vp in the telephone analysis process, and the interest vector V calculated in step S4710 is assigned to the non-telephone current interest vector Vw. However, a common current interest vector Vc may be used for each of the telephone analysis process and the non-telephone analysis process without using the parameter Vp and Vw. In step S4530 and S4730, the interest vector V calculated in advance (the interest vector calculated in step S4520 and S4710) may be assigned to the common current interest vector Vc. In this case, the common parameter Vc may be used in steps S4523, S4525, S4723, and S4725 which use the parameter Vp or Vw.

In the output process, the information analysis device 70 judges whether "not outputted contents" exist based on the output information. However, the information analysis device 70 may remove the separate result information of the already outputted contents from the search result management table, and may judge all of the contents corresponding to the separate result information remaining in the search result management table to be "not outputted contents".

In the above mentioned embodiment, the search process, reading process and output process are not executed for the separate search information and the separate result information representing the source creation time alder than the interest start time. Therefore, V the separate search information and the separate result information representing the source creation time older than the interest start time can be removed from the corresponding table immediately at the time when the judgment ("NO") is made in step S4850, at the time when the judgment ("NO") is made in step S5240, and at the time when the judgment ("NO") is made in step S5525. Consequently, each process can be executed effectively.

Fourth Embodiment

Hereafter, a content providing system according to a fourth embodiment of the invention will be described. Since a configuration of the content providing system according to the fourth embodiment is substantially the same as that shown in FIG. 1, the content providing system according to the fourth embodiment is explained with reference to FIG. 1.

In this embodiment, the PC 30 executes the same PC monitoring process as that shown in FIG. 2, the digital telephone 50 executes the same telephone monitoring process as that shown in FIG. 3, and the information analysis device 70 executes the same source information registration process as that shown in FIG. 5. Therefore, the content providing system 1 according to the third embodiment is explained with reference to FIGS. 1 to 6, and explanations of FIGS. 1 to 6 will not be repeated. In this embodiment, the PC monitoring process may be executed repeatedly without checking the end command (i.e., without processing step S190).

Hereafter, a keyword extraction process executed by the control unit 71 of the information analysis device 70 will be explained with reference to FIG. 60. The keyword extraction process is executed concurrently with the source information registration process.

First, the control unit 71 judges whether unprocessed source information is found in the source management table (S6410). If unprocessed source information is not found (S6410: NO), the control unit 71 waits until unprocessed source information is registered by the source information registration process. If unprocessed source information is found (S6410: YES), the control unit 71 analyzes text data (e.g., by morphological analysis) of the file associated with the unprocessed source information so as to extract nouns other than particular nouns from the text data. Further, the control unit 71 decides to assign the extracted nouns other than predetermined nouns to keywords (S6420). In this embodiment, general nouns not used for keywords to search contents are stored in advance in the storage unit 73 and are used as the particular keywords.

After step S6420 is processed, the control unit 71 executes an interest vector calculation process (S6430). FIG. 62 is a flowchart illustrating the interest vector calculation process executed under control of the control unit 71. In the embodiment, matters of concern to a user (i.e., a user's interest) are represented by interest vectors, and the priority of content output is determined by the interest vectors.

The term interest vector means a vector obtained by expressing numerically user's interest. Specifically, an interest vector V is expressed by a one row and n column vector:

$$V=(v1,v2,\ldots vn)$$

where elements v1, v2, . . . vn respectively correspond to types of interest categorized in advance.

When the interest vector calculation process is started, the control unit 71 resets an interest vector V to zero (S6510). Then, the control unit 71 selects an unprocessed keyword from among keywords extracted in step S6420 (FIG. 60) as a target keyword (S6520). Further, the control unit 71 searches an interest estimation table stored in the storage unit 73 for the target keyword (S6530). FIG. 63 shows an example of a data structure of the interest estimation table. As shown in FIG. 63, the interest estimation table includes keywords and parameters for weight (weighting definitions) for each of the types of interest.

After step S6530 is processed, the control unit 71 judges whether the target keyword is found (S6540). If the target keyword is found among the keywords registered in the interest estimation table (S6540: YES), the control unit 71 determines the type of interest to which the target keyword belongs, using the interest estimation table (S6550). Then, the control unit 71 adds 1 to the element vi (where i (i=1, 2, . . . , n) corresponds to the type of interest) of the interest vector V. Then, control proceeds to step S6570.

If the target keyword is not found in the keywords registered in the interest estimation table (S6540: NO), control proceeds to step S6570. In step S6570, the control unit 71 judges whether an unprocessed keyword exists in the extracted keywords. If an unprocessed keyword is found (S6570: YES), control returns to step S6520 to select one of the unprocessed keywords as a target keyword. In this embodiment, if one or more same keywords are found among the keywords obtained in step S6530, all of the same keywords undergo the steps S6540 to S6560.

If an unprocessed keyword is not found (S6570: NO), the interest vector V is calculated in accordance with weighing definitions in the interest estimation table. That is, each element vi is weighted in accordance with the weighting definitions.

The weighting definitions are categorized in two groups. A first weighting definition is represented by a combination of the device usage information and a weighting factor W. A second weighting definition is represented by the time information and a weighting factor W. The control unit 71 weights each element vi corresponding to the first weighting definition if the device usage information of the source information corresponding to the file (of which keywords are extracted in step S6420) is equal to the device usage information represented by the weighting definition.

More specifically, in step S6580, the control unit 71 selects the element vi corresponding to the type of interest having the first weighting definition of which device usage information is equal to the device usage information of the source information corresponding to the file (of which keywords are extracted in step S6420), as a weighting target. The control unit 71 further multiplies the weighting target vi by the weighting factor W as shown below.

$$vi \leftarrow vi \times W$$

Then, the control unit 71 weights the element vi corresponding to the type of weighting to which the second weighting definition is assigned if the current time is within the time period represented by the time information of the weighting definition of the element vi.

In step S6580, the control unit 71 multiplies the element vi, which corresponds to the type of weighting to which the second weighting definition and has the time information within which the current time lies, by the weighting factor W.

After S6580 is processed, the control unit 71 outputs the calculation result as a return value. Then, the interest vector calculation process terminates.

Referring back to FIG. 60, after step S6430 is processed, control proceeds to step S6450. In step S6450, the control unit 71 secures a new writing area for separate search information in a search information management table stored in the storage unit 73. Then, the control unit 71 writes the source creation time information of the source information, of which keywords are extracted in step S6420, into the new writing area (S6460), and writes the interest vector V calculated in step S6430 into the new writing area (S6470).

Next, the control unit 71 writes the keywords extracted in step S6420 into the new writing area, as search keys (S6480), and writes the number of search keys into the new writing area (S6490). Then, control returns to step S6410.

FIG. 61 shows an example of a data structure of the search information management table. As shown in FIG. 61, the search information management table includes one or more pieces of separate search information, each of which includes the source creation time information, a value of the interest vector, information about search keys, and the number of search keys.

Hereafter, a search control process executed under control of the control unit 71 of the information analysis device 70 will be explained with reference to FIG. 64. First, the control unit 71 judges whether unprocessed separate search information is found in the search information management table (S6610). That is, the control unit 71 waits until unprocessed separate search information is found (S6610). If unprocessed separate search information is found (S6610: YES), control proceeds to step S6620.

In step S6620, the control unit 71 selects unprocessed separate search information having the latest source creation time, as a target. Then, if more than one pieces of target separate search information are found, the control unit 71 selects a piece of separate search information having the number of search keys largest of all of pieces of separate search information (S6630).

After step S6630 is processed, the control unit 71 selects a piece of search program information, for which a query has not issued, from a search program management table (S6640). Then, the control unit 71 defines the separate search information selected in step S6630 as a target, and initiates a search process for the selected search program information (S6650).

FIG. 65 shows an example of a data structure of the search program management table stored in the storage unit 73. As shown in FIG. 65, the search program management table includes one or more pieces of search program information, each of which includes address information (URL) of the information searching server 20 having a search program, query creation information representing a manner of creation of a query (a manner of creation of a search condition), and category information representing the type of contents to be searched by the corresponding search program.

Specifically, in step S6640, the control unit 71 selects a piece of search program information for which a query is not sent to the information searching server 20 having a URL indicated by the address information, from among the pieces of search program information registered in the search program management table. Then, the control unit 71 initiates a search process (S6650).

The search process initiated in step S6650 is managed by a scheduler and is executed concurrently with other processes. The search information management table may be configured as a queue so that a record (separate search information) selected in step S6620 or S6630 is removed from the search information management table when the search process corresponding to the record is initiated.

After step S6650 is processed, the control unit 71 judges whether search program information for which a query has not issued is found in the search program management table (S6660). If such search program information is found (S6660: YES), control returns to step S6640 where the control unit 71 selects a piece of search program information from among pieces of pieces of search program information for which queries have not issued.

If search program information for which a query has not been issued is not found (S6660: NO), control returns to step S6610.

Hereafter, a search process which corresponds to one of search processes executed concurrently by the control unit 71 will be explained with reference to FIG. 66. The search process is executed concurrently with the search control process.

First, the control unit 71 generates a search condition having search keys contained in the currently designated separate search information, based on the query creation information contained in the selected search program information and the search keys of the designated separate search information, and then generates a query containing the search condition to send it to the information searching server 20 (S6710).

Next, the control unit 71 sends the query to a URL indicated by the search program information so as to cause the information searching server 20 to execute the search program corresponding to the URL of the information searching server 20 (S6720). After receiving the query, the information searching server 20 searches for contents corresponding to the search keys contained in the separate search information in accordance with the search condition contained in the query, and then sends a reply signal containing link information to the searched contents, back to the information analysis device 70, as a search result.

After sending the query, the control unit 71 judges whether the reply signal is received (S6730). The control unit 71 waits until the reply signal is received (S6730: NO). If the reply signal is received (S673: YES), the control unit 71 judges whether the reply signal is formed as a search result or the reply signal indicates that the search program is aborted (S6740). If the reply signal is not the search result (S6740: NO), the search process terminates.

If the reply signal is a search result (S6740: YES), the control unit 71 judges whether the category information of the selected search program information is "term search" (S6750).

If the category information is not "term search" (i.e., the category information is "general search") (S6750: NO), the control unit 71 extracts a predetermined number of pieces (e.g., five pieces) of link information (determined based on the fact that the category information is "general search") from among more than one pieces of link information contained in the search result received as the reply signal. Then, the control unit 71 generates separate result information having the corresponding link information, for each of the piece of link information. Next, the control unit 71 registers the separate result information in a search result management table stored in the storage unit 73 (S6770). After step S6770 is processed, the search process terminates.

FIG. 67 shows an example of the search result management table. As shown in FIG. 67, the search result management table includes one or more pieces of separate result information, each of which includes source creation time information, category information representing the type of the search program which has outputted the search result, content storage address information storing the link information, acquisition information, an acquisition completion time, output information, and an evaluation value.

If the category information is "term search" (S6750: YES), the control unit 71 extracts a predetermined number of pieces (e.g., a piece of) of link information (determined based on the fact that the category information is "term search") from among more than one pieces of link information contained in the search result received as the reply signal. Then, the control unit 71 generates separate result information having the corresponding link information. Then, the control unit 71 registers the generated separate result information in the search result X management table stored in the storage unit 73 (S6760). After step S6760 is processed, the search process terminates.

Hereafter, a search result evaluation process executed under control of the control unit 71 of the information analysis device 70 will be explained with reference to FIG. 68. The search result evaluation process is executed concurrently with other processes.

First, the control unit 71 judges whether unprocessed record (separate result information) is found in the search result management table (S7110). If unprocessed result information is not found (S7110: NO), the control unit 71 waits unprocessed search result information is registered.

If unprocessed search result information is found (S7110: YES), the control unit 71 selects the unprocessed result information, as target. Then, the control unit 71 calculates an inner product of the interest vector corresponding to the target unprocessed result information and an interest vector of a current interest table, and registers the value of the inner product into the record (target search result information).

In this embodiment, the current interest vector is updated by the control unit 71 and stored in the storage unit 73. FIG. 69A shows a data structure of the current interest table. FIG. 70 is a flowchart of a current interest table update process executed by the control unit 71. Each time unprocessed record is stored in the search result management table, an interest vector corresponding to the unprocessed record and the update time (a time when the search result management table is updated) are registered into the current interest table. In step S71250, the current vector is updated. Then, current time is assigned to the update time (S7260).

Referring back to FIG. 68, in step S7120, the interest vector V corresponding to the target record is divided by its norm ||V|| to obtain a normal vector E (E=V/||V||) of the interest vector V. Further, the interest vector Vc in the current interest table is divided by its norm ||Vc|| to obtain a normal vector Ec (Ec=Vc/||Vc||) of the current interest vector Vc. Then, an inter vector R (=E·Ec) of the normal vectors E, Ec is calculated, and the inner product R is registered as an evaluation value of the record.

Next, the control unit 71 identifies an interest vector having the highest inner product obtained with respect to the interest vector of the current interest table, from among interest vectors in a memory interest table stored in the storage unit 73 (S7130). FIG. 69B shows an example of a data structure of the memory interest table. As shown in FIG. 69B, the memory interest table includes a reference address (to which contents are to be stored) and an interest vector of the corresponding to the contents to be stored at the reference address, for each of content items. In step S7130, the inner product is obtained for each of the interest vector stored in the memory interest table, and thereafter the interest vector having the highest inner product is identified.

Memory areas used to output the contents (i.e., a term display data queue, an moving image reproduction data queue, a sound output data queue, and a text image display data queue) are allocated in advance in the storage unit 73, Next, the control unit 71 obtains contents for the target record based on content storage location of the target record (S7140). Specifically, the control unit 71 requests contents from a destination indicated by the content storage location of the target record, and then receives the contents from the destination.

Next, the control unit 71 checks the type of the contents (S7150). If the contents correspond to data representing terms (i.e., text data) (S7150: YES), the control unit 71 stores the contents in the term display data queue (allocated in the memory area registered in the memory interest table while being associated with the interest vector identified in step S7130), together with the source creation information and the evaluation value (registered in step S7120) corresponding to the target record (S7160). Then, control proceeds to step S7120.

If the contents do not correspond to the term (S7150: NO), control proceeds to step S7170 where the control unit 71 judges whether the contents correspond to a moving image file. If the contents correspond to a moving image file (S7170: YES), the control unit 71 stores the contents into the moving image reproduction data queue (allocated in the memory area registered in the memory interest table while being associated with the interest vector identified in step S7130), together with the source creation information and the evaluation value (registered in step S7120) corresponding to the target record (S7180). Then, control proceeds to step S7120.

If the contents do not correspond to a moving image file (S7170: NO), control proceeds to step S7190 where the control unit 71 judges whether the contents correspond to a sound file. If the contents correspond to a sound file (S7190: YES), the control unit 71 stores the contents into the moving image reproduction data queue (allocated in the memory area registered in the memory interest table while being associated with the interest vector identified in step S7130), together with the source creation information and the evaluation value (registered in step S7120) corresponding to the target record (S7180). Then, control proceeds to step S7120.

If the contents correspond to data (text data or image data) different from a term (S7190: NO), control proceeds to step S7120 where the control unit 71 stores the contents into the text image display data queue (allocated in the memory area selected in step S7130), together with the source creation information and the evaluation value (registered in step S7120) corresponding to the target record (S7210).

In step S7120, the control unit 71 selects contents, having the source creation time older than the current time by a predetermined time (e.g. ten minutes), from among contents stored in all of the data queues used for outputting contents, and removes the selected contents from the data queues.

Next, the control unit 71 sorts the contents stored in each of the data queues for outputting contents in order of decreasing evaluation value (S7230). Then, control returns to step S7110 to wait until an unprocessed record is registered.

Hereafter, an output process executed under control of the control unit 71 of the information analysis device 70 will be explained with reference to FIG. 71. The output process is executed concurrently with other processes and is executed repeatedly.

First, the control unit 71 selects an interest vector having the highest inner product obtained with respect to the interest vector in the memory interest table (S7310). Then, the control unit 71 changes the memory area to be used to output contents, to the memory area registered in the memory interest table while being associated with the interest vector selected in step S7310 (S7320).

Next, the control unit 71 judges whether unprocessed (not outputted) contents are found in the updated memory area set in step S7320 (S7330). If unprocessed contents are not found (S7330: NO), control returns to step S7310. If unprocessed contents are found (S7330: YES), the control unit reads the contents from the data queue in the memory area for the contents, and displays the contents on the content providing screen (see FIG. 4) (S7340).

Specifically, if the different data queues respectively have unprocessed contents, the control unit 71 displays all of the contents in the different dada queues. If more than one types contents are stored in a single data queue, the control unit 71 displays contents on a one by one basis in order in which the contents (content types) are arranged in the data queue.

If the data queue storing unprocessed contents is the term display data queue, the control unit 71 displays the contents in the term display area IM 43 on the content providing screen. In this case, if display of other contents is being processed in the term display area IM 43, the control unit 71 deletes the contents before displaying the unprocessed contents.

If the data queue storing unprocessed contents is the moving image reproduction data queue, the control unit 71 displays a moving image in the moving image area IM 42 on the content providing screen, and outputs sounds through the sound output unit 79. In this case, if display and output of other contents are being processed, the control unit 71 stops the display and output of other contents, and reproduces and outputs the unprocessed contents so that the unprocessed contents are treated preferentially.

If the data queue storing unprocessed contents is the sound output data queue, the control unit 71 starts to output sounds represented by the contents through the sound output unit 79. In this case, if sounds of other contents are being outputted, the control unit 71 stops the sound output of other contents, and starts to output the sounds of the unprocessed contents, so that the sound output of the unprocessed contents is treated preferentially.

If the data queue storing unprocessed contents is the text image data queue, the control unit 71 displays the contents such that the contents scroll up or down in the text and image area IM 41 on the content providing screen. In this case, if other contents are displayed in the text and image area IM 41, the control unit 71 displays unprocessed contents such that the unprocessed contents located under the other contents can be seen by scrolling.

After thus outputting the unprocessed contents, control returns to step S7330. Steps S7330 and S7340 are repeated until unprocessed contents disappear.

In the above mentioned embodiment, the control unit 71 extracts keywords from transmission target file obtained from the PC 30 or the digital telephone 50 (S6420), and searches for contents based on the extracted keywords (steps S6710 to S6730). Then, the control unit 71 stores the contents into the data queue for the content output (steps S7150 to S7210), and displays the contents on the content providing screen or outputs the contents through the sound output unit 79 (S7340).

Contents are stored in one of data queues (memory areas) corresponding to an interest vector calculated by using keywords corresponding to the contents (S7130).

For outputting contents, one of memory areas corresponding to the interest vector producing the largest inner product with the interest vector in the current interest table is selected (i.e., a memory area having the highest similarity with the interest vector in the current interest table is selected), and the selected memory area is referenced (S7310, S7320).

The interest vector of the current interest table is updated each time an unprocessed record is registered in the search result management table. Therefore, the current interest table reflects a user's interest changing with time. Furthermore, contents stored in a data queue having the highest similarity with the interest vector in the current interest table are outputted. Therefore, it is possible to output contents stored in the memory area corresponding to the latest user's interest.

Even if a user's interest changes after a time when keywords are obtained and before a time when contents corresponding to the keywords are obtained, contents reflecting the latest user's interest are outputted following transition of the user's interest.

For outputting contents, an evaluation value representing an inner product of the interest vector of the contents and the interest vector in the current interest table is related to the contents (S7120), and the contents are stored in the corresponding memory area (steps S7150 to S7120). Then, contents are sorted so that the contents having a higher evaluation value are outputted preferentially (S7230, S7340).

Each memory are for storing contents to be outputted is formed as a data queue, and therefore contents are outputted from each data queue in order in which contents are registered in each data queue. In this regard, contents in each data queue are sorted so that contents having the higher similarity with the latest interest vector reflecting the user's interest are read preferentially (S7130). It is possible to read contents from each data queue so that the contents having the higher similarity with the latest interest vector, by simply reading contents from each data queue. It is not necessary to identify the contents having the higher similarity with the latest interest vector for reading contents from each data queue.

After contents are stored in the data queues for outputting the contents, contents having the source creation time older than from the current time by a predetermined time are removed from the data queue (S7220). Therefore, such contents (older than the current time by a predetermined time) are not outputted. It should be noted that since the source creation time represents a time when transmission target data (from which keywords are to be extracted) is generated by the PC 30 or the digital telephone 50, there is a high possibility that the degree of the user's interest to contents has reduced or has disappeared with regard to the contents older than the current time by a predetermined time. However, according to the embodiment, such contents (older than the current time by a predetermined time) are removed form the data queue. Therefore, it is possible to prevent contents (older than the current time by a predetermined time) from being outputted.

Hereafter, a variation of the search result evaluation process will be explained with reference to FIG. 72. In FIG. 72, to steps having the same functions as those shown in FIG. 68, the same step numbers are assigned, and explanations thereof will not be repeated. In the following the feature of this variation is explained.

As shown in FIG. 72, after steps S7710 to S7140 are processed, an evaluation value update process is executed for the target record (S7410). As described later, in the evaluation value update process, the evaluation value is updated with time. The evaluation value update process is executed concurrently with other processes.

After processing steps S7150 to S7210, the control unit 71 selects contents associated with an evaluation value smaller than or equal to a predetermined threshold, from among contents stored in all of the data queues, and deletes the selected contents (S7420). Then, control proceeds to step S7230.

Hereafter, the evaluation value update process will be explained with reference to FIG. 73. First, the control unit 71 calculates an elapsed time from the source creation time of the target record passed from the search result evaluation process (S7510). Then, the control unit 71 judges whether the elapsed time reaches a certain update time representing a time when the evaluation value of the target record is to be updated (S7520). FIG. 74 shows an elapsed time parameter table stored in the storage unit 73. As shown in FIG. 74, an elapsed time parameter representing a time by which the elapsed time of the target record is to be multiplied is stored in the elapsed time parameter table, for each of more than one different elapsed time ranges. In step S7520, the control unit 71 judges that the certain update time is reached of an elapsed time parameter corresponding to the calculated elapsed time is registered in the elapsed time parameter table.

If the certain update time is not reached (S7520: NO), control returns to step S7510. If the certain update time is reached (S7520: YES), the control unit 71 multiplies the elapsed time by the elapsed time parameter corresponding to the elapsed time, and replaces the evaluation value of the target record with the newly calculated evaluation value (S7530). That is, in step S7530, the evaluation value of the target record is replaced with a function representing a product of the original evaluation value X and the obtained elapsed time parameter Y, so that a value of the function is referenced as the evaluation value of the target record.

After thus updating the evaluation value, the control unit 71 judges whether the evaluation value becomes lower than or equal to a predetermined threshold (e.g., zero) (S7540). If the evaluation value is not lower than or equal to a predetermined threshold (S7540: NO), control returns to step S7510. If the evaluation value is lower than or equal to a predetermined threshold (S7540: YES), the evaluation value update process terminates.

As described above, an evaluation value is controlled to decrease with time by the evaluation value update process (steps S7510 to S7540). Therefore, similarity between the contents and the current interest vector reflecting the user's latest interest can be reduced with time. Consequently, it becomes possible to prevent contents for which the user's interest has reduced from being provided to the user preferentially.

In the above mentioned embodiment, the information analysis device 70 is configured to obtain contents form an external server. However, the information analysis device 70 may be configured to have contents therein, and to search for contents in accordance with keywords. The information analysis device 70 may be configured to have the searching function, and to search for contents by using the searching function implemented therein.

The functions of the PC 30 and the functions of the information analysis device 70 may be integrated into a single computer. The information analysis device 70 may be configured to output contents on a display device of an external computer.

In the above mentioned evaluation value update process (FIG. 73), the evaluation value is changed according to the elapsed time between the current time and the source creation time. However, another time reference value may be used to determined the elapsed time for changing the evaluation value. For example, a time or a date when the information analysis device 70 obtains contents may be used as the time reference value.

In the above mentioned embodiment, contents obtained based on keywords are stored in an memory area corresponding to the latest interest (steps S7150 to S7210), and are sorted in decreasing order of an evaluation value, so that the contents having a higher evaluation value are outputted preferentially. However, contents may be sorted in order in which the contents are stored, or may be sorted in order in which the contents are obtained. Alternatively, contents may be sorted in a random basis. More than one contents may be read at a time, and then one of the contents to be read first may be outputted in such a manner in which priority thereof is represented.

Fifth Embodiment

Hereafter, a content providing system according to a fifth embodiment of the invention will be described. Since the content providing system according to the fifth embodiment is configured as a variation of the second embodiment, the fifth embodiment will be explained with reference to drawings referenced in the second embodiment. In the following, only features of the fifth embodiment will be explained.

FIGS. 75 and 76 show a search control process configured as a variation of the search control process shown in FIGS. 32 and 33. The search control process shown in FIGS. 75 and 76 is executed under control of the control unit 71 of the information analysis device 70. In FIGS. 75 and 76, to steps which are substantially the same as those shown in FIGS. 32 and 33, the same reference numbers are assigned, and explanations thereof will not be repeated.

The feature of the search control process shown in FIGS. 75 and 76 is that if the call-in flag is an ON state (S2875: YES), control proceeds to step S2900.

That is, if the number of process reaches the upper limit and the call-in flag is in a OFF state, a process corresponding to the separate search information having a low evaluation value is forced to stop (S2890), and thereafter a process having a higher evaluation value is newly initiated (S2950). On the other hand, if the call-in flag is in a OFF state, steps from S2900 are executed without stopping a process having a low evaluation value, so that a process corresponding to separate search information having the highest evaluation value is selected from the search information management table and the selected process is executed (S2950). In this case, search processes exceeding the upper limit in number may be executed.

It should be noted that a process for obtaining contents matching with a tentative user's interest caused by a call-in is newly initiated, without killing a process for obtaining contents matching with a user's interest potentially existing. Therefore, it is possible to provide desirable contents to a user in the case of call-in.

FIGS. 77 and 78 show a search result reading control process configured as a variation of the search result reading control process shown in FIGS. 39 and 40. The search result reading control process shown in FIGS. 77 and 78 is executed under control of the control unit 71 of the information analysis device 70. In FIGS. 77 and 78, to steps which are substantially the same as those shown in FIGS. 39 and 40, the same reference numbers are assigned, and explanations thereof will not be repeated.

The feature of the search control process shown in FIGS. 77 and 78 is that if the call-in flag is an ON state (S3270: YES), control proceeds to step S3300. With this configuration, advantages equivalent to those described above can be attained.

Sixth Embodiment

Hereafter, a content providing system according to a sixth embodiment of the invention will be described. Since a configuration of the content providing system according to the sixth embodiment is substantially the same as that shown in FIG. 1, the content providing system according to the sixth 'embodiment is explained with reference to FIG. 1. In this embodiment, a source management table, an interest estimation table, a search information management table, an interest history table, a current interest table, a search program management table, and a search result management table are stored in the storage unit 73 and are managed by the information analysis device 70.

Since the content providing system according to the sixth embodiment is regarded as a variation of the first embodiment, the sixth embodiment will be explained with reference to FIGS. 1 to 16 and 19 to 21B. In this embodiment, the search result management table may be configured as shown in FIG. 79. As shown in FIG. 79, each of pieces of separate result information includes a storage location of the corresponding separate search information so that a storage location of separate search information relating to the separate result information can be located using the search result management table.

Hereafter, the feature of the sixth embodiment (i.e., a current interest table update process) is explained.

FIG. 80 is a flowchart illustrating the current interest table update process according to the sixth embodiment. The current interest table update process is executed in step S750 of the search result evaluation process.

First, the control unit 71 reads the interest vector of the separate search information having the latest source creation time from the search information management table (S8961). In a situation in which pieces of source information are created continuously, different source information is read each time step S8961 is executed. On the other hand, in a situation in which creation of source information is interrupted, the same source information created immediately before the interrupt is read repeatedly in step S8961.

After step S8961 is finished, the control unit 71 judges whether history information is registered in an interest history table stored in the storage unit 73 (S8963). FIG. 81A shows an example of a data structure of the interest history table. The interest history table accommodates pieces of history information up to a predetermined upper limit (e.g. three). The judgment result of step S8963 is YES if no history information is registered in the interest history table, while the judgment result of step S8963 is NO if at least a piece of history information is registered in the interest history table.

If the judgment result of step S8963 is NO, control proceeds to step S8965 where the control unit 71 creates history information in which the current time is assigned to a registration time and the interest vector of the separate search information obtained in step S8961 is assigned to a progressive interest vector. Then, the control unit 71 registers the interest vector of the separate search information read in step S8961 into a current interest table as a current interest vector Vc, and assigns the current time to an update time in the current interest table (S8977). Then, the current interest table update process terminates FIG. 81B shows an example of a data structure of the current interest table. The current interest table includes a single record in which an update time representing a time when the record is updated and a current interest vector (Vc) are associated with each other.

If the judgment result of step S8971 is YES, control proceeds to step S8971 where the control unit 71 creates a new progressive interest vector which is obtained by adding the interest vector of the separate search information obtained in step S8961 to the progressive interest vector having the latest registration time. Next, the control unit 71 judges whether the number of pieces of history information registered in the interest history table is lower than the upper limit (i.e., three) (S8973).

If the number of pieces of history information registered in the interest history table is lower than the upper limit (S8973: YES), control proceeds to step S8975 where the control unit 71 registers the newly created progressive interest vector into the interest history table while assigning the current time to a registration time (S8975). Then, the control unit 71 registers the interest vector of the separate search information obtained in step S8961 into the current interest vector as the current interest vector Vc (S8977). Then, the current interest table update process terminates.

If the number of pieces of history information registered in the interest history table reaches the upper limit (S8973: NO), the control unit 71 selects history information having the oldest registration time from among the pieces of history information in the interest history table, and removes the selected history information from the interest history table (S8981). Then, the control unit 71 registers the newly created progressive interest vector into the interest history table while assigning the current time to a registration time (S8983).

Next, the control unit 71 sorts the pieces of history information in the interest history table in order in which the history information is registered (S8985). Next, in step S8987, the control unit 71 calculates a transition factor K (K=(k1, k2, ..., kn)). As shown in FIG. 18A, the transition factor K is calculated according to a following expression:

$$K=((v11-v12)/(v12-v13),(v21-v22)/(v22-v23), \ldots ,(vn1-vn2)/(vn2-vn3))$$

where a progressive interest vector having the latest registration time is represented by (v11, v21, ..., vn1), a progressive interest vector having the second latest registration time is represented by (v12, v22, ..., vn2), and a progressive interest vector having the oldest registration time is represented by (v13, v23, ..., vn3).

After thus calculating the transition factor K, control proceeds to step S8989 where the control unit 71 obtains a current interest vector Vc by multiplying the interest vector V=(v1, v2, ..., vn) obtained in step S8961 by the transition factor K=(k1, k2, ..., kn), for each of the elements as follows.

$$Vc=(k1 \cdot v1, k2 \cdot v2, \ldots , kn \cdot vn)$$

Next, the control unit 71 registers the current interest vector Vc into the current interest table while assigning the current time to the update time of the current interest table (S8990). After the current interest vector of the current interest table is thus updated, the current interest table update process terminates. Then, control proceeds to step S760 of FIG. 15.

In the above mentioned sixth embodiment, the information analysis device 70 adds the latest interest vector to the past interest vector to obtain a progressive interest vector, each time the current interest vector update process is executed. Then, the information analysis device 70 evaluates the transition during a past certain time period (e.g., transition of the past two interest vectors) based on the current progressive interest vector and a past progressive interest vector, and obtains a transition factor K. Further, the information analysis device 70 corrects the current interest vector reflecting the transition factor K. A current main interest of a user is thus obtained as the current interest vector.

By thus reflecting the transition factor in the current interest vector, an element of the current interest vector corresponding to the type of interest for which a user's interest is increasing can be amplified, while an element of the current interest vector corresponding to the type of interest for which the user's interest is decreasing can be reduced.

Hereafter, a variation of the sixth embodiment will be explained with reference to FIGS. 82 to 85. In this variation, a search control process shown in FIG. 82 is executed in place of the search control process of FIG. 11, a search information management table shown in FIG. 83 is used in place of the search information management table shown in FIG. 10, a search process shown in FIG. 84 is executed in place of the search process shown in FIG. 13, and a reading control process shown in FIG. 85 is executed in place of the search result evaluation process shown in FIG. 15.

Hereafter, the search control process will be explained with reference to FIG. 82. First, the control unit 71 judges whether unprocessed separate search information (which has not underwent step S9270) is found in the search information management table shown in FIG. 83 (S9210). The control unit 71 waits until unprocessed search information is found (S9210: NO). If unprocessed search information is found (S9210: YES), control proceeds to step S9220 where the control unit 71 executes the current interest table update process shown in FIG. 80.

After the current interest table is updated, the control unit 71 selects unprocessed separate search information having an interest vector producing the highest inner product R with the current interest vector registered in the current interest vector table, as a target, from among pieces of unprocessed separate search information (S9230). More specifically, the control unit 71 calculates a normal vector E of an interest vector for each of pieces of unprocessed separate search information, and calculates a normal vector Ec of the current interest vector Vc. Then, the control unit 71 calculates an inner product R of the normal vector E and the normal vector Ec (for each of the pieces of unprocessed separate search information). Next, the control unit 71 selects unprocessed separate search information corresponding to the normal vector E producing the highest inner product R with the normal vector Ec.

Next, in step S9235 selects separate search information having the latest source creation time, as a target, from among the pieces of separate search information selected in step S9230. It is understood that step S9235 is useful if more than one pieces of separate search information having the same highest inner product R are selected.

Next, in step S9240, the control unit selects a piece of separate search information having the largest number of search keys of all of pieces of separate search information selected in step S9235. it is understood that step S9240 is useful if more than separate search information having the same source creation time are selected in step S9235.

Next, in step S9250, the control unit 71 writes the highest inner vector R calculated in step S9230 into the search information management table as an evaluation value of the target separate search information selected in step S9240 (S9250). As shown in FIG. 23, the search information management table includes one or more separate search information, each of which includes a source creation time, an interest vector, information about search keys, the number of search keys, and an evaluation value. Null data is assigned to the evaluation value in the search information management table in an initial state, and the null data is replaced with the inner product R by step S9250.

After step S9250 is finished, the control unit 71 selects a piece of search program information for which a query has not been issued, from the search program management table (S9260). Then, the control unit 71 initiates a search process for the selected search program information, while designating the separate search information selected in step S9240 as a target (S9270).

Specifically, the control unit 71 selects a piece of search program information for which a query has not been sent to the information searching server 20 having the URL represented by the address information, as a target, from among the pieces of search program information in the search program management table, and then initiates a search process. The search process initiated as above is managed by a scheduler so that the search process is executed concurrently with other processes. In the search process, a query is created based on query creation information contained in the designate search program information, and the query is sent to the URL (the information searching server having the URL) represented by the address information of the designated search program information.

After step S9270 is finished, the control unit 71 judges whether search program information for which a query has not been issued is found in the search program management table (S9280). If search program information for which a query has not been issued is found (S9280: YES), control returns to step S9260 so as to select a piece of search program information for which a query has not been issued and to process step S9270 for the selected search program information.

If search program information for which a query has not been issued is not found (S9280: NO), the control unit 71 judges whether an end command is received (S9290). If an end command is not received (S9280: NO), control returns to step S9210. If an end command is received (S9280: YES), the search control process terminates.

It is preferable that the speed at which step S9230 is executed repeatedly is not considerably higher than the speed at which the separate search information is created repeatedly. For this reason, if the judgment result of step S9290 is NO, the control unit 71 waits a certain time period so that the speed at which step S9230 is executed repeatedly becomes sufficiently lower than the speed at which the separate search information is created repeatedly.

Hereafter, the search process will be explained with reference to FIG. 84. When the search process is started, the control unit 71 reads the designated search program information from the search program management table (S9305). Then, using the query creation information of the search program information reading step S9305 and search keys of the designated separate search information, the control unit 71 generates a search condition containing the search keys of the separate search information, and generates a query which is to be sent to the information searching server 20 (S9310).

Next, the control unit 71 sends the query to the URL represented by the search program information so that a search program, which is located at the URL and is owned by the information searching server 20, is executed by the information searching server 20 (S9315). In this case, the information searching server 20 searches for contents corresponding to the search keys of the separate search information in accordance with the search condition contained in the query, and sends a reply signal containing link information to the contents, back to the information analysis device 70, as a search result.

In step S9320, the control unit 71 judges whether the reply signal from the information searching server 20 is received. If the control unit 71 waits until the reply signal is received (S9320: NO). If the control unit 71 waits until the reply signal is received (S9320: YES), the control unit 71 judges whether the reply signal corresponds to the search result or indicates that the search process is stopped. If the reply signal does not correspond to the search result (S9325: NO), the search process terminates.

If the reply signal corresponds to the search result (S9325: YES), the control unit 71 judges whether the category information of the designated search program information is "term search" (S9330). If the category information is not "term search" (i.e., the category information is "general search") (S9330: NO), the control unit 71 extracts a predetermined number of (e.g., five) pieces of link information (URLs) (determined for the general search) from the search result including pieces of link information. Then, the control unit 71 generates separate result information representing the corresponding link information, for each of the pieces of link information (S9335). Next, the control unit 71 registers the separate result information generated for each of the pieces of link information, into the search result management table (S9340).

After step S9340 is finished, the control unit 71 writes the evaluation value of the designated separate search information into a filed of a evaluation value of the separate result information newly registered in the search result management table, so that the search result management table is updated. Then, the search process terminates.

If the category information is "term search" (S9330: YES), the control unit 71 extracts a predetermined number of (e.g., one) pieces of link information (URLs) (determined for the general search) from the search result including pieces of link information. Then, the control unit 71 generates separate result information representing the link information (S9345). Next, the control unit 71 registers the separate result information into the search result information stored in the storage unit 73 (S9350). Then, control proceeds to step S9360.

Hereafter, a reading process will be explained with reference to FIG. 85. The reading process is executed under control of the control unit 71.

First, the control unit 71 judges whether unprocessed separate result information (which has not undergone step S9430) is found in the search result management table (S9410). The control unit 71 waits until unprocessed separate result information is found in the search result management table (S9410: NO). If unprocessed separate result information is found (S9410: YES), control proceeds to step S9420 where the control unit selects a piece of unprocessed separate result information as a target (S9420).

Then, the reading process shown in FIG. 16 is executed in step S9430. After step S1420 (reading process) is processed, the control unit 71 judges whether contents are successfully obtained in step S9430 (S9440). If contents are successfully obtained (S9440: YES), control proceeds to step S9445. If contents are not successfully obtained (S9440: NO), the control unit judges whether an end command is received (S9450).

If an end command is not received (S9450: NO), control returns to step S9410. If an end command is received (S9450: YES), the reading process terminates.

In step S9445, the control unit changes the acquisition information of the separate result information corresponding to the successfully obtained contents, to "YES", and writes the current time into the area of the acquisition completion time information in the separate result information. Then, control proceeds to step S9450.

As described above, by executing repeatedly step S9230 while unprocessed separate search information exists, the information analysis device 70 calculates an inner product of the interest vector of each of pieces f unprocessed separate search information and the current interest vector, and evaluates the similarity between a user's interest corresponding to each of the pieces of unprocessed separate search information and a user's main interest.

The information analysis device 70 selects preferentially separate search information having high similarity (i.e., a high evaluation value) (steps S9230 to S9240), and searches for contents corresponding search keys represented by the selected separate search information (S9270). Further, the information analysis device 70 obtains the contents from a web server based on the search result in order in which the search is finished.

That is, contents having high similarity with a user's main interest are obtained preferentially from a web server regardless of the source creation time. Since contents having high usefulness for a user are obtained preferentially, it is possible to reduce processing load on a CPU and a network and to properly provide contents matching with a user's interest.

In the above mentioned embodiment, the user's interest is expressed by an interest vector based on the number of keywords (obtained from the PC 30 and the digital telephone 50) matching the keywords registered in the interest estimation table. However, the user's interest may be expressed in a different way. For example, the interest estimation table may be formed such that the type of interest and a score may be defined for each of keywords. In this case, if a keyword matching one of the keywords in the interest estimation table is found in the data from the PC 30 or the digital telephone 50, the score of the type of interest corresponding to the keyword may be incremented. In this case, the score can be used as an evaluation value of a user's interest.

What is claimed is:

1. A content providing system, comprising:
   a data acquisition unit configured to obtain data inputted and/or outputted though a user interface which is included in an information processing device;
   an interest estimation unit that generates interest information representing a user's interest by estimating the user's interest based on the data acquired by the data acquisition unit;
   a latest estimation result saving unit that saves latest interest information generated by the interest estimation unit so that contents reflecting the latest interest information can be provided to a user;
   a providing unit that obtains contents corresponding to the data and outputs the obtained contents;
   a data storage unit that stores the interest information and the data each time the data acquisition unit acquires the data, while associating the interest information with the data; and
   a similarity evaluation unit that evaluates similarity between the user's latest interest represented by the latest interest information saved by the latest estimation result saving unit and the user's interest represented by the interest information associated with the data acquired by the data acquisition unit,
   wherein the providing unit preferentially selects the data associated with the interest information having higher similarity from pieces of data stored by the data storage unit, and obtains contents corresponding to the selected data;
      the providing unit comprises a selection unit that successively conducts an operation for selecting a piece of data as a process target from among pieces of data stored by the data storage unit,
      the providing unit operates to execute a process for obtaining contents corresponding to the process target each time the selection unit makes a selection, and
      the providing unit is capable of executing concurrently a plurality of processes for obtaining contents up to a predetermined upper limit, the plurality of processes respectively corresponding to process targets selected by the selection unit, and wherein the selection unit comprises:

a process number judgment unit that judges whether the number of running processes executed by the providing unit reaches the predetermined upper limit;

a similarity judgment unit that judges whether the acquisition data associated with the interest information having the similarity higher than that of the acquisition data corresponding to each of the running processes is found among pieces of unprocessed data stored by the data storage unit; and a process selection unit that selects a process corresponding to the data associated with the interest information having the lowest similarity from among the running processes, as a cancellation target, wherein if the number of running processes reaches the predetermined upper limit and if the acquisition data associated with the interest information having the similarity higher than that of the acquisition data corresponding to each of the running processes is found among pieces of unprocessed data stored by the data storage unit, the process corresponding to the cancellation target is stopped, and the acquisition data associated with the interest information having the highest similarity from among pieces of unprocessed acquisition data stored by the storage unit is selected as the process target.

2. The content providing system according to claim 1, wherein the providing unit selects from among pieces of data stored by the data storage unit in decreasing order of similarity evaluated by the similarity evaluation unit, and obtains contents corresponding to the selected data.

3. The content providing system according to claim 1, further comprising a mode judgment unit that judges an operation mode of the information processing device, wherein in a case where the number of running processes reaches the predetermined upper limit, the providing unit processes preferentially the data having the higher similarity in accordance with an evaluation result of the similarity evaluation unit as long as the operation mode judged by the mode judgment unit corresponds to modes other than a particular mode.

4. The content providing system according to claim 3, wherein:

the information processing device is configured as a telephone having a call-in communication mode in which the telephone is in communication with another telephone after receiving a call from another telephone and having a call communication mode in which the telephone is in communication with another telephone after sending a call to another telephone; and the particular mode is the call-in communication mode.

5. The content providing system according to claim 1, wherein the providing unit is configured:

to be capable of executing concurrently a plurality of processes for obtaining contents up to a predetermined upper limit;

to successively conduct an operation for selecting a piece of data as a process target from among pieces of data stored by the data storage unit;

to execute a process for obtaining contents corresponding to the process target; and to allocate resources preferentially for a process corresponding to the data having the higher similarity so that the data having the higher similarity is processed preferentially.

6. The content providing system according to claim 1, wherein the providing unit searches for contents corresponding to keywords extracted from the data, and obtains the contents relating to the keywords from a database.

7. The content providing system according to claim 1, further comprising a duration time estimation unit that estimates a duration time during which the user's interest continues each time the user's interest is estimated by the interest estimation unit, wherein the providing unit defines a processing time limit for the data to execute a process for obtaining contents corresponding to the data within the processing time limit so that acquisition of the contents corresponding to the data can be fished at an end time of the duration time.

8. The content providing system according to claim 1, further comprising:

a judgment unit that determines which of categories determined in advance for categorizing user's interests the user's interest estimated by the interest estimation unit belongs to; and a duration time storing unit that stores a duration time during which the user's interest continues for each of the categories, wherein the interest estimation that operates:

to read the duration time corresponding to the category determined by the judgment unit; and to estimate a user's interest for next target data after the duration time has elapsed form the user's interest is previously estimated.

9. The content providing system according to claim 1, wherein the providing unit includes a selection unit that successively conducts an operation for selecting a piece of data as a process target from among pieces of data stored by the data storage unit, wherein the providing unit operates to execute a process for obtaining contents corresponding to the process target each time the selection unit makes a selection and is capable of executing concurrently a plurality of processes for obtaining contents, the plurality of processes respectively corresponding to process targets selected by the selection unit, wherein the selection unit includes:

a process number judgment unit that judges whether the number of running processes executed by the providing unit reaches a predetermined upper limit;

a similarity judgment unit that judges whether the acquisition data associated with the interest information having the similarity higher than that of the acquisition data corresponding to each of the running processes is found among pieces of unprocessed data stored by the data storage unit, and a process selection unit that selects a process corresponding to the data associated with the interest information having the lowest similarity from among the rung processes, as a cancellation target, wherein if the number of ruing processes is not smaller than the predetermined upper limit a following priority process, in which:

if the acquisition data associated with the interest information having the similarity higher than that of the acquisition data corresponding to each of the rung processes is found among pieces of unprocessed data stored by the data storage unit, the process corresponding to the cancellation target is stopped, and the acquisition data associated with the interest information having the highest similarity from among pieces of unprocessed acquisition data stored by the data storage unit is selected as the process target; and if the acquisition data associated with the interest information having the similarity higher than that of the acquisition data corresponding to each of the running processes is not found among pieces of unprocessed data stored by the data storage unit, the selection unit stops the operation for selecting the process target.

10. The content providing system according to claim 9, further comprising a mode judgment unit that judges an operation mode of the information processing device, wherein the selection unit executes the priority process as long as the operation mode judged by the mode judgment unit corresponds to modes other than a particular mode.

11. The content providing system according to claim 10, wherein:

in a case where the information processing device is in modes other than the particular mode, the selection unit selects the data associated with the highest similarity from among pieces of unprocessed data stored by the data storage unit, as a process target, regardless of the number of running processes; and the providing unit is capable of processing concurrently the processes exceeding the predetermined upper limit.

12. A content providing system, comprising:

a data acquisition unit configured to obtain data inputted and/or outputted though a user interface which is included in an information processing device;

an interest estimation unit that generates interest information representing a user's interest by estimating the user's interest based on the data acquired by the data acquisition unit;

a latest estimation result saving unit that saves latest interest information generated by the interest estimation unit so that contents reflecting the latest interest information can be provided to a user;

a main interest estimation unit that estimates a user's current main interest by modifying the latest interest information based on transition of the user's interest estimated in a past predetermined time period by the interest estimation unit;

a content acquisition unit that obtains contents corresponding to the data;

a content storage unit that stores the contents and the interest information corresponding to the contents and generated by the interest estimation unit, while associating the contents with the interest information;

a similarity evaluation unit that evaluates similarity between the user's current main interest estimated by the main interest estimation unit and the user's interest represented by the interest information generated by the interest estimation unit;

a content output unit configured to output contents stored by the content storage unit;

a content output control unit that controls the content output unit based on the similarity generated by the similarity evaluation unit so that contents corresponding to the interest information having the higher similarity are outputted preferentially; and an extraction unit that extracts keywords from the data each time the data acquisition unit obtains data;

wherein the interest estimation unit estimates the user's interest based on the keywords extracted by the extraction unit each time the data acquisition unit obtains data, and the content acquisition unit obtains contents relating to the keywords extracted by the extraction unit for the acquired contents, wherein the interest estimation unit generates a vector as the interest information representing a user's interest by:

classifying keywords extracted from the data by the extraction unit into a plurality of classes respectively corresponding to elements of the vector;

obtaining a value of each element for each of the extracted keywords; and representing the vector using the value obtained for each element, wherein the main interest estimation unit obtains a changing amount of vectors obtained by the interest estimation unit in a predetermined past time period, and modifies the latest interest information using the changing amount, such that the user's current main interest is estimated.

13. A content providing system, comprising:

a data acquisition unit configured to obtain data inputted and/or outputted though a user interface which is included in an information processing device;

an interest estimation unit that generates interest information representing a user's interest by estimating the user's interest based on the data acquired by the data acquisition unit;

a latest estimation result saving unit that saves latest interest information generated by the interest estimation unit so that contents reflecting the latest interest information can be provided to a user;

a data storage unit that stores the interest information and the data associated with the interest information each time the data acquisition unit acquires the data, while associating the interest information with the data;

a main interest estimation unit that estimates a user's current main interest by modifying the latest interest information based on transition of the user's interest estimated in a past predetermined time period by the interest estimation unit;

a content acquisition unit that obtains contents corresponding to the data;

a similarity evaluation unit that evaluates similarity between the user's current main interest estimated by the main interest estimation unit and the user's interest represented by the interest information generated by the interest estimation unit;

a content output unit configured to output contents obtained by the content acquisition unit;

a content acquisition control unit that controls the content acquisition unit so that the data associated with the interest information having higher similarity is selected preferentially from pieces of data stored by the data storage unit, and contents corresponding to the selected data are obtained preferentially; and an extraction unit that extracts keywords from the data each time the data acquisition unit obtains data;

wherein the interest estimation unit estimates the user's interest based on the keywords extracted by the extraction unit each time the data acquisition unit obtains data, and the content acquisition unit obtains contents relating to the keywords extracted by the extraction unit for the acquired contents, wherein the interest estimation unit generates a vector as the interest information representing a user's interest by:

classifying keywords extracted from the data by the extraction unit into a plurality of classes respectively corresponding to elements of the vector;

obtaining a value of each element for each of the extracted keywords; and representing the vector using the value obtained for each element, wherein the main interest estimation unit obtains a changing amount of vectors obtained by the interest estimation unit in a predetermined past time period, and modifies the latest interest information using the changing amount, such that the user's current main interest is estimated.

14. A computer-usable medium having computer readable instructions stored thereon for execution by a processor to perform a method comprising:

acquiring data inputted to and/or outputted from an information processing device though a user interface of the information processing device, from the information processing device;

generating interest information representing a user's interest by estimating the user's interest based on the data acquired from the information processing device;

saving latest interest information so that contents reflecting the latest interest information can be provided to a user;

storing the interest information and the data each time the data is acquired, while associating the interest information with the data;

evaluating similarity between the user's latest interest represented by the latest interest information and the user's interest represented by the interest information associated with the data;

selecting preferentially the data associated with the interest information having higher similarity from pieces of stored data, and obtaining contents corresponding to the selected data;

successively conducting an operation for selecting a piece of data as a process target from among pieces of data stored by the data storage unit; and operating to execute a process for obtaining contents corresponding to the process target each time a selection is made, and executes concurrently a plurality of processes for obtaining contents up to a predetermined upper limit, the plurality of processes respectively corresponding to selected process targets, wherein the selecting step further comprises the steps of:

judging whether the number of running processes executed reaches the predetermined upper limit;

judging whether the acquisition data associated with the interest information having the similarity higher than that of the acquisition data corresponding to each of the running processes is found among pieces of stored unprocessed data; and selecting a process corresponding to the data associated with the interest information having the lowest similarity from among the running processes, as a cancellation target, wherein if the number of running processes reaches the predetermined upper limit and if the acquisition data associated with the interest information having the similarity higher than that of the acquisition data corresponding to each of the running processes is found among pieces of stored unprocessed data, the process corresponding to the cancellation target is stopped, and the acquisition data associated with the interest information having the highest similarity from among pieces of stored unprocessed acquisition data is selected as the process target.

15. A computer-usable medium having computer readable instructions stored thereon for execution by a processor to perform a method comprising:

acquiring data inputted to and/or outputted from an information processing device though a user interface of the information processing device, from the information processing device;

generating interest information representing a user's interest by estimating the user's interest based on the data acquired from the information processing device;

saving latest interest information so that contents reflecting the latest interest information can be provided to a user;

estimating a user's current main interest by modifying the latest interest information based on transition of the user's interest estimated in a past predetermined time period;

storing the contents and the interest information corresponding to the contents, while associating the contents with the interest information;

evaluating similarity between the user's current main interest and the user's interest represented by the interest information associated with the data;

outputting contents based on the similarity so that contents corresponding to the interest information having the higher similarity are outputted preferentially;

extracting keywords from the data each time the data is acquired, wherein the user's interest is estimated based on the keywords extracted each time the data is acquired, obtaining contents relating to the extracted keywords related to the acquired contents, generating a vector as the interest information representing a user's interest by:

classifying keywords extracted from the data into a plurality of classes respectively corresponding to elements of the vector;

obtaining a value of each element for each of the extracted keywords; and representing the vector using the value obtained for each element;

obtaining a changing amount of vectors obtained in a predetermined past time period; and modifying the latest interest information using the changing amount of vectors so that the user's current main interest is estimated.

16. A computer-usable medium having computer readable instructions stored thereon for execution by a processor to perform a method comprising:

acquiring data inputted to and/or outputted from an information processing device though a user interface of the information processing device, from the information processing device;

generating interest information representing a user's interest by estimating the user's interest based on the data acquired from the information processing device;

saving latest interest information so that contents reflecting the latest interest information can be provided to a user;

storing the interest information and the data associated with the interest information each time the data is acquired, while associating the interest information with the data;

estimating a user's current main interest by modifying the latest interest information based on transition of the user's interest estimated in a past predetermined time period;

evaluating similarity between the user's current main interest and the user's interest represented by the interest information; and obtaining contents so that the data associated with the interest information having higher similarity is selected preferentially from pieces of stored data, and contents corresponding to the selected data are obtained preferentially;

extracting keywords from the data each time the data is acquired, wherein the user's interest is estimated based on the keywords extracted each time the data is acquired, obtaining contents relating to the extracted keywords related to the acquired contents, generating a vector as the interest information representing a user's interest by:
classifying keywords extracted from the data into a plurality of classes respectively corresponding to elements of the vector;
obtaining a value of each element for each of the extracted keywords; and
representing the vector using the value obtained for each element;

obtaining a changing amount of vectors obtained in a predetermined past time period; and modifying the latest interest information using the changing amount of vectors so that the user's current main interest is estimated.

17. A device for providing contents, comprising:
a data acquisition unit that acquires data from an information processing device, the data being inputted to and/or outputted from the information processing device though a user interface of the information processing device;
an interest estimation unit that generates interest information representing a user's interest by estimating the user's interest based on the data acquired by the data acquisition unit;
a latest estimation result saving unit that saves latest interest information generated by the interest estimation unit so that contents reflecting the latest interest information can be provided to a user;
a providing unit that obtains contents corresponding to the data and outputs the obtained contents;
a data storage unit that stores the interest information and the data each time the data acquisition unit acquires the data, while associating the interest information with the data; and
a similarity evaluation unit that evaluates similarity between the user's latest interest represented by the latest interest information saved by the latest estimation result saving unit and the user's interest represented by the interest information associated with the data acquired by the data acquisition unit,
wherein the providing unit preferentially selects the data associated with the interest information having higher similarity from pieces of data stored by the data storage unit, and obtains contents corresponding to the selected data;
the providing unit comprises a selection unit that successively conducts an operation for selecting a piece of data as a process target from among pieces of data stored by the data storage unit,
the providing unit operates to execute a process for obtaining contents corresponding to the process target each time the selection unit makes a selection, and
the providing unit is capable of executing concurrently a plurality of processes for obtaining contents up to a predetermined upper limit, the plurality of processes respectively corresponding to process targets selected by the selection unit, and wherein the selection unit comprises:
a process number judgment unit that judges whether the number of running processes executed by the providing unit reaches the predetermined upper limit;
a similarity judgment unit that judges whether the acquisition data associated with the interest information having the similarity higher than that of the acquisition data corresponding to each of the running processes is found among pieces of unprocessed data stored by the data storage unit; and
a process selection unit that selects a process corresponding to the data associated with the interest information having the lowest similarity from among the running processes, as a cancellation target,
wherein if the number of running processes reaches the predetermined upper limit and if the acquisition data associated with the interest information having the similarity higher than that of the acquisition data corresponding to each of the running processes is found among pieces of unprocessed data stored by the data storage unit, the process corresponding to the cancellation target is stopped, and the acquisition data associated with the interest information having the highest similarity from among pieces of unprocessed acquisition data stored by the storage unit is selected as the process target.

18. A device for providing contents, comprising:
a data acquisition unit that acquires data from an information processing device, the data being inputted to and/or outputted from the information processing device though a user interface of the information processing device;
an interest estimation unit that generates interest information representing a user's interest by estimating the user's interest based on the data acquired by the data acquisition unit;
a latest estimation result saving unit that saves latest interest information generated by the interest estimation unit so that contents reflecting the latest interest information can be provided to a user;
a main interest estimation unit that estimates a user's current main interest by modifying the latest interest information based on transition of the user's interest estimated in a past predetermined time period by the interest estimation unit;
a content acquisition unit that obtains contents corresponding to the data;
a content storage unit that stores the contents and the interest information corresponding to the contents and generated by the interest estimation unit, while associating the contents with the interest information;
a similarity evaluation unit that evaluates similarity between the user's current main interest estimated by the main interest estimation unit and the user's interest represented by the interest information generated by the interest estimation unit;
a content output unit configured to output contents stored by the content storage unit;
a content output control unit that controls the content output unit based on the similarity generated by the similarity evaluation unit so that contents corresponding to the interest information having the higher similarity are outputted preferentially; and
an extraction unit that extracts keywords from the data each time the data acquisition unit obtains data;
wherein the interest estimation unit estimates the user's interest based on the keywords extracted by the extraction unit each time the data acquisition unit obtains data, and the content acquisition unit obtains contents relating to the keywords extracted by the extraction unit for the acquired contents, wherein the interest estimation unit generates a vector as the interest information representing a user's interest by:
classifying keywords extracted from the data by the extraction unit into a plurality of classes respectively corresponding to elements of the vector;
obtaining a value of each element for each of the extracted keywords; and
representing the vector using the value obtained for each element, wherein the main interest estimation unit obtains a changing amount of vectors obtained by the interest estimation unit in a predetermined past time period, and modifies the latest interest information using the changing amount, such that the user's current main interest is estimated.

19. A device for providing contents, comprising:

a data acquisition unit that acquires data from an information processing device, the data being inputted to and/or outputted from the information processing device though a user interface of the information processing device;

an interest estimation unit that generates interest information representing a user's interest by estimating the user's interest based on the data acquired by the data acquisition unit;

a latest estimation result saving unit that saves latest interest information generated by the interest estimation unit so that contents reflecting the latest interest information can be provided to a user;

a data storage unit that stores the interest information and the data associated with the interest information each time the data acquisition unit acquires the data, while associating the interest information with the data;

a main interest estimation unit that estimates a user's current main interest by modifying the latest interest information based on transition of the user's interest estimated in a past predetermined time period by the interest estimation unit;

a content acquisition unit that obtains contents corresponding to the data;

a similarity evaluation unit that evaluates similarity between the user's current main interest estimated by the main interest estimation unit and the user's interest represented by the interest information generated by the interest estimation unit;

a content output unit configured to output contents obtained by the content acquisition unit;

a content acquisition control unit that controls the content acquisition unit so that the data associated with the interest information having higher similarity is selected preferentially from pieces of data stored by the data storage unit, and contents corresponding to the selected data are obtained preferentially; and an extraction unit that extracts keywords from the data each time the data acquisition unit obtains data;

wherein the interest estimation unit estimates the user's interest based on the keywords extracted by the extraction unit each time the data acquisition unit obtains data, and the content acquisition unit obtains contents relating to the keywords extracted by the extraction unit for the acquired contents, wherein the interest estimation unit generates a vector as the interest information representing a user's interest by:
classifying keywords extracted from the data by the extraction unit into a plurality of classes respectively corresponding to elements of the vector;
obtaining a value of each element for each of the extracted keywords; and
representing the vector using the value obtained for each element, wherein the main interest estimation unit obtains a changing amount of vectors obtained by the interest estimation unit in a predetermined past time period, and modifies the latest interest information using the changing amount, such that the user's current main interest is estimated.

* * * * *